(12) United States Patent
Fesbinder et al.

(10) Patent No.: US 12,229,492 B2
(45) Date of Patent: Feb. 18, 2025

(54) ALTERNATING POSITIONING OF PRIMARY TEXT

(71) Applicant: Read Twogether Ltd., Jerusalem (IL)

(72) Inventors: David Allen Fesbinder, Jerusalem (IL); Alexander Postnikov, Cambridge, MA (US)

(73) Assignee: Read Twogether Ltd, Jerusalem (IL)

( * ) Notice: Subject to any disclaimer, the term of this patent is extended or adjusted under 35 U.S.C. 154(b) by 0 days.

(21) Appl. No.: 18/815,510

(22) Filed: Aug. 26, 2024

(65) Prior Publication Data

US 2024/0419887 A1  Dec. 19, 2024

Related U.S. Application Data

(63) Continuation-in-part of application No. 18/732,461, filed on Jun. 3, 2024, which is a continuation-in-part of application No. 18/062,503, filed on Dec. 6, 2022, now Pat. No. 12,001,507.

(60) Provisional application No. 63/350,636, filed on Jun. 9, 2022, provisional application No. 63/286,378, filed on Dec. 6, 2021.

(51) Int. Cl.
*G06F 17/00* (2019.01)
*G06F 40/106* (2020.01)
*G06F 40/109* (2020.01)
*G06F 40/205* (2020.01)

(52) U.S. Cl.
CPC .......... *G06F 40/106* (2020.01); *G06F 40/109* (2020.01); *G06F 40/205* (2020.01)

(58) Field of Classification Search
CPC .... G06F 40/106; G06F 40/109; G06F 40/205; G06F 3/0485; G06F 3/0483; G06F 3/04842; G06F 3/04886; G06F 40/232; G06F 3/04883; G06F 3/0237; G06F 3/0482
USPC ....................................................... 715/264
See application file for complete search history.

(56) References Cited

U.S. PATENT DOCUMENTS

| | | |
|---|---|---|
| 5,494,444 A | 2/1996 | Thayer |
| 7,576,756 B1 | 8/2009 | Good |
| 8,001,465 B2 | 8/2011 | Kudrolli |

(Continued)

FOREIGN PATENT DOCUMENTS

| | | |
|---|---|---|
| WO | 1999039255 A2 | 8/1999 |
| WO | 2010091674 A2 | 8/2010 |

(Continued)

*Primary Examiner* — Jason T Edwards
(74) *Attorney, Agent, or Firm* — Richard A Baker, Jr.

(57) ABSTRACT

Methods and systems of displaying substring pairs where visual characteristics delineate adjacent substring pairs from each other, specifically in the case of at least one of the primary text string and the secondary text string, the placement of the first substring alternates position on an electronic display above and below the second substring. The method may comprise receiving a plurality of the primary substrings, a plurality of the secondary substrings, and a plurality of visual characteristics, displaying, on an electronic display, the primary substrings and the secondary substrings arranged into substring pairs, and one of the visual characteristics in each of the correspondence areas. Additional desired visual effects may be achieved through the use of specific demarcations, demarcation placements, and substring modifications.

29 Claims, 146 Drawing Sheets

(56) References Cited

U.S. PATENT DOCUMENTS

| | | | |
|---|---|---|---|
| 8,775,165 B1* | 7/2014 | Oikawa | G06F 40/169 |
| | | | 704/10 |
| 2003/0061022 A1* | 3/2003 | Reinders | G06F 40/58 |
| | | | 704/2 |
| 2003/0200505 A1* | 10/2003 | Evans | G06V 10/987 |
| | | | 715/256 |
| 2011/0202836 A1* | 8/2011 | Badger | G06F 40/274 |
| | | | 715/825 |
| 2013/0229489 A1 | 9/2013 | Ozawa | |
| 2014/0019117 A1* | 1/2014 | Ravi | G06F 40/40 |
| | | | 704/9 |
| 2016/0070441 A1* | 3/2016 | Paek | G06F 3/0485 |
| | | | 715/773 |
| 2017/0308290 A1* | 10/2017 | Patel | G06F 3/04817 |
| 2017/0357640 A1* | 12/2017 | Bellegarda | G06F 40/58 |
| 2019/0087772 A1 | 3/2019 | Medina | |
| 2023/0186013 A1* | 6/2023 | Zhang | G06F 3/04847 |
| | | | 715/256 |
| 2023/0222172 A1 | 7/2023 | Fesbinder et al. | |

FOREIGN PATENT DOCUMENTS

| | | |
|---|---|---|
| WO | 2014066398 A1 | 5/2014 |
| WO | 2019060767 A1 | 3/2019 |

* cited by examiner

*I'm studying Spanish Literature and I'm very lucky to enjoy this experience in Spain.*
Jeg studerer spansk litteratur og føler mig heldig at kunne nyde denne oplevelse i Spanien.

FIG. 1

201— *I am from New York,*     *but I have been living in Barcelona,*    *Spain for six months.*
202— Jeg kommer fra New York,    men har boet i Barcelona i      Spanien i seks måneder.

*I'm studying*     *Spanish Literature*    *and I'm very lucky to enjoy*    *this experience in Spain.*
Jeg studerer      spansk litteratur     og føler mig heldig at kunne nyde    denne oplevelse i Spanien.

*But sometimes...*    *crazy and funny things happen*
Men fra tid til anden...    sker der skøre og sjove begivenheder    206

FIG. 2a

I am from New York.    but I have been living in Barcelona,   Spain for six months.
Jeg kommer fra New York.   men har boet i Barcelona i       Spanien i seks måneder.

I'm studying    Spanish Literature   and I'm very lucky to enjoy    this experience in Spain.
Jeg studerer    spansk litteratur    og føler mig heldig at kunne nyde    denne oplevelse i Spanien.

But sometimes...    crazy and funny things happen         207
Men fra tid til anden...   sker der skøre og sjove begivenheder

FIG. 2b

D1 Hello I'm George   Hola soy George D2

FIG. 2e

Hello I'm George D1
D2 Hola soy George

Example Chunk

FIG. 2m

Stage 1

I am from New York,    but I have been living in Barcelona,    Spain for six months.

Stage 2

Jeg kommer fra New York,    men har boet i Barcelona i    Spanien i seks måneder.

FIG. 5a

Stage 3

500
*I am from New York,*
Jeg kommer fra New York.

502
*but I have been living in Barcelona,*
men har boet i Barcelona i

504
*Spain for six months.*
Spanien i seks måneder.

Stage 4a

*I am from New York,*
Jeg kommer fra New York.

510
*but I have been living in Barcelona,*
men har boet i Barcelona i

*Spain for six months.*
Spanien i seks måneder.

FIG. 5b

Stage 4b

*I am from New York,*     *but I have been living in Barcelona,*     *Spain for six months.* — 512
Jeg kommer fra New York,     men har boet i Barcelona i     Spanien i seks måneder Stage 4c

*I am from New York,*     *but I have been living in Barcelona,*     *Spain for six months.* — 514
Jeg kommer fra New York,     men har boet i Barcelona i     Spanien i seks måneder.

FIG. 5c

| [a] | [b] |

| I am from New York, | but I have been living in Barcelona, | Spain for six months |
| Jeg kommer fra New York, | men har boet i Barcelona i | Spanien i seks måneder |

FIG. 6

I am from New York,     but I have been living in Barcelona,     Spain for six months
Jeg kommer fra New York,   men har boet i Barcelona i         Spanien i seks måneder

FIG. 7

I am from New York,    but I have been living in Barcelona,    Spain for six months
Jeg kommer fra New York,    men har boet i Barcelona i    Spanien i seks måneder

FIG. 8

I am from New York,                but I have been living in Barcelona,    Spain for six months
Jeg kommer fra New York,           men har boet i Barcelona i              Spanien i seks måneder

FIG. 9

I am from New York, but I have been living in Barcelona, Spain for six months

Jeg kommer fra New York, men har boet i Barcelona i Spanien i seks måneder

FIG. 10

I am from New York, | but I have been living in Barcelona, | Spain for six months
Jeg kommer fra New York, | men har boet i Barcelona i | Spanien i seks måneder

FIG. 11

I am from New York,    but I have been
Jeg kommer fra New York,    living in Barcelona,    Spain for six months
    men har boet i Barcelona i    Spanien i seks måneder

FIG. 13

I am from New York, | but I have been living in Barcelona, | Spain for six months Jeg kommer fra New York, | men har boet i Barcelona i | Spanien i seks måneder

FIG. 15

I am from New York,  but I have been living in Barcelona,  Spain for six months

Jeg kommer fra New York,  men har boet i Barcelona i  Spanien i seks måneder

FIG. 18

בְּכָל יוֹם וּבְכָל עֵת וּבְכָל שָׁעָה׃ and every day — 1904
at all times — 1902
and every hour — 1900
— 1910

Example 1

Central Segmentation bar

A plurality   segments | of primary text
Una pluralidad  de segmentos  de texto primarios Example 2

Central Segmentation bar

A plurality   segments | of primary text

Una pluralidad  de segmentos  de texto primarios

Example 3

Central Segmentation bar

A plurality   segments | of primary text

Una pluralidad  de segmentos  de texto primarios

Example 4

Non-bar Content   Central Segmentation bar

A plurality ▪ segments | ▪ of primary text
Una pluralidad▪de segmentos▪de texto primarios Example 5

Central Segmentation bar

A plurality   segments | of primary text
Una pluralidad  de segmentos  de texto primarios

FIG. 22a

Segmentation Bar       Segmentation Bar       Segmentation Bar
| A plurality           | segments              | of primary text
Una pluralidad    de segmentos    de texto primarios Segmentation Bar                              Segmentation Bar
| A plurality              segments            | of primary text
Una pluralidad    de segmentos    de texto primarios Segmentation Bar
A plurality              | segments              of primary text
Una pluralidad    de segmentos    de texto primarios

FIG. 22b

Example 1    A plurality    segments       of primary text
             Una pluralidad de segmentos   de texto primarios Example 2    A plurality    segments       of primary text
             Una pluralidad de segmentos   de texto primarios Example 3    A plurality    segments       of primary text
             Una pluralidad de segmentos   de texto primarios Example 4    A plurality    segments       of primary text
             Una pluralidad de segmentos   de texto primarios

FIG. 22c

Example 1    A plurality    segments    of primary text
             Una pluralidad de segmentos de texto primarios Example 2    A plurality    segments    of primary text
             Una pluralidad de segmentos de texto primarios Example 3    A plurality    segments    of primary text
             Una pluralidad de segmentos de texto primarios Example 4    A plurality    segments    of primary text
             Una pluralidad de segmentos de texto primarios

FIG. 22d

Example 1    A plurality    segments    of primary text
             Una pluralidad de segmentos de texto primarios Example 2    A plurality    segments    of primary text
             Una pluralidad de segmentos de texto primarios Example 3    A plurality    segments    of primary text
             Una pluralidad de segmentos de texto primarios Example 4    A plurality    segments    of primary text
             Una pluralidad de segmentos de texto primarios

FIG. 22e

Example 1         A plurality      segments         of primary text
                  Una pluralidad   de segmentos     de texto primarios Example 2         A plurality      segments         of primary text
                  Una pluralidad   de segmentos     de texto primarios A plurality                       of primary text
Example 3         Una pluralidad   de segmentos     de texto primarios
                                   segments Example 4         A plurality    segments    of primary text
                  Una pluralidad de segmentos de texto primarios

FIG. 22f

Example 1    A plurality ▨ segments ▨ of primary text
Una pluralidad de segmentos de texto primarios Example 2    A plurality segments of primary text
Una pluralidad de segmentos de texto primarios Example 3    A plurality segments of primary text
Una pluralidad de segmentos de texto primarios Example 4    A plurality segments of primary text
Una pluralidad de segmentos de texto primarios

FIG. 22g

Example 1    A plurality    segments    of primary text
             Una pluralidad de segmentos de texto primarios

FIG. 22h

Example 1

A plurality　　segments　　of primary text
Una pluralidad　de segmentos　de texto primarios Example 2

A plurality　　segments　　of primary text
Una pluralidad　de segmentos　de texto primarios

FIG. 22i

| First correspondence unit | Second correspondence unit | Third correspondence unit | Second Segmentation bar | Fourth correspondence unit |

First Segmentation bar — No bar | for | every other | | correspondence unit
Sin barra | para | todas las demas | | unidades de correspondencia

FIG. 22j

Connecting two       correspondence units
Conexión de dos    unidades de correspondencia Correspondence bar

FIG. 22q

Connecting two correspondence units
Conexión de dos unidades de correspondencia
Correspondence bar

FIG. 22r

Example 1
Example 2
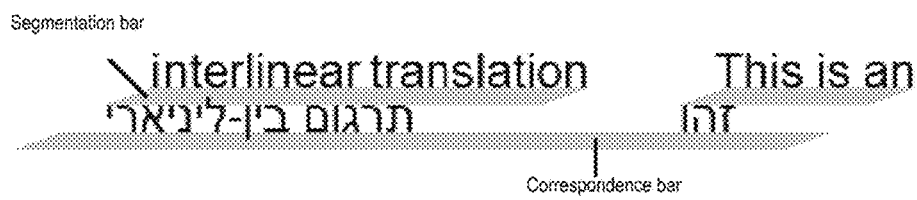
FIG. 22w

Example 1    שָׁאַתָּה זָן וּמְפַרְנֵס אוֹתָנוּ תָּמִיד ; בְּכָל יוֹם וּבְכָל עֵת וּבְכָל שָׁעָה :

Example 2    שָׁאַתָּה זָן וּמְפַרְנֵס אוֹתָנוּ תָּמִיד

Example 3    שָׁאַתָּה זָן וּמְפַרְנֵס אוֹתָנוּ תָּמִיד ; בְּכָל יוֹם וּבְכָל עֵת וּבְכָל שָׁעָה :

FIG. 22x

*I am learning*     *Spanish*     *Before I travel*     *to Spain* —— 2304
Estoy aprendiendo español antes de viajar a España — 2303

FIG. 23c

*I am learning*     *Spanish*     *Before I travel*     *to Spain* —— 2304
Estoy aprendiendo español antes de viajar a España — 2303

FIG. 23d

*I am learning*     *Spanish*     *Before I travel*     *to Spain* —— 2304
Estoy aprendiendo español antes de viajar a España — 2303

FIG. 23e

*I am learning*     *Spanish*     *Before I travel*     *to Spain* —— 2304
Estoy aprendiendo español antes de viajar a España — 2303

FIG. 23f 2403        2404
                      \          \
                       dt
    The boy ←┐ El chico
    is standing  está haciendo in line    fila at    en the    el airport. aeropuerto.
    2400B                ↑
                        2402b

FIG. 24b

2703 — Let us praise
2704 — לְכוּ נְרַנְּנָה to Adonoy;
לַיהוָה                    2700A let us acclaim
נָרִיעָה                  ← 2702a 2705
to the Rock of our salvation
לְצוּר יִשְׁעֵנוּ
2706

FIG. 27a

2703 — Let us praise
2704 — לְכוּ נְרַנְּנָה
2700B
to Adonoy;
לַיהוָה
let us acclaim
נָרִיעָה ← 2702b
2705
to the Rock of our salvation
לְצוּר יִשְׁעֵנוּ
2706

FIG. 27b

2703 — Let us praise
2704 — לְכוּ נְרַנְּנָה to Adonoy;
לַיהוָה

2700C let us acclaim
נָרִיעָה ← 2702c 2705
to the Rock of our salvation
לְצוּר יִשְׁעֵנוּ
2706

FIG. 31a is His kindness. as forever to all creatures, food provides He
חַסְדּוֹ כִּי לְעוֹלָם לְכָל בָּשָׂר לֶחֶם נוֹתֵן הוּא

FIG. 31b

וּבְטוּבוֹ הַגָּדוֹל  And by His great goodness

תָּמִיד לֹא  never

חָסַר לָנוּ  have we lacked

וְאַל יֶחְסַר לָנוּ  and may we never lack

מָזוֹן  food

לְעוֹלָם וָעֶד:  forever and ever:

FIG. 33a

| | |
|---|---|
| הוּא נוֹתֵן | He provides |
| לֶחֶם | food |
| לְכָל בָּשָׂר | to all flesh; |
| כִּי לְעוֹלָם | as forever |
| חַסְדּוֹ׃ | is His kindness; |

FIG. 33b

Source of Blessings
בָּרוּךְ אַתָּה
is You

Hashem,
יְיָ אֱלֹהֵינוּ
our God

King
מֶלֶךְ הָעוֹלָם
of the universe

Who nourishes the
הַזָּן אֶת הָעוֹלָם כֻּלּוֹ
whole world with His Goodness;
בְּטוּבוֹ בְּחֵן
with favor with kindness
בְּחֶסֶד וּבְרַחֲמִים:
and with mercy.

FIG. 33c

בָּרוּךְ אַתָּה  *Source of Blessings is You*

יְיָ אֱלֹהֵינוּ  *Hashem, our God*

מֶלֶךְ הָעוֹלָם  *King of the universe*

הַזָּן אֶת הָעוֹלָם כֻּלּוֹ  *Who nourishes the whole world*

בְּטוּבוֹ בְּחֵן  *with His Goodness; with favor*

בְּחֶסֶד וּבְרַחֲמִים:  *with kindness and with mercy:*

FIG. 33d

| После того как | мальчик | съел | ■ | свой | ланч | он | пошел | обратно | в | класс ■
| After | the boy | ate | ■ | his | lunch | he | went | back | to | class ■

| После того как | мальчик | съел | свой | ланч | он | пошел | обратно | в | класс |
| After | the boy | ate | his | lunch | he | went | back | to | class |

| После того как | мальчик | съел | свой | ланч | он | пошел | обратно | в | класс |
| After | the boy | ate | his | lunch | he | went | back | to | class |

FIG. 35c is His kindness    as forever      to all flesh    food    provides    He

| הוּא | לֶחֶם | כִּי לְעוֹלָם | וּבְטוּבוֹ | תָּמִיד לֹא |
|---|---|---|---|---|
| He | food | as forever | and by His goodness | never |
| provides | to all flesh | is His kindness | which is great | |
| נוֹתֵן | לְכָל בָּשָׂר | חַסְדּוֹ | הַגָּדוֹל | |

FIG. 35e

| and by His great goodness | forever is His kindness | food to all flesh | He provides |
|---|---|---|---|
| וּבְטוּבוֹ הַגָּדוֹל | כִּי לְעוֹלָם חַסְדּוֹ | לֶחֶם לְכָל בָּשָׂר | הוּא נוֹתֵן |

FIG. 35f

| וּבְטוּבוֹ הַגָּדוֹל | כִּי לְעוֹלָם חַסְדּוֹ | לֶחֶם לְכָל בָּשָׂר | הוּא נוֹתֵן |
|---|---|---|---|

FIG. 35g

Francisco stands outside　　Francisco está parado afuera de
his new house.　　su nueva casa.

He reaches into his pocket　　Él alcanza su bolsillo
and pulls out the key.　　y saca la llave.

He turns the key　　Voltea la llave
in the lock　　en la cerradura
and opens the door.　　y abre la Puerta.

FIG. 36a

Francisco stands outside　　Francisco está parado afuera de
his new house.　　su nueva casa.

He reaches into his pocket　　Él alcanza su bolsillo
and pulls out the key.　　y saca la llave.

He turns the key　　Voltea la llave
in the lock　　en la cerradura
and opens the door.　　y abre la Puerta.

FIG. 36b

Example 1
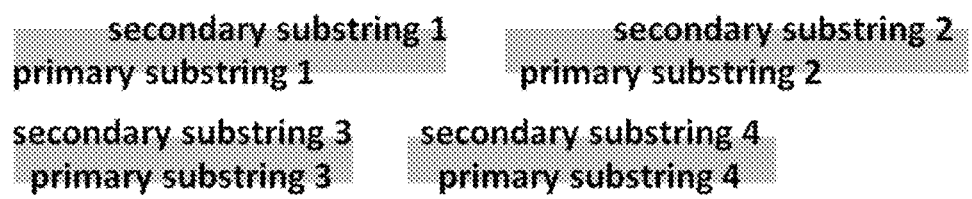
Example 2
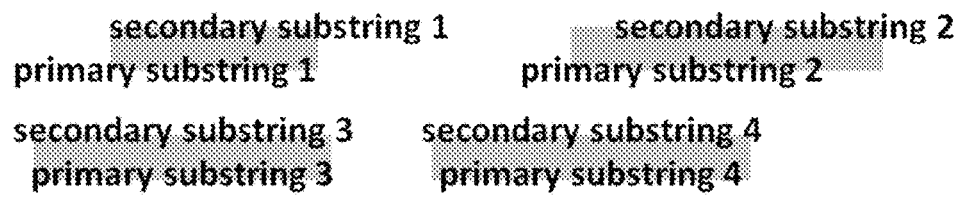
FIG. 37a

Example 1
Example 2
Example 3
Example 4
FIG. 37c and prepares nourishment    וּמֵכִין מָזוֹן for all His creatures    לְכָל בְּרִיּוֹתָיו that He created    אֲשֶׁר בָּרָא

Source of Blessings    בָּרוּךְ

אַתָּה    is You

יְיָ    Hashem

הַזָּן    Who nourishes

FIG. 37e

וּמֵטִיב לַכֹּל     and benefits all

וּמֵכִין מָזוֹן     and prepares nourishment

לְכָל בְּרִיּוֹתָיו     for all His creatures

אֲשֶׁר בָּרָא     that He created

בָּרוּךְ     Source of Blessings

אַתָּה     is You

יְיָ     Hashem

And by His great goodness　　is His kindness　as forever　to all flesh
לְכָל בָּשָׂר כִּי לְעוֹלָם חַסְדּוֹ: וּבְטוּבוֹ הַגָּדוֹל

And by His great goodness　　　　　　as forever
לְכָל בָּשָׂר כִּי לְעוֹלָם חַסְדּוֹ: וּבְטוּבוֹ הַגָּדוֹל
is His kindness　　　　　　to all flesh

FIG. 39b

Мальчик	ест	ланч,
The boy	eats	lunch, at the	new	school.
в	новой	школе.

Мальчик	ест	ланч,
The boy	eats	lunch, at the	new	school.
в	новой	школе.

FIG. 41

FIG. 42
FIG. 43
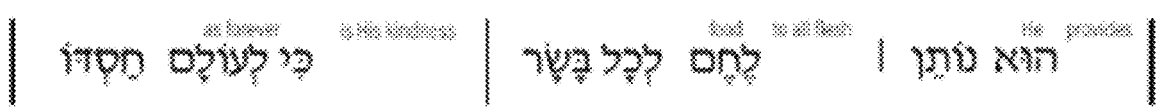
FIG. 44

Orange Grove School
The boy went to the new school near the bus station.
Joshua Alexander Green                                    on Bradley Street

FIG. 50

| ¿Para qué alinear | traducciones con texto? | Para facilitar | la comparación | entre los dos. |

FIG. 54c

¿Para qué alinear traducciones con texto? Para facilitar la comparación entre los dos.

| ¿Para qué alinear | traducciones con texto? | Para facilitar | la comparación | entre los dos. |

FIG. 54d

ALTERNATING POSITIONING OF PRIMARY TEXT

CROSS-REFERENCE TO RELATED APPLICATIONS

This application is a continuation-in-part patent application from U.S. patent application Ser. No. 18/732,461, filed on Jun. 3, 2024, for David Allen Fesbinder, said application is incorporated herein in its entirety. U.S. patent application Ser. No. 18/732,461 is a continuation-in-part patent application from U.S. patent application Ser. No. 18/062,503, "Demarcation of Texts", filed on Dec. 6, 2022, for David Allen Fesbinder, et al, now U.S. Pat. No. 12,001,507, said patent is incorporated herein in its entirety. U.S. patent application Ser. No. 18/062,503 claims the benefit of U.S. provisional patent application No. 63/286,378, filed on Dec. 6, 2021, and U.S. provisional patent application No. 63/350,636, filed on Jun. 9, 2022, the contents of which are incorporated by reference in their entirety.

BACKGROUND

The present disclosure relates to the field of displaying texts, and, in particular, to the field of optimizing the placement and appearance of a first text relative to a second text to improve readability.

SCOPE OF PRIOR ART

The terms used to describe the prior art are listed at the start of the detailed description. One of the best ways to learn a foreign language is by reading foreign texts in that language. However, a reader may not understand every word in a given foreign text. Thus, to aid readers, language learning programs often display a native language translation of the foreign text immediately above the foreign text. For example, FIG. 1 shows an English translation immediately above a Danish foreign text. The proximity of these texts improves a reader's learning experience as he or she may quickly reference the English text to improve his or her understanding of the Danish text. While such arrangements good start, it is not immediately obvious which words or phrases in the Danish text correspond to which words or phrases in the English text. Here, does the Danish word "nyde" correspond to the English word "enjoy" or to "this"? Such ambiguities are especially prevalent for texts of different scripts or interlinear texts.

There is therefore a need in the art for a method and system of displaying a foreign text string and a translation text string such that the foreign substrings are delineated, and there is a correspondence between the foreign substrings and their corresponding translation substrings.

SUMMARY

The present disclosure satisfies the foregoing needs by providing, inter alia, methods and systems for displaying demarcated substring pairs.

The present disclosure is directed at a computer-implemented method for displaying a primary text string and a secondary text string, the method comprising: receiving a primary text string comprising a plurality of primary substrings; receiving a secondary text string comprising a plurality of secondary substrings; receiving a plurality of distinct visual demarcations; displaying, on an electronic display, the primary substrings and the secondary substrings arranged into substring pairs, wherein each of the substring pairs comprising one of the secondary substrings placed next to its corresponding primary substring; and displaying, on the electronic display, the visual demarcations, wherein the visual demarcations delineate adjacent substring pairs from each other. The secondary substrings may be related to their corresponding primary substrings.

In one aspect, each of the substring pairs may have a rectangular correspondence area. Each of the rectangular correspondence areas may contain at least one of the visual demarcations.

In another aspect, there may be three or more of the visual demarcations and the visual demarcations are equidistant from each other, wherein a space in between the visual demarcations is greater than zero.

In another aspect, each of the visual demarcations may be any or a combination of a shape, a line, a curve, a contour, a boundary, color, or a graphical representation.

In another aspect, the width of a given visual demarcation may be equal to a wider of the secondary substring and its corresponding primary substring. A leftmost point of a given visual demarcation may be in between, or flush with, a leftmost point of the secondary substring and a leftmost point of its corresponding primary substring and a rightmost point of the given visual demarcation is in between, or flush with, a rightmost point of the secondary substring and a rightmost point of its corresponding primary substring. A given visual demarcation may be one of entirely above and entirely below the substring pair. The placement of the visual demarcations relative to one of the primary substrings and the secondary substrings may be consistent.

In another aspect, the secondary substrings may be offset from their corresponding primary substrings.

In another aspect, the primary text string and the secondary text string comprise any or a combination of symbol, pictures, or graphics.

In another aspect, at least one of the visual demarcations may border or overlap two or more of the substring pairs.

In another aspect, a given visual demarcation may comprise a shape that causes the secondary substring to appear on a separate perspective plane relative to the corresponding primary substring, conveying a visual appearance of depth for the secondary substring. The secondary substrings may be related to their corresponding primary substrings. The given visual demarcation may border or overlap only one of the secondary substring and its corresponding primary substring. The given visual demarcation may border or overlap the secondary substring and its corresponding primary substring.

In another aspect, displaying the secondary substrings further may comprise visually deemphasizing the secondary substrings by one of displaying the secondary substrings offset from their corresponding primary substrings, displaying the secondary substrings in a smaller font than their corresponding primary substrings, and displaying a portion of the secondary substrings in a lighter shade than their corresponding primary substrings.

In another aspect, the shape of the given visual demarcation may narrow in the direction of the secondary substring. The shape of the given visual demarcation may comprise at least one sloped edge. The shape of the given visual demarcation may be quadrilateral. The given visual demarcation may comprise at least two shadow-outlined edges of an implied transparent oblique parallelogram. A topmost point of the given visual demarcation may overlap a lower of the secondary substring and its corresponding primary substring.

The present disclosure is further directed at a system to display a primary text string and a secondary text string, the system comprising: memory storing executable instructions, a processing device executing the instructions, wherein the instructions cause the processing device to receive a primary text string comprising a plurality of primary substrings, receive a secondary text string comprising a plurality of secondary substrings, receive a plurality of distinct visual demarcations, display, on an electronic display, the primary substrings and the secondary substrings arranged into substring pairs, wherein each of the substring pairs comprising one of the secondary substrings placed next to its corresponding primary substring, and display, on the electronic display, the visual demarcations, wherein the visual demarcations delineate adjacent substring pairs from each other.

The present disclosure is further directed at non-transitory computer storage media storing executable instructions which when executed by a computing device cause the computing device to receive a primary text string comprising a plurality of primary substrings, receive a secondary text string comprising a plurality of secondary substrings, receive a plurality of distinct visual demarcations, display, on an electronic display, the primary substrings and the secondary substrings arranged into substring pairs, wherein each of the substring pairs comprising one of the secondary substrings placed next to its corresponding primary substring, and display, on the electronic display, the visual demarcations, wherein the visual demarcations delineate adjacent substring pairs from each other.

In some aspects, the techniques described herein relate to a computer-implemented method for displaying a primary text string and a secondary text string, the computer-implemented method including: receiving the primary text string including a plurality of primary substrings; receiving the secondary text string including a plurality of secondary substrings; and displaying, on an electronic display, the primary substrings and the secondary substrings arranged into substring pairs, wherein each of the substring pairs including one of the secondary substrings placed next to its corresponding primary substring; wherein, for at least one of the primary text strings and the secondary text string, placement of the secondary substrings alternate between above and below the primary substrings.

In some aspects, the techniques described herein relate to a computer-implemented method, wherein at least one of the primary substrings and the secondary substrings are extracted from the primary text string and the secondary text string via parsing operations of a native language processing engine, wherein the native language processing engine provides the at least one of the primary substrings and the secondary substrings as an output from at least one automated parser.

In some aspects, the techniques described herein relate to a computer-implemented method, wherein the secondary text string is a transliteration of the primary text string.

In some aspects, the techniques described herein relate to a computer-implemented method wherein the secondary text string is a translation of the primary text string.

In some aspects, the techniques described herein relate to a computer-implemented method wherein the secondary string consists of user-input notes corresponding to the primary string.

In some aspects, the techniques described herein relate to a computer-implemented method wherein a portion of the primary substring that corresponds to the secondary string is emphasized.

In some aspects, the techniques described herein relate to a computer-implemented method wherein a portion of the primary substring that corresponds to the secondary string is in bold.

In some aspects, the techniques described herein relate to a computer-implemented method further including: displaying the secondary substrings further includes visually deemphasizing the secondary substrings by displaying the secondary substrings offset from their corresponding primary substrings.

In some aspects, the techniques described herein relate to a computer-implemented method further including: displaying the secondary substrings further includes visually deemphasizing the secondary substrings by displaying the secondary substrings in a smaller font than their corresponding primary substrings.

In some aspects, the techniques described herein relate to a computer-implemented method further including: displaying the secondary substrings further includes visually deemphasizing the secondary substrings by displaying a portion of the secondary substrings in a lighter shade than their corresponding primary substrings.

In some aspects, the techniques described herein relate to a system to display a primary text string and a secondary text string, the system including: memory storing executable instructions; and a processing device executing the instructions, wherein the instructions cause the processing device to: receive the primary text string including a plurality of primary substrings; receive the secondary text string including a plurality of secondary substrings; and display, on an electronic display, the primary substrings and the secondary substrings arranged into substring pairs, wherein each of the substring pairs including one of the secondary substrings placed next to its corresponding primary substring; wherein, for at least one of the primary text string and the secondary text string, placement of the secondary substrings alternate between above and below the primary substrings.

In some aspects, the techniques described herein relate to a system, wherein at least one of the primary substrings and the secondary substrings are extracted from the primary text string and the secondary text string via parsing operations of a native language processing engine, wherein the native language processing engine provides the at least one of the primary substrings and the secondary substrings as an output from at least one automated parser.

In some aspects, the techniques described herein relate to a system, wherein the secondary text string is a transliteration of the primary text string.

In some aspects, the techniques described herein relate to a system, wherein the secondary text string is a translation of the primary text string.

In some aspects, the techniques described herein relate to a system, wherein the secondary string consists of user-input notes corresponding to the primary string.

In some aspects, the techniques described herein relate to a system wherein a portion of the primary substring that does not correspond to the secondary string is emphasized.

In some aspects, the techniques described herein relate to a system wherein a portion of the primary substring that does not correspond to the secondary string is in bold.

In some aspects, the techniques described herein relate to a system further including instructions to cause the processing device to: visually deemphasize the secondary substrings by displaying the secondary substrings offset from their corresponding primary substrings.

In some aspects, the techniques described herein relate to a system further including instructions to cause the processing device to: visually deemphasize the secondary substrings by displaying the secondary substrings in a smaller font than their corresponding primary substrings.

In some aspects, the techniques described herein relate to a system further including instructions to cause the processing device to: visually deemphasize the secondary substrings by displaying a portion of the secondary substrings in a lighter shade than their corresponding primary substrings.

The techniques described here relate to a system or a computer-implemented method where the secondary strings alternate two secondary substrings above followed by two secondary substrings below to the primary string.

The techniques described here relate to a system or a computer-implemented method where the secondary strings are parallel to the primary string.

The techniques described here relate to a system or a computer-implemented method where the secondary strings are adjacent to the primary string.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there are shown in the drawings variations that are presently preferred. It should be understood, however, that the invention is not limited to the precise arrangements shown. In the drawings, where:

FIG. 1 shows an English translation immediately above a Danish foreign text, as seen in the prior art.

FIGS. 2a-2m shows definitions used throughout the disclosure.

FIGS. 5a-5e show the steps of the method of FIG. 4 as applied to a computing device, according to an embodiment.

FIG. 6 shows demarcated substring pairs where the visual demarcations are equidistant from each other, according to an embodiment.

FIG. 7 shows demarcated substring pairs where the visual demarcations have a width of the substring pair, according to an embodiment.

FIG. 8 shows demarcated substring pairs where the visual demarcations have a reduced width, according to an embodiment.

FIG. 9 shows demarcated substring pairs where the visual demarcations are entirely above or entirely below the substring pairs, according to an embodiment.

FIG. 10 shows demarcated substring pairs where the visual demarcations are consistently placed relative to the primary substrings, according to an embodiment.

FIG. 11 shows demarcated substring pairs where the secondary substrings are offset from their corresponding primary substrings, according to an embodiment.

FIG. 13 shows demarcated substring pairs where the visual demarcations border or overlap only one of the substrings.

FIG. 15 shows demarcated substring pairs where the topmost point of each visual demarcation overlaps a lower substring in a substring pair.

FIG. 18 shows demarcated substring pairs where the demarcations are non-elliptical lines, according to an embodiment.

FIG. 19 shows demarcated substring pairs where one of the demarcations overlaps each of the primary substrings, according to an embodiment.

FIG. 20 shows demarcated substring pairs where the demarcation is an implied transparent oblique parallelogram with at least two shadow-outlined edges, according to an embodiment.

FIGS. 21-55 show substring pairs visually demarcated in multiple formats/modes, according to various non-limiting embodiments.

DETAILED DESCRIPTION

The disclosed approaches may be provided in a variety of manners, for example, procedural, computer implement, integrated into a system or apparatus, provided as a computer programming product, and the like.

Figure 2C:
Figure 2D:
Figure 2G:
Figure 2H:
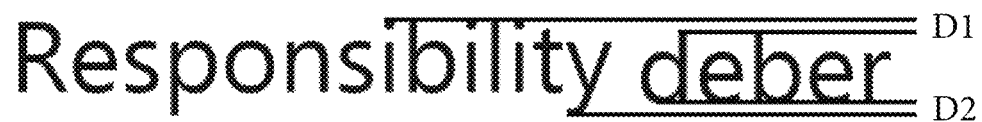
Figures 2I, 2J, 2K, 2L:
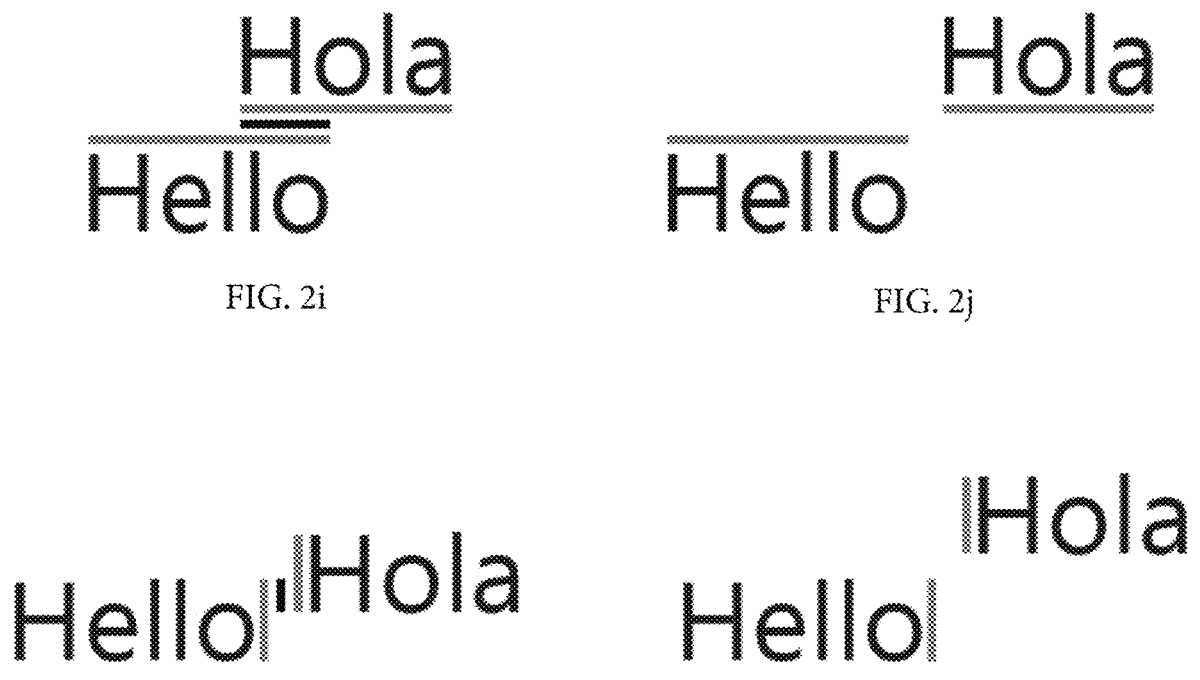
Figure 2M:
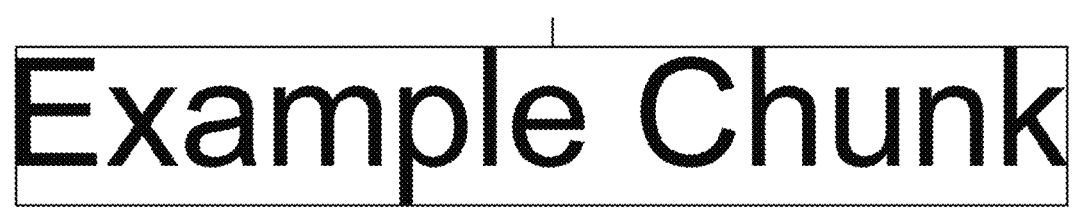

For the sake of convenience, the terms used to describe the prior art and various embodiments of the present invention are defined below. Some terms are illustrated in FIGS. 2a-b for further clarification. It should be noted that these definitions are provided to merely aid in understanding the descriptions, and they do not, in any way, limit the scope of the present invention.

Display (verb): The verb "display," unless specified otherwise, refers to the act of presenting texts and/or content strings in any format that may be perceived by a reader of the texts and/or content strings, for example, but not limited to, presenting the texts and/or content strings on digital screens, printed medium, as holographs, and the like.

Display (noun): The noun "display," unless specified otherwise, refers to any sort of presentation of texts and/or content strings that may be perceived by a reader of the texts and/or content strings, for example, but not limited to, a presentation of the texts and/or content strings on digital screens, printed medium, as holographs, and the like.

Bordering: A text or object borders another text or object when an edge of the text or object is flush with the edge of another text or object.

Overlapping: A text or object overlaps another text or object when the body of the text or object occupies the same space as the body of another text or object.

Superimposing: A first text or object superimposes another text or object when only one of the texts or objects is visible in any overlapping portions.

Text string: A string of at least one character.

Primary text string (202): A text string that is the primary focus of a reader's attention. In FIGS. 2a-m, the Danish text string is the primary focus for a reader learning Danish, for instance. In FIG. 50, the text strings "The boy went to the", "new school near the", and "bus station" are the primary focus for a reader, for instance. It would be appreciated that while the 'string' has been exemplified in the instant disclosure in the form of a text, it could be any other form/representation of a string, for instance, of one or more numbers, alphanumeric representations, codes, written expressions, graphical symbols, or a combination thereof. This non-limiting definition of 'text' and the scope thereof is therefore applicable to all the below texts.

Secondary text string (201): A text string that is the secondary focus of a reader's attention. In FIGS. 2a-m, the English text string is the secondary focus for a reader learning Danish. In FIG. 50, the text strings "Joshua Alexander Green," "Orange Grove School," and "on Bradley Street, are the secondary focus for a reader.

Substrings (203, 204, 205): Unique portions of a text string. For example, in FIGS. 2a-m and FIG. 50, the primary and secondary text strings have been split into three primary substrings and three secondary substrings.

Substring pair: A secondary substring placed adjacent (next?) to its corresponding primary substring, indicating a correspondence and/or association and/or mapping of any desired/defined nature between the two substrings. In FIG. 2a, the English substring "I'm studying" and its corresponding Danish substring "Jeg studerer" form a substring pair, for instance. In FIG. 50, the substring "The boy went to the," and its corresponding substring "Joshua Alexander Green," form a substring pair, for instance. A substring-image pairing can comprise an image containing non-textual content placed next to its corresponding substring.

Correspondence area (206): A rectangular area containing a single substring pair where the top edge of the correspondence area extends to, but does not border, an immediately above text or object, the bottom edge of the correspondence area extends to, but does not border, an immediately below text or object, the right edge of the correspondence area extends to, but does not border, an immediately right text or object, and the left edge of the correspondence area extends to, but does not border, an immediately left text or object. In FIG. 2a, a grey reference box 206 outlines the correspondence area of the substring pair comprised of the English substring "and I'm very lucky to enjoy" and its corresponding Danish substring "og foler mig heldig at kunne nyde." It would be appreciated that the visual demarcation could be of any desired shape, size, dimension, or any other graphic representation that can encompass or create a boundary including dotted lines or dots or any other representation to help demarcate and separately display/identify the substring pair. It would further be appreciated that the correspondence area may not be displayed per se to the reader, and can be computed for placement of demarcations using the instant method(s).

Reduced correspondence area (207): A rectangular area containing a single substring pair where the top edge of the reduced correspondence area extends halfway to an immediately above text or object, the bottom edge of the correspondence area extends halfway to an immediately below text or object, the right edge of the correspondence area extends halfway to an immediately right text or object, and the left edge of the correspondence area extends halfway to an immediately left text or object. In FIG. 2b, a grey reference box 207 outlines the reduced correspondence area of the substring pair comprised of the English substring "and I'm very lucky to enjoy" and its corresponding Danish substring "og foler mig heldig at kunne nyde." Alternatively, the reduced correspondence area is a rectangular area containing a single substring pair where the top edge of the reduced correspondence area extends less than halfway to an immediately above text or object, the bottom edge of the correspondence area extends less than halfway to an immediately below text or object, the right edge of the correspondence area extends less than halfway to an immediately right text or object, and the left edge of the correspondence area extends less than halfway to an immediately left text or object. Such reduced correspondence areas have an empty space in between adjacent substring pairs.

Deemphasis: Any modification to text that makes the deemphasized text less prominent than nearby text. For example, deemphasizing a portion of a character or substring makes the deemphasized portion of the character or substring less prominent than a remainder of the character or substring. Furthermore, a first substring can be deemphasized relative to a corresponding second substring, a first character can be deemphasized relative to a corresponding second character, etc. Types of deemphasis may include, but are not limited to, scaling down (e.g., reducing a width or height of text), shading (e.g., making text lighter), gradual shading (e.g., making text have a shading gradient), hollowing-out (e.g., removing an inside of a text, leaving only the edges of the text outlined), truncation (e.g, removing character strokes of a text), decreasing the brightness values for the pixels, or similar.

Emphasis: Any modification to text that makes the emphasized text more prominent than nearby text. For example, emphasizing a portion of a character or substring makes the emphasized portion of the character or substring more prominent than a remainder of the character or substring. Furthermore, a first substring can be emphasized relative to a corresponding second substring, a first character can be emphasized relative to a corresponding second character, etc. Types of emphasis may include, but are not limited to, scaling up (e.g., increasing a width or height of text), bolding (e.g., making text bolder), gradual bolding (e.g., making text have a boldness gradient), italicization to slant the text, underlining to place a line beneath the text, Capitalization of a portion or the entirety of the text, changing the color of the text such as using red for warnings or green for positive highlights, increasing the font size, applying a background color behind the text to highlight it, adjusting letter spacing (kerning) increases the space between letters to making the text more distinct, using shadow or outline effects, increasing the brightness of pixels, or any combination thereof.

Horizontal offset: A second substring is horizontally offset from a first substring if 1) the rightmost point of the second substring is to the right of the rightmost point of the first substring and 2) the leftmost point of the second substring is to the right of the leftmost point of the first substring or 1) the rightmost point of the second substring is to the left of the rightmost point of the first substring and 2) the leftmost point of the second substring is to the left of the leftmost point of the first substring. For example, in FIG. 2c, the second substring "Hola soy George" is horizontally offset to the right of the first substring "Hello I'm George" where the leftmost point of "Hola soy George" is distance D1 to right of the leftmost point of "Hello I'm George" and the rightmost point of "Hola soy George" is distance D2 to the right of the rightmost point of "Hello I'm George. Likewise, in FIG. 2d, the second substring "Hola soy George" is horizontally offset to the left of the first substring "Hello I'm George" where the leftmost point of "Hola soy George" is distance D1 to left of the leftmost point of "Hello I'm George" and the rightmost point of "Hola soy George" is distance D2 to the left of the rightmost point of "Hello I'm George."

A second substring is also horizontally offset from a first substring if, when the reading direction of the first substring is left to right, the 1) the leftmost point of the second substring is to the right of the leftmost point of the first substring and 2) the majority of the width of the second substring is in between the center point of the first substring and the rightmost point of the first substring. For substrings having a left-to-right or right-to-left reading direction, the center point of a substring is located halfway between the leftmost and rightmost points of the substring (e.g., the horizontal distance between the center point of the substring and the leftmost point of the substring is equal to the horizontal distance between the center point of the substring and the rightmost point the of the substring). For substrings having a top-to-bottom or bottom-to-top reading direction, the center point of a substring is located halfway between the topmost and bottommost points of the substring (e.g., the vertical distance between the center point of the substring and the topmost point of the substring is equal to the vertical distance between the center point of the substring and the bottommost point the of the substring).

A second substring is also horizontally offset from a first substring if, when the reading direction of the first substring is right to left, the 1) the rightmost point of the second substring is to the left of the rightmost point of the first substring and 2) the majority of the width of the second substring is in between the center point of the first substring and the leftmost point of the first substring.

A second substring is also horizontally offset from a first substring if, when the reading direction of the first substring is left to right, the 1) the leftmost point of the second substring is to the right of the leftmost point of the first substring and 2) at least two thirds of the width of the second substring is in between the center point of the first substring and the rightmost point of the first substring.

A second substring is also horizontally offset from a first substring if, when the reading direction of the first substring is right to left, the 1) the rightmost point of the second substring is to the left of the rightmost point of the first substring and 2) at least two thirds of the width of the second substring is in between the center point of the first substring and the leftmost point of the first substring.

In an embodiment, at least 75% of the width of the second substring is in between the leftmost point and the center point of its corresponding first substring. Alternatively, at least 75% of the width of the second substring is in between the center point and the rightmost point of its corresponding first substring. Such placements can be used when the first text string and the second text string have an opposite reading direction.

In an embodiment, a majority of the width of the second substring is in between the leftmost point and the center point of its corresponding first substring. Alternatively, a majority of the width of the second substring is in between the center point and the rightmost point of its corresponding first substring. Such placements can be used when the first text string and the second text string have an opposite reading direction.

Vertical offset: A second substring is vertically offset from a first substring if 1) the topmost point of the second substring is above the topmost point of the first substring and 2) the bottommost point of the second substring is above the bottommost point of the first substring or 1) the topmost point of the second substring is below the topmost point of the first substring and 2) the bottommost point of the second substring is below the bottommost point of the first substring. For example, in FIG. 2e, the second substring "Hola soy George" is vertically offset above the first substring "Hello I'm George" where the topmost point of "Hola soy George" is distance D1 above the topmost point of "Hello I'm George" and the bottommost point of "Hola soy George" is distance D2 above the bottommost point of "Hello I'm George. Likewise, in FIG. 2f, the second substring "Hola soy George" is vertically offset below the first substring "Hello I'm George" where the topmost point of "Hola soy George" is distance D1 below the topmost point of "Hello I'm George" and the bottommost point of "Hola soy George" is distance D2 below the bottommost point of "Hello I'm George.

Horizontal indent: A second substring is horizontally indented from a first substring if 1) the rightmost point of the second substring is to the left of the rightmost point of the first substring or 2) the leftmost point of the second substring is to the right of the leftmost point of the first substring. For example, in FIG. 2g, the second substring "deber" is horizontally indented to the right of the first substring "responsibility" where the leftmost point of "deber" is distance D1 to right of the leftmost point of "responsibility". Likewise, the second substring "deber" is also horizontally indented to the left of the first substring "responsibility" where the rightmost point of "deber" is distance D2 to the left of the rightmost point of "responsibility".

Vertical indent: A second substring is vertically indented from a first substring if 1) the topmost point of the second substring is below the topmost point of the first substring or 2) the bottommost point of the second substring is above the bottommost point of the first substring. For example, in FIG. 2h, the second substring "deber" is vertically indented below the first substring "responsibility" where the topmostpoint of "deber" is distance D1 below the topmost point of "responsibility". Likewise, the second substring "deber" is also vertically indented above the first substring "responsibility" where the bottommost point of "deber" is distance D2 above the bottommost point of "responsibility".

Horizontal overlap: A first substring and a second substring horizontally overlap if 1) the width of the second substring is in the same column as the width of the first substring. For example, in FIG. 2i, the second substring "Hola" horizontally overlaps the first substring "Hello" where the grey line below "Hola" demarcates the width of "Hola", the grey line above "Hello" demarcates the width of "Hello" and the black line in between "Hola" and "Hello" demarcates the width of the horizontal overlap of "Hola" and "Hello". In contrast, the "Hola" and "Hello" of FIG. 2j do not horizontally overlap.

Vertical overlap: A first substring and a second substring vertically overlap if 1) the height of the second substring is in the same row as the height of the first substring. For example, in FIG. 2k, the second substring "Hola" vertically overlaps the first substring "Hello" where the grey line to the left of "Hola" demarcates the height of "Hola", the grey line to the right of "Hello" demarcates the height of "Hello" and the black line in between "Hola" and "Hello" demarcates the height of the horizontal overlap of "Hola" and "Hello". In contrast, the "Hola" and "Hello" of FIG. 2l do not vertically overlap.

The definitions for horizontal offset, vertical offset, horizontal indent, vertical indent, horizontal overlap, and vertical overlap are provided for texts strings with a generally left-to-right or right-to-left reading directionality. However, for these definitions to be applicable to text strings with a top-to-bottom or bottom-to-top reading directionality, positional terms in these definitions should be consistently rotated by 90 degrees. For example, the positional term "rightmost" should be replaced with "bottommost", the positional term "leftmost" should be replaced with "topmost", and so on. Alternatively, for these definitions to be application to text strings with a non-standard reading direction (e.g., any non-horizontal reading direction), the frame of reference needs to be adjusted such that the reading directionality of the text string becomes left-to-right or right-to-left. For example, if a reading directionality of the text string is bottom-left to top-right, the frame of reference is rotated 45 degrees such that the reading directionality of the text string becomes left-to-right. Such measures ensure that the methods described herein are applicable to text strings with any reading directionality.

Visual demarcation: A continuous non-background, non-text object. In an aspect, while the instant specification has been described considering a rectangular demarcation, said visual demarcation can be of any shape, color, contour, boundary, or any combination thereof. Also, it may be appreciated that the visual demarcation can be kept consistent in terms of its position and representation for each pair of substrings with other visual demarcations to enable smoother reading for the user.

Airspace 210: A rectangular space containing a text, where the left edge of the airspace extends to the leftmost point of the text, the right edge of the airspace extends to the rightmost point of the text, the top edge of the airspace extends to the topmost point of the text, and the bottom edge of the airspace extends the bottommost point of the text. For example, in FIG. 2m, the left edge of the airspace of "Example Chunk" extends to the leftmost point of the "E," the right edge of the airspace of "Example Chunk" extends to the rightmost point of the "k," the top edge of the airspace of "Example Chunk" extends to the topmost points of the "1," "h," and "k," and the bottom edge of the airspace of "Example Chunk" extends to the bottommost point of the "p".

It shall be noted that, unless specified otherwise, the following exemplary methods can be applied to characters and texts of any typeface, font, and size. For example, the methods can be applied to characters displayed in 12-point Times New Roman typeface as well as to characters displayed in 10-point Calibri typeface. These examples, as well as all other illustrated and described typefaces, font sizes, and fonts, are not inclusive and shall not be interpreted in any way to limit the scope of the present invention. It should be appreciated that any display or method described in this document can incorporate Torah-related commentary for the first text string, the second text string, and/or their respective substrings.

Figure 3:
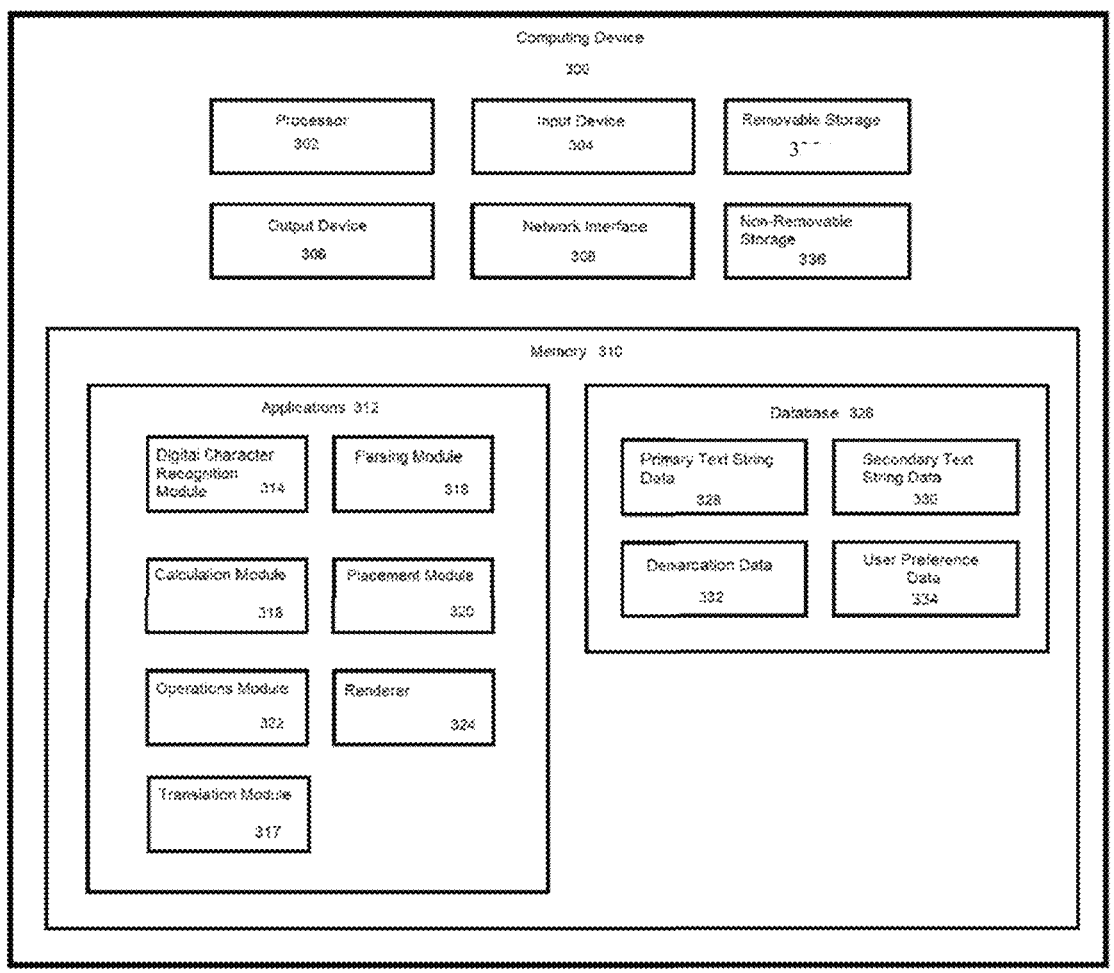
FIG. 3 shows a block diagram illustrating example physical components of a computing device with which aspects of the disclosure may be practiced.

Reference is now made to FIG. 3, which shows a block diagram illustrating example physical components of a computing device 300 with which aspects of the disclosure may be practiced. The computing device may be referred to as the system.

In a preferred embodiment, the computing device 300 includes at least one processor 302, an input device 304 such as a keyboard, mouse, camera, microphone, eye tracking device, and/or touchscreen, and an output device 306 such as an augmented reality device, a virtual reality device, a printer or an electronic display in any of the various forms associated with computing devices. The computing device may also include a network interface 308 for network enablement. It should be appreciated that processing may be implemented either locally or remotely via various forms of wireless or wired networking technologies or a combination of both.

The memory 310 may include various types of short and long-term memory as is known in the art. Memory 310 may be loaded with various applications 312 including a digital character recognition module 314 for identifying text strings on electronic displays as will be further discussed, a parsing module 316 for identifying text strings and associated text string metadata by parsing the tags of HTML content and associated Cascading Style Sheet (CSS) files as will be further discussed, a translation module 317 for translating various foreign languages into either English or other chosen languages, a calculation module 318 for defining correspondence areas of substring pairs as will be further discussed, a placement module 320 for placing text strings, substrings, and/or demarcations as will be further discussed, an operations module 322 for performing various modifications to text strings, substrings, and/or demarcations as will be further discussed, and a renderer 324 for rendering text strings, substrings, and/or demarcations for display as will be further discussed. Accordingly, memory 310 includes all necessary modules per each embodiment.

Memory 310 may further include a database 326 loaded with primary text string data 328, secondary text string data 330, demarcation data 332, and user preference data 334. In certain embodiments, the database 326 may be implemented locally, whereas in other embodiments, the database 326 may be implemented remotely.

Primary text string data may include all metadata associated with primary text strings including, but not limited to, primary text string typefaces, fonts, point sizes, dimensions, etc. Secondary text string data may include metadata of secondary text strings including, but not limited to, secondary text string typefaces, fonts, point sizes, dimensions, etc. Demarcation data 332 may include demarcation appearance, design, dimensions, etc. User preference data 334 may include preferred user settings, languages, demarcations, and the like. Accordingly, the database 326 includes all necessary content per each embodiment.

The term computer-readable media as used herein may include computer storage media. Computer storage media may include volatile and nonvolatile, removable, and non-removable media implemented in any method or technology for storage of information, such as computer-readable instructions, data structures, or program modules. The memory 310, the removable storage device 335, and the non-removable storage device 336 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 300. Any such computer storage media may be part of the computing device 300. Computer storage media does not include a carrier wave or other propagated or modulated data signal.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The computing device 300 is operative to employ various font technologies like variable fonts, raster, vector, TrueType, and Microsoft OpenType and the database 326 also includes associated font-resource files.

Figure 4:
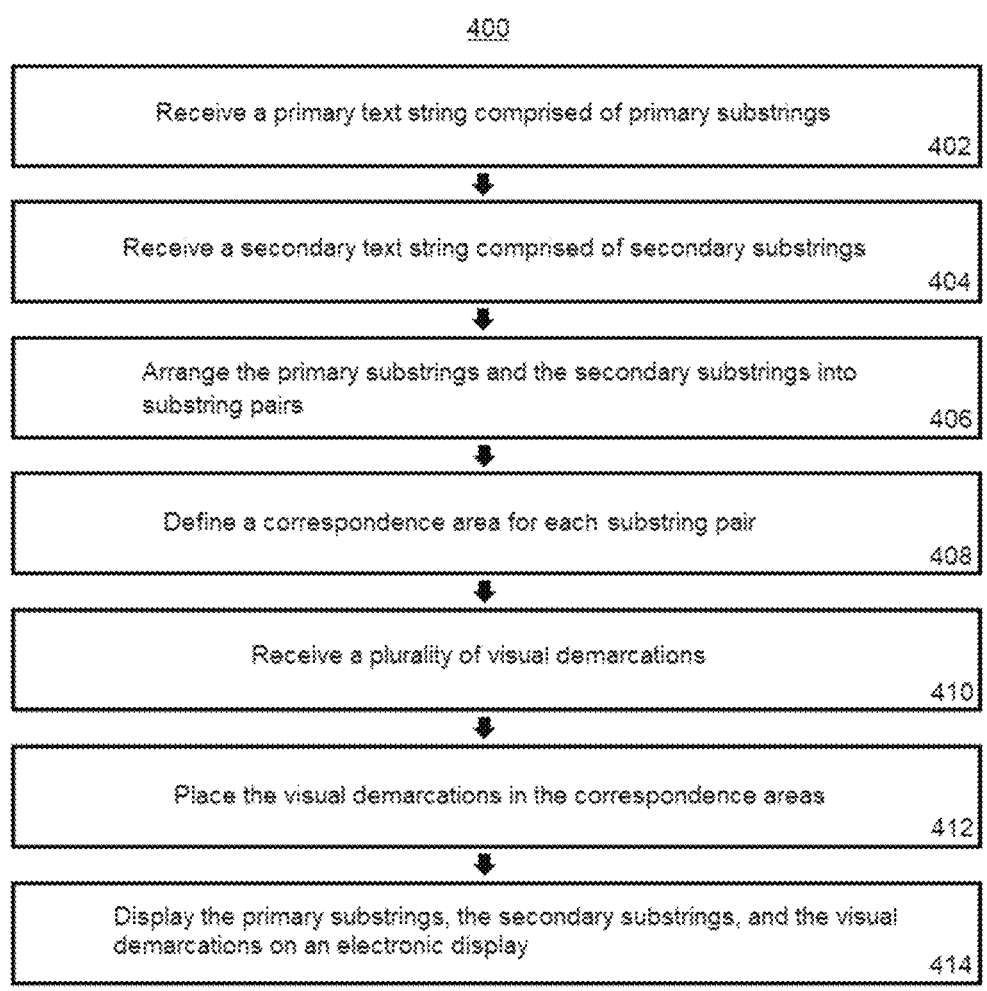
FIG. 4 is a flowchart showing steps of an exemplary method for the simultaneous display of a primary text string comprised of primary substrings and a secondary text string comprised of secondary substrings.
Figure 5D:
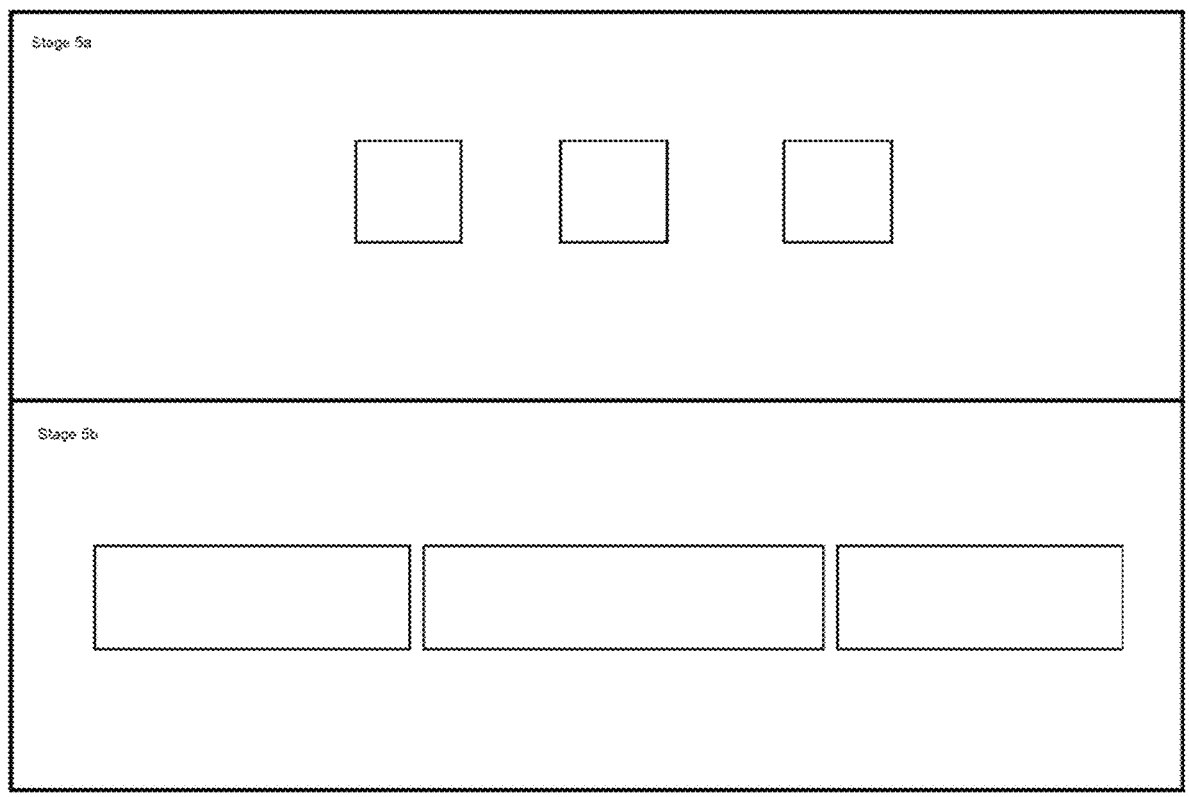
Figure 5E:
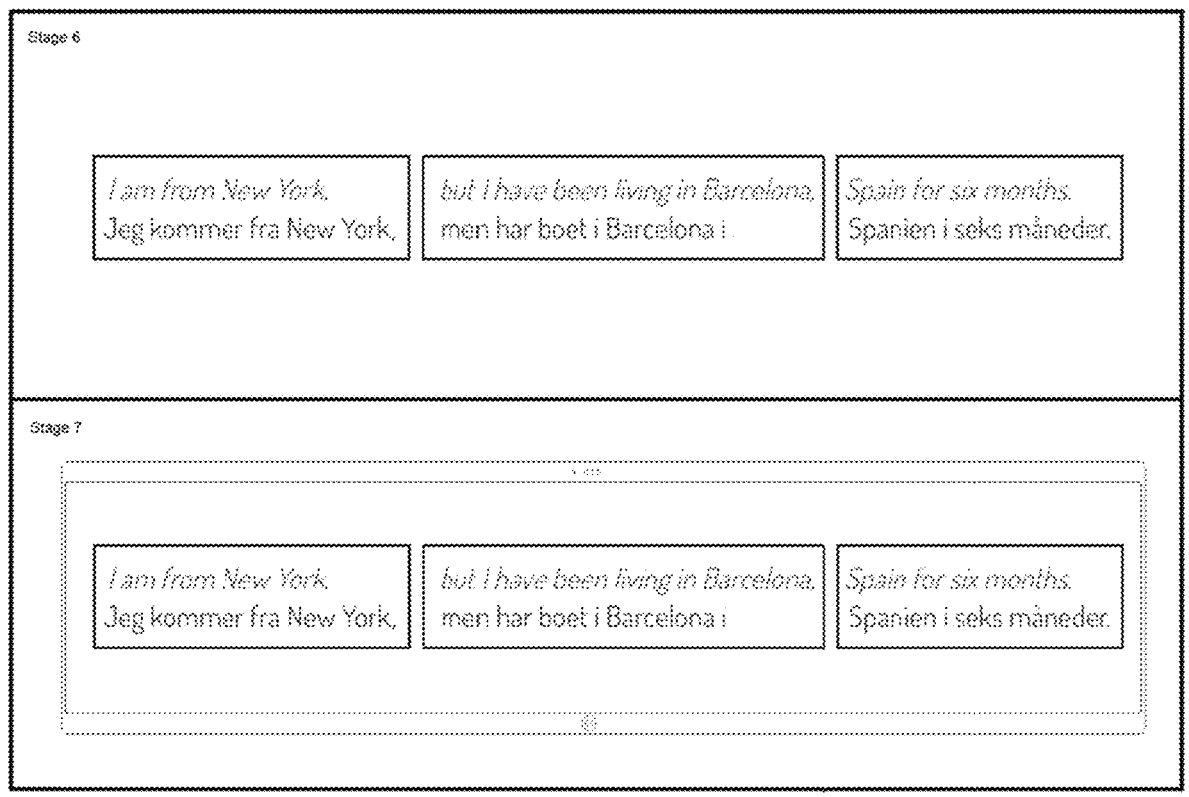

FIG. 4 is a flowchart showing steps of an exemplary method 400 for the simultaneous display of a primary text string comprised of primary substrings and a secondary text string comprised of secondary substrings. Demarcations are used to delineate adjacent substring pairs from each other and to further associate the secondary substrings to their corresponding primary substrings. The method may begin at step 402.

At step 402, a primary text string composed of primary substrings is received.

According to an embodiment, the primary text string is received when a user inputs the primary text string using an input device. The user may manually indicate the substrings that make up the text string. Alternatively, a native language processing engine can identify substrings within a string. For instance, exemplary rules can be based on punctuation, where periods indicate the start of a new text string and commas indicate the start of a new substring within that text string.

According to another embodiment, the primary text string is received when the digital character recognition module (314) scans the content of an electronic display to identify a primary text string. The entirety of the content may be scanned. Alternatively, a user may select a portion of the content to be scanned. Metadata (identity, position, typeface, font, etc.) of each character in the primary text string may be saved to primary text string data. A native language processing engine can identify substrings within a string.

According to yet another embodiment, the primary text string is received when the parsing module (316) parses HTML content and associated CSS files. The entirety of the HTML content and associated CSS files may be parsed. Alternatively, a user may select a portion of the HTML content and associated CSS files to be parsed. The parsing module parses the tags of the HTML content to identify characters in a primary text string as well as associated Cascading Style Sheet (CSS) files to identify associated character metadata. Metadata (identity, position, typeface, font, size, etc) of each character in the primary text string may be saved to primary text string data. A native language processing engine can identify substrings within a string. For instance, the primary substrings and/or the secondary substrings may be extracted from the primary text string and/or the secondary text string via parsing operations of a native language processing engine, wherein the native language processing engine provides the primary substrings and/or the secondary substrings as an output from an automated parser. In some embodiments, a native language processing engine is a natural language processing (NPL) engine.

In some embodiments, the primary text string and/or the secondary text string are received through an application program interface (API). In some embodiments, the API interfaces with a remote computing device, perhaps through a remote procedure call (RPC). In some embodiments, any of the steps in FIG. 4 could be performed remotely on another computing device, and the parameters and results communicated over a bus or a network. In other embodiments, the system could be integrated with digital publishing platforms, allowing authors and designers to apply these methods directly within digital books, magazines, or online articles to enhance the reader's experience.

At step 404, a secondary text string composed of secondary substrings is received. Each of the secondary substrings may uniquely correspond to one of the primary substrings. For example, each of the secondary substrings may be a translation of its corresponding primary substring. In an aspect, the secondary text string may either be machine-generated directly based on the primary text string or can be generated manually or through manual intervention. As mentioned above, the primary and secondary text strings need not necessarily be translations of each other, but can be associated in any other way, for instance, the primary text string can be "One Two Three" and the secondary text string can be "1 2 3". Alternatively, the primary and secondary text strings can both the graphical symbols/representations or can be any combination of the above.

According to an embodiment, the secondary text string is received when a user inputs the secondary string using an input device. The user may manually indicate the substrings that make up the text string. Alternatively, a native language processing engine can identify substrings within a string. For instance, exemplary rules can be based on punctuation, where periods indicate the start of a new text string and commas indicate the start of a new substring within that text string.

According to another embodiment, the secondary text string is received when the digital character recognition module (314) scans the content of an electronic display to identify a secondary text string. The entirety of the content may be scanned. Alternatively, a user may select a portion of the content to be scanned. Metadata (identity, position, typeface, font, etc.) of each character in the secondary text string may be saved to secondary text string data. A native language processing engine can identify substrings within a string.

According to yet another embodiment, the secondary text string is received when the parsing module (316) parses HTML content and associated CSS files. The entirety of the HTML content and associated CSS files may be parsed. Alternatively, a user may select a portion of the HTML content and associated CSS files to be parsed. The parsing module parses (possibly using an automated parser) the tags of the HTML content to identify characters in a secondary text string as well as associated Cascading Style Sheet (CSS) files to identify associated character metadata. Metadata (identity, position, typeface, font, size, etc) of each character in the secondary text string may be saved to secondary text string data. A native language processing engine can identify substrings within a string. For instance, the primary substrings and/or the secondary substrings may be extracted from the primary text string and/or the secondary text string via parsing operations of a native language processing engine, wherein the native language processing engine provides the primary substrings and/or the secondary substrings as an output from an automated parser. In some embodiments, a native language processing engine is a natural language processing (NPL) engine.

At step 406, the primary substrings and the secondary substrings are arranged into substring pairs.

According to an embodiment, the placement module places each of the secondary substrings adjacent to its corresponding primary substring, creating substring pairs. In some embodiments, the placement of the first substring alternates between above and below the second substring.

At step 408, a correspondence area is defined for each substring pair.

According to an embodiment, for each substring pair, the calculation module 318 scans the display screen, pixel by pixel, to determine the location of non-substring pair objects. The largest rectangular area containing the substring pair and not containing non-substring pair objects is defined as the correspondence area for that substring pair. Alternatively, the calculation module 319 defines the correspondence area of a substring pair by processing the metadata of substrings within that substring pair and adjacent objects to determine the topmost pixels of a below object, the bottommost pixels of an above object, leftmost pixels of a right object and the rightmost pixels of a left object and selecting a rectangular area containing pixels of the substring pair and not containing pixels of those objects.

In some embodiments, at step 410, a plurality of visual demarcations are received. Each of the visual demarcations may be distinct such that a reader can distinguish adjacent demarcations. The number of demarcations may equal the number of correspondence areas. Alternatively, there may be more demarcations than correspondence areas. Yet alternatively, there may be fewer demarcations than correspondence areas, with every other correspondence area not containing a demarcation. In other embodiments, demarcations are replaced by alternating the location of the first substrings.

According to an embodiment, demarcations are received when they are generated. The first step of generating a demarcation is retrieving a base demarcation from demarcation data. The operations module, in conjunction with the placement module (320), then modifies the base demarcation into a desired demarcation that, when placed in a correspondence area, results in the desired visual effect.

In some embodiments, at step 412, the demarcations are placed into the correspondence areas.

According to an embodiment, the placement module places each of the desired demarcations into one of the correspondence areas such that the desired demarcation results in the desired visual effect.

At step 414, the primary substrings, secondary substrings, and visual demarcations are displayed on an electronic display at the designated locations.

In some embodiments, key substrings or translations (e.g., important terms, frequently used words) are highlighted or visually distinguished from other text to draw user attention and aid in learning or comprehension.

It would be appreciated that the usage of the term "In proximity to" can be interpreted to mean close but not touching, touching, or overlapping, and the term "Interacting with" can touching or overlapping. There are no limitations in the claims below that require "interacting with" but such limitations will be in the specification in case we need to amend the claims to include such limitations later.

Alternatively, a native language processing engine can identify substrings within a string. For instance, exemplary rules can be based on, for example, a Sentence must start with an Uppercase character (e.g. Noun/I/We/He, etc.), then a lowercase character follows, there must be spaces between words, the sentence must end with a full stop(.) after a word, two continuous spaces are not allowed, and two continuous upper case characters are not allowed. However, the sentence can end after an upper case character.

In another exemplary aspect, a string can be divided into an array of substrings, and a computed implemented function can return a temporary array of the substrings. The function can be used in calculation statements wherever an array can be used, wherein a first operand can be the string to be split which can be alphanumeric, graphic, or UCS-2. The second operand can be the list of characters that indicate the end of each substring, can have the same type and CCSID as the first operand. If it is not specified, the function can default to splitting at blanks. If the length of the second operand is greater than 1, any of the characters in the second operand indicate the end of each substring.

Another exemplary implementation to automatically find/form substrings from a string can be based on rules associated with parts of speech including nouns, pronouns, verbs, adjectives, adverbs, prepositions, conjunctions, and interjections. Breaking a sentence down into its parts of speech requires knowledge of the word's meaning and how it relates to other words in the sentence. In an implementation, the substring formation can be based on the identification of verbs, followed by the identification of adverbs, followed by nouns, pronouns, and adjectives, followed by propositions and conjunctions and interjections, and then logically groping them together in parts based on a defined set of rules.

FIGS. 5a-5e show the steps of the method of FIG. 4 as applied to a computing device, according to an embodiment.

In Stage 1, Danish primary substrings of "Jeg kommer fra New York," "men har boet i Barcelona i" and "Spanien i seks måneder" are received from user keyboard inputs.

In Stage 2, English secondary substrings of "I am from New York," "but I have been living in Barcelona," and "Spain for six months" are generated by the translation module as direct translations of the Danish primary substrings.

In Stage 3, the English secondary substrings are placed above their corresponding Danish primary substrings to form substring pairs 500 502 504.

In Stages 4a-4c, the correspondence areas are defined for each substring pair. The edges of each correspondence area are highlighted with reference boxes 510 512 514.

In Stages 5a-5b, the demarcations are generated. Boxes are chosen as a base demarcation. The hollow boxes are then scaled into a desired shape.

In Stage 6, the Box demarcations are placed in their respective correspondence areas. Here, the box demarcations surround the substring pairs.

In stage 7, the Danish primary substrings, the English secondary substrings, and the box demarcations are displayed on an electronic display. Here, the boxes function to delineate adjacent substring pairs from each other.

The system embodies a significant advance over existing systems that cannot display two text strings in a manner that delineates adjacent substring pairs. Additional desired visual effects may be achieved through the use of specific demarcations, demarcation placements, and substring modifications, as described below.

As an alternative to generating the demarcations, individual characters in the received primary and secondary substrings may each contain a portion of a demarcation such that, when substring pairs are formed out of the primary and secondary substrings, complete demarcations are formed from individual demarcation portions. For example, if a user indicates the use of box demarcations before the primary and secondary substrings are received, individual characters in the received primary and secondary substrings may appear underlined, with leftmost and rightmost individual characters having vertical portions. This will result in a box demarcation being formed as the substring pairs are formed out of the primary and secondary substrings.

In some embodiments, a user interface is provided to allow the user to correct the translation or to make notes regarding the translation. In some embodiments, these user corrections are fed back to the translations module to improve future translations.

FIG. 6 shows demarcated substring pairs, according to an embodiment. Danish primary substrings and English secondary substrings are surrounded by box demarcations. The box demarcations are equidistant from each other such that 'a' is equal to 'b' where 'a' and 'b' are non-zero distances. At a glance, such visual demarcation spacing provides a rigid frame to otherwise randomly spaced substrings.

FIG. 7 shows demarcated substring pairs, according to an embodiment. Danish primary substrings and English secondary substrings are separated by rectangular demarcations. The leftmost point of a given visual demarcation is flush with the leftmost point of a substring pair and the rightmost point of a given visual demarcation is flush with the rightmost point of a substring pair. At a glance, such visual demarcation widths associate all substrings in horizontal alignment with a visual demarcation.

FIG. 8 shows demarcated substring pairs, according to an embodiment. Danish primary substrings and English secondary substrings are separated by rectangular demarcations. The leftmost point of a given visual demarcation is flush with or in between the leftmost point of a primary substring and the leftmost point of a corresponding secondary substring. The rightmost point of a given visual demarcation is flush with or in between the rightmost point of a primary substring and the rightmost point of a corresponding secondary substring. At a glance, such visual demarcation widths associate all substrings that are fully or partially horizontally aligned with a visual demarcation.

FIG. 9 shows demarcated substring pairs, according to an embodiment. Danish primary substrings and English secondary substrings are demarcated by parallelogram demarcations. The visual demarcations are entirely above or entirely below pairs of substrings. At a glance, such visual demarcation placements associate all substrings that are partially walled in by the visual demarcations.

FIG. 10 shows demarcated substring pairs, according to an embodiment. Danish primary substrings and English secondary substrings are demarcated by perpendicular-line demarcations.

The visual demarcations are consistently placed relative to the primary substrings. Alternatively, the visual demarcations may be consistently placed relative to the secondary substrings. At a glance, such visual demarcation placements provide a repeating consistency to otherwise inconsistent substrings.

FIG. 11 shows demarcated substring pairs, according to an embodiment. Danish primary substrings and English secondary substrings are separated by rectangular demarcations where each English secondary substring is offset from its corresponding Danish primary substring. The rightmost point of each secondary substring is to the right of the rightmost point of its corresponding primary substring. Alternatively, the leftmost point of each secondary substring may be to the left of the leftmost point of its corresponding primary substring. Offsetting secondary substrings from their corresponding primary substrings, in the reading direction of the primary substrings, provides substring arrangements where the primary substrings are introduced before their corresponding secondary substrings. At a glance, such substring placements reduce visual and mental fatigue for a reader focusing on the primary text.

Figure 12A:
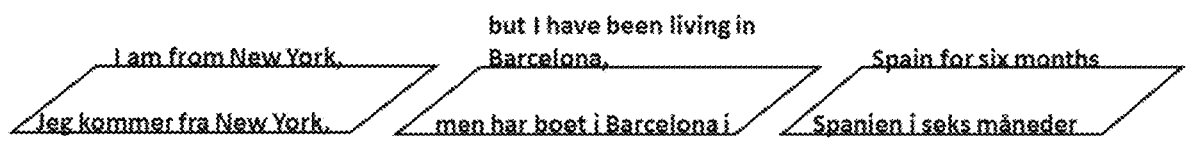
FIGS. 12a-12c shows demarcated substring pairs where the visual demarcations comprise shapes that cause the secondary substrings to appear on a separate perspective plane relative to their corresponding primary substrings, according to an embodiment.

FIG. 12a shows demarcated substring pairs, according to an embodiment. Danish primary substrings and English secondary substrings border parallelogram demarcations. The demarcations comprise shapes that cause the secondary substrings to appear on a separate perspective plane relative to their corresponding primary substrings. Such shapes may include, but are not limited to, shapes with at least one sloped edge such as a parallelogram or trapezoid.

Figure 12B:
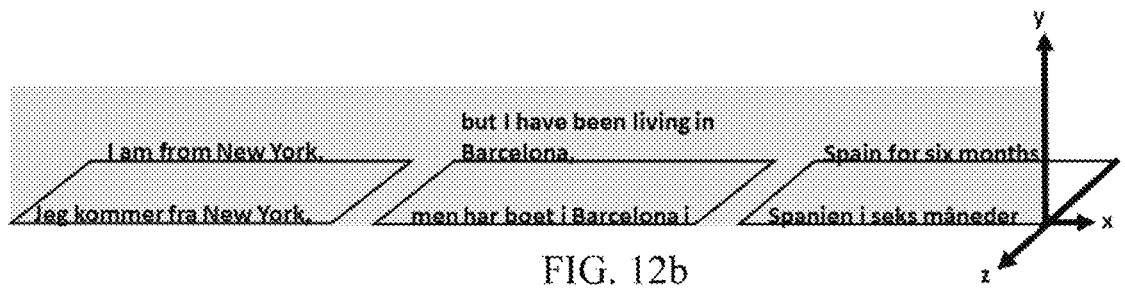
Figure 12C:
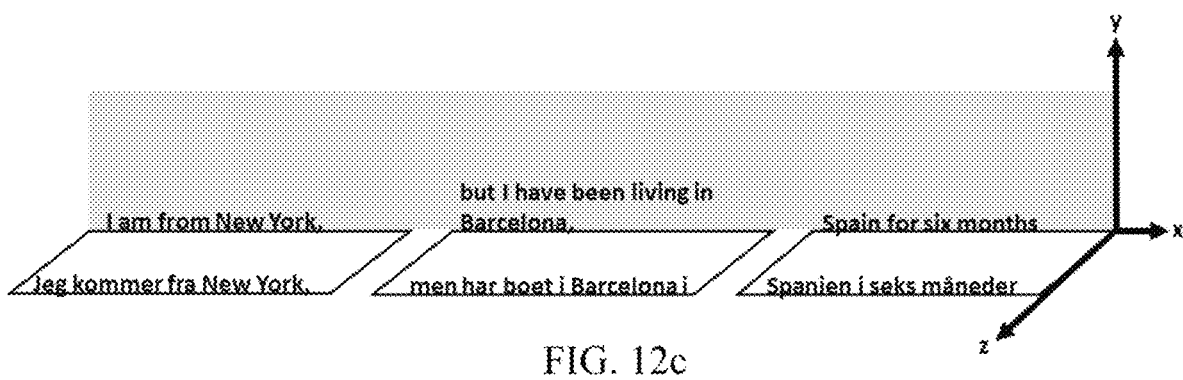

As shown in FIG. 12b, the primary substrings are caused to appear on a forward perspective plane due to bordering a bottom edge of the parallelogram demarcations, and, as shown in FIG. 12c, the secondary substrings are caused to appear on a recessed perspective plane due to bordering a top edge of the parallelogram demarcations. At a glance, causing the secondary substrings to appear on a recessed perspective plane deemphasizes the secondary substrings relative to the primary substrings, reducing visual and mental fatigue for readers focusing on the primary substrings.

FIG. 13 shows demarcated substring pairs, according to an embodiment. Danish primary substrings and English secondary substrings overlap trapezoid demarcations. For each substring pair, the visual demarcations border or overlap only one of the substrings. At a glance, such visual demarcation placements delineate paired substrings from each other. Any other such mechanism/means to create substring pairs and visually demarcate them through any representation including, but not limited to a boundary, a shape, or a color-based demarcation is well within the scope of the present disclosure.

In another exemplary implementation, a system of the present disclosure can allow configuration/definition/modification of any rule based on which the demarcation would take place. For instance, apart from logical phrase-based demarcation, noun/verb/adjective-based (i.e. the substring would be formed based on whenever a noun is identified, for instance), or specific character-based demarcation can also be defined and undertaken, so as to allow a user to define how he/she would like to see the demarcated sections of pair of substrings. All such variations based on required use cases in different application areas are therefore well within the scope of the present invention.

Figure 14:
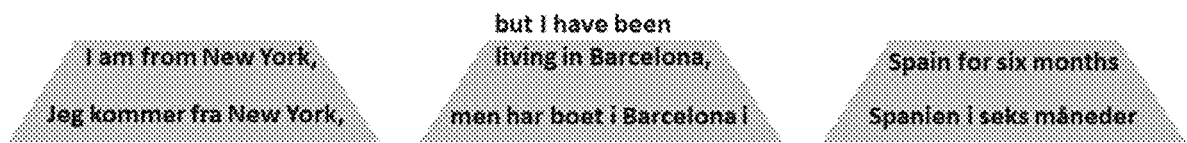
FIG. 14 shows demarcated substring pairs where the visual demarcations border or overlap both of the substrings.

FIG. 14 shows demarcated substring pairs, according to an embodiment. Danish primary substrings and English secondary substrings overlap trapezoid demarcations. The visual demarcations border or overlap both substrings in each substring pair. At a glance, such visual demarcation placements associate paired substrings with each other.

FIG. 15 shows demarcated substring pairs, according to an embodiment. English secondary substrings are placed above Danish primary substrings that overlap trapezoid demarcations. The topmost point of each visual demarcation overlaps a lower substring in a substring pair. At a glance, such visual demarcation placement causes the visual demarcations to act as a platform, drawing a reader's attention to the platformed substrings.

Figure 16:
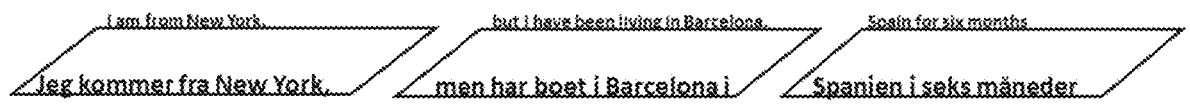
FIG. 16 shows demarcated substring pairs where the font size of each secondary substring is smaller than the font size of its corresponding primary substring, according to an embodiment.

FIG. 16 shows demarcated substring pairs, according to an embodiment. Danish primary substrings and English secondary substrings border parallelogram demarcations where the font size of each English secondary substring is smaller than the font size of its corresponding Danish primary substring. At a glance, using smaller font sizes for the secondary substrings deemphasizes the secondary substrings relative to the primary substrings, reducing visual and mental fatigue for readers focusing on the primary substrings.

Figure 17:
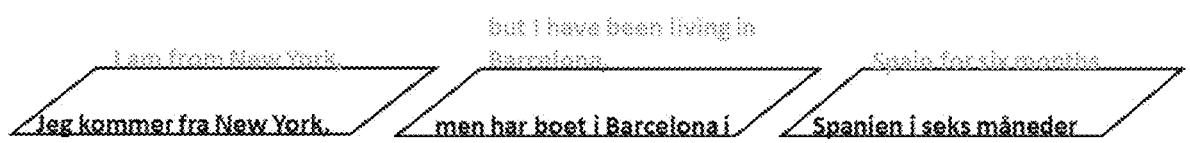
FIG. 17 shows demarcated substring pairs where each secondary substring has a lighter shade than its corresponding primary substring, according to an embodiment.

FIG. 17 shows demarcated substring pairs, according to an embodiment. Danish primary substrings and English secondary substrings border parallelogram demarcations where each English secondary substring has a lighter shade than its corresponding Danish primary substring. At a glance, using lighter shades for the secondary substrings deemphasizes the secondary substrings relative to the primary substrings, reducing visual and mental fatigue for readers focusing on the primary substrings. This could be accomplished by decreasing the brightness values for the pixels that comprise the secondary substring.

FIG. 18 shows demarcated substring pairs, according to an embodiment. Danish primary substrings and English secondary substrings overlap non-elliptical line demarcations. One arm of each non-elliptical line demarcation overlaps a primary substring and a second arm of each non-elliptical line demarcation overlaps a secondary substring. At a glance, such visual demarcations simultaneously delineate and associate substrings within substring pairs.

FIG. 19 shows demarcated substring pairs, according to an embodiment. Hebrew primary substrings and English secondary substrings overlap quadrilateral demarcations 1900 1902 1904. Furthermore, a rectangular demarcation 1910 overlaps each of the primary substrings. Alternatively, a visual demarcation may overlap each of the secondary substrings. At a glance, by overlapping multiple primary substrings, such visual demarcations associate adjacent primary substrings with each other. Such visual demarcations may also indicate a superstructure of multiple string pairs such as phrases or sentences.

Figure 20:
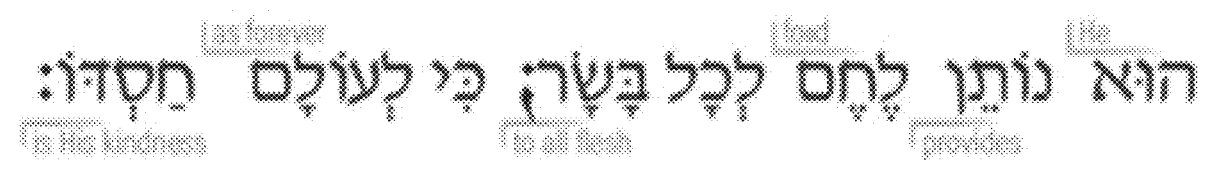

FIG. 20 shows demarcated substring pairs, according to an embodiment. Hebrew primary substrings and English secondary substrings overlap the shadow-outlined edges of an implied transparent oblique parallelogram.

Figure 21:
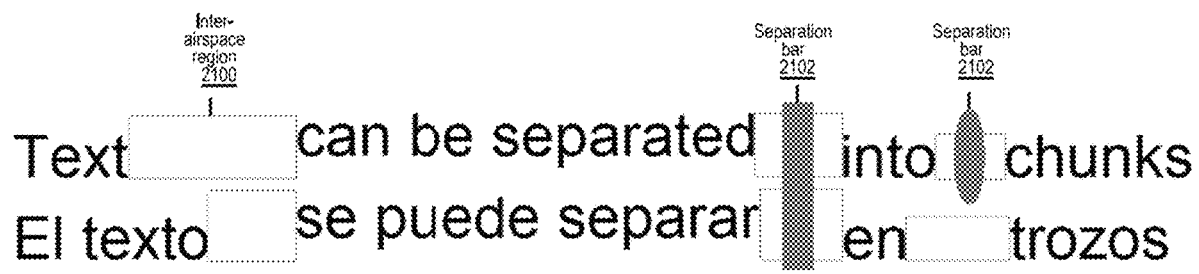

In an aspect, as illustrated in FIG. 21, visual demarcation can be configured through an inter-airspace region 2100 that can be configured as a rectangular space in between adjacent text segments. The left edge of each inter-airspace region can be immediately to the right of the rightmost point of the text segment to its left, the right edge of each inter-airspace region is immediately to the left of the leftmost point of the text segment to its right, the top edge of each inter-airspace region is flush with the higher of one of the top edge of the text segment to its left and the top edge of the text segment to its right, and the bottom edge of each inter-airspace region is flush with the lower of one of the bottom edge of the text segment to its left and the bottom edge of the text segment to its right. As illustrated in FIG. 21, one of the inter-airspace regions is located in between the text segment "Text," and the text segment "can be separated." The left edge of the inter-airspace region can be immediately to the right of the rightmost point of the "t" in "Text," the right edge of the inter-airspace region 2100 is immediately to the left of the leftmost point of the "c" in "can," the top edge of the inter-airspace region 2100 is flush with the topmost points of the "b," "t," and "d," in "can be separated," and the bottom edge of the inter-airspace region 2100 is flush with the bottommost points of the "T," "e," "x," and "t," in "Text." Inter-airspace regions can be left empty or filled with separation bars to achieve different purposes, depending on user preference. FIG. 21 further discloses a separation bar 2102 that can be configured as a shaped marker placed in the inter-airspace region of adjacent text segments that can function to distinguish adjacent text segments from each other, where the shaped marker is, for example, but not limited to, a rectangle, line, square, oval, and the like. As illustrated in FIG. 21, one separation bar 2102 is rectangular and enters two inter-airspace regions, and the other separation bar 2102 is oval and enters a single inter-airspace region.

Figure 22K:
Figure 221:
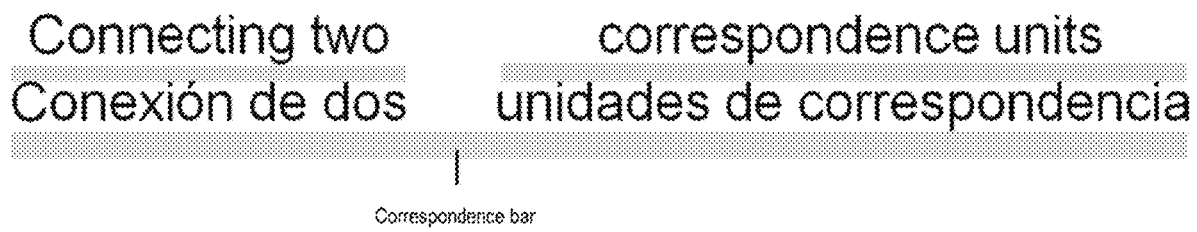
Figure 22M:
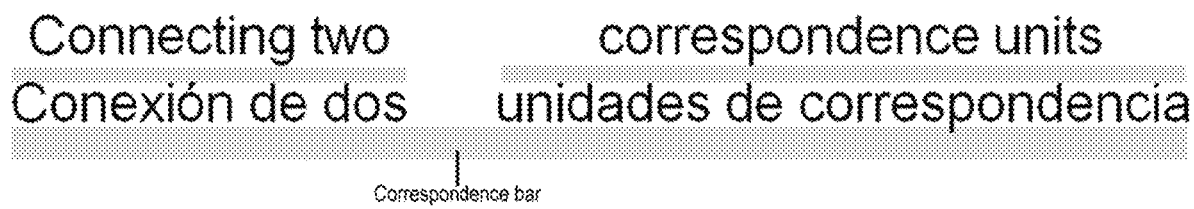
Figure 22N:
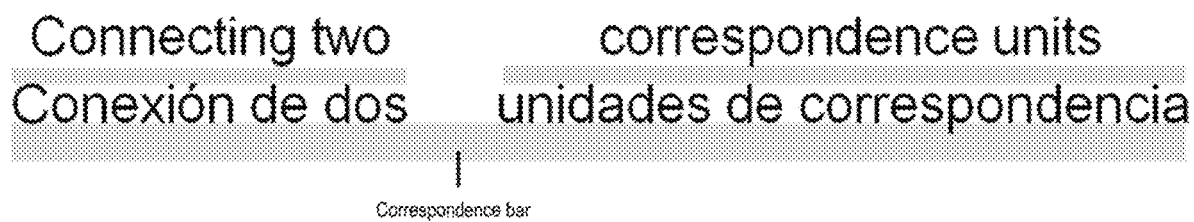
Figure 22O:
Figure 22P:
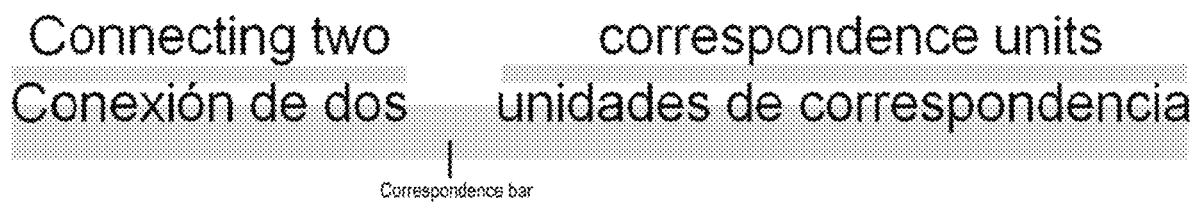
Figure 22S:
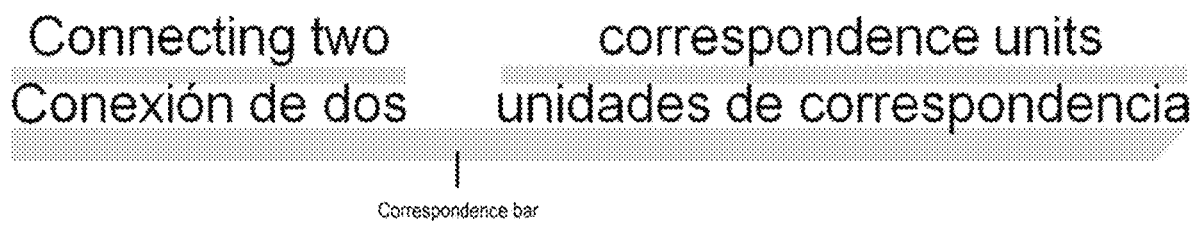
Figure 22T:
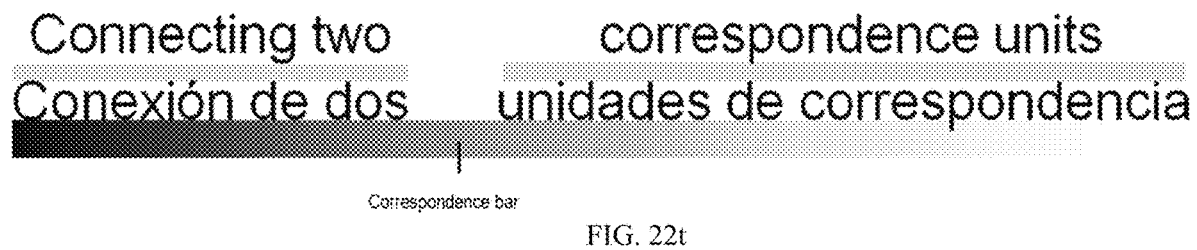
Figure 22U:
Figure 22V:
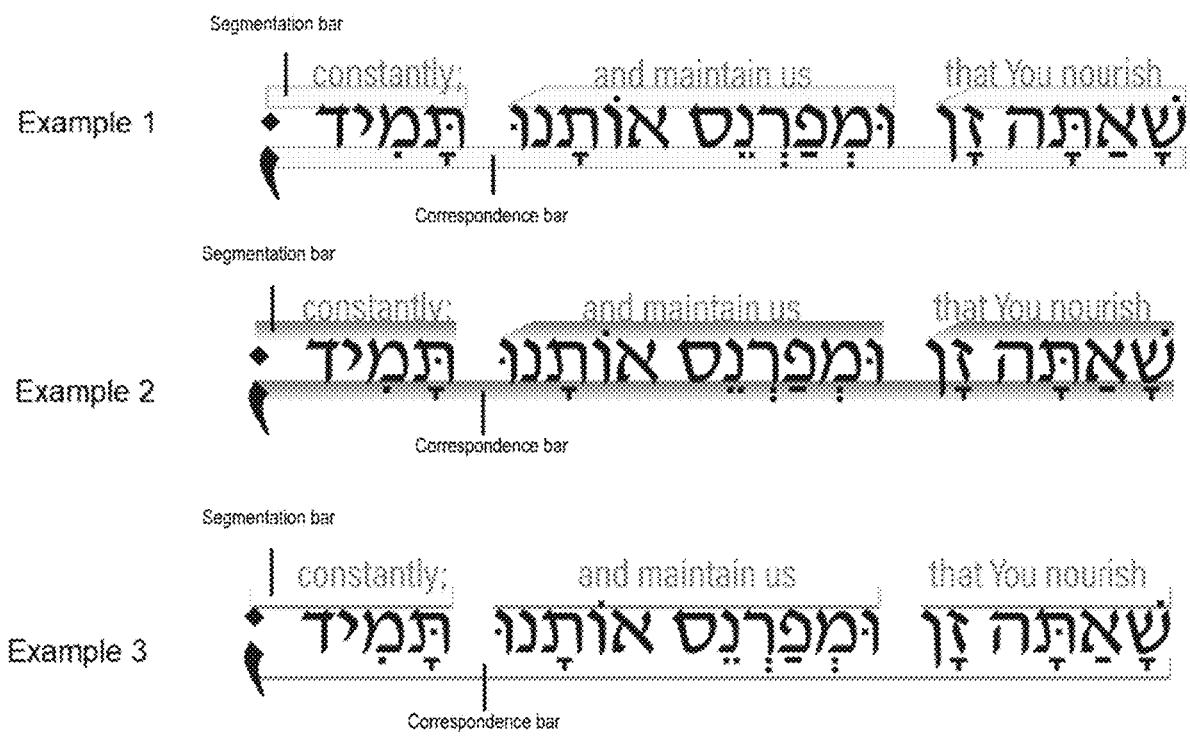
Figure 22Y:
Figure 22Z:

FIGS. 22a-22z illustrate further non-limiting examples of the visual demarcations, all of which are well within the scope of the present disclosure/invention and are also well encompassed within the definition of visual demarcations.

In an aspect, as illustrated, visual demarcation can be created based on one or more segmentation bars to the left of the segmentation bar or another segmentation bar to the right of the segmentation bar, the segmentation bar may be colored, patterned, placed, or otherwise modified such that it is distinct from the other adjacent segmentation bars. For example, as illustrated in the instant figures, a central segmentation bar is distinct because there is empty space in between the bars, creating a clear distinction between the ends of the central segmentation bar and the ends of adjacent segmentation bars. As illustrated in other examples, the central segmentation bar may be distinct because the bottom and top edges of the central segmentation bar are at different levels from the bottom and top edges of adjacent segmentation bars, creating a clear distinction between the ends of the central segmentation bar and the ends of adjacent segmentation bars. The central segmentation bar may further be distinct from adjacent segmentation bars because the bars have different colors, creating a clear distinction between the ends of the central segmentation bar and the ends of adjacent segmentation bars. As illustrated, the central segmentation bar can be distinct because there is non-bar content in between the segmentation bars, creating a clear distinction between the ends of the central segmentation bar and the ends of adjacent segmentation bars. As illustrated in other examples, the central segmentation bar is not distinct from adjacent segmentation bars because there is no clear distinction between the ends of the central segmentation bar and the ends of adjacent segmentation bars.

In another embodiment, at least one segmentation bar can be placed into every other correspondence area. For example, as illustrated in FIG. 22b, there is a segmentation bar in the first correspondence area, no segmentation bar in the second correspondence area, and a segmentation bar in the third correspondence area. In another example, at least one segmentation bar can be placed into at least one-third of correspondence areas. For example, as illustrated in FIG. 22b, there is no segmentation bar in the first correspondence area, a segmentation bar in the second correspondence area, and no segmentation bar in the third correspondence area.

In another embodiment, demarcations include a plurality of segmentation bars and at least one demarcation that delineates a text string pair from at least one other text string pair. For example, vertical dark grey bars delineate text string pairs from each other in example 4 of FIG. 22f. Alternatively, demarcations include a plurality of segmentation bars and at least one demarcation that delineates a text string pair from at least two other text string pairs. The use of segmentation bars and such demarcations in between text string pairs defines substructures and superstructures of the text string. Such demarcations in between text string pairs may appear as punctuation.

In a further embodiment, FIGS. 22a-z towards the end further presents a box-free display of an alternative embodiment in which the segmentation bars and the correspondence bar are transparent and outlined with a light shadow effect. This appearance of the segmentation bars and the correspondence bar makes them less prominent while maintaining the same functionality. Further examples show a top portion of the segmentation bars outlined with a thin line that is darker than the inside of the segmentation bars. This appearance of the segmentation bars improves their ability to act as a platform for the text above them.

Further examples show an alternative embodiment in which a bottom portion of the correspondence bar is outlined with a thin line that is darker than the inside of the correspondence bar. This appearance for the segmentation bars and correspondence bar improves the correspondence between the top and bottom texts.

In an alternative embodiment, any combination of the edges of the segmentation bars and correspondence bar may be outlined with a thin line that is darker than the inside of the segmentation bars and/or the correspondence bar. In an alternative embodiment, the thin line may be any color and/or pattern that is different from the color and/or pattern of the inside of the segmentation bars and/or the correspondence bar.

In another alternative embodiment, all of the edges of the segmentation bars and the correspondence bar can be outlined with a thin line that is darker than the inside of the segmentation bars and/or the correspondence bar. Further examples present a final box-free display of an alternative embodiment in which the segmentation bars and the correspondence bar are gradually faded from bottom to top, indicating that any vertically adjacent correspondence units should be read from bottom to top. In an alternative embodiment, the gradual fading may occur in any direction, indicating that the vertically adjacent correspondence units should be read in the direction of the gradual fade. In an alternative embodiment, a user may select the direction of the gradient based on user preference.

In a further embodiment, the segmentation bars and the correspondence bar can be parallelograms with angled left and right edges, wherein the top right edges of the segmentation bars and the correspondence bar appear to be pointing to the right, which indicates to the reader that the directionality of the top text is to the right while the bottom left edges of the segmentation bars and the correspondence bar appear to be pointing to the left, which indicates to the reader that the directionality of the bottom text is to the left. This effect may be compounded by placing the top texts to the right of the bottom texts as seen here.

Figure 23A:
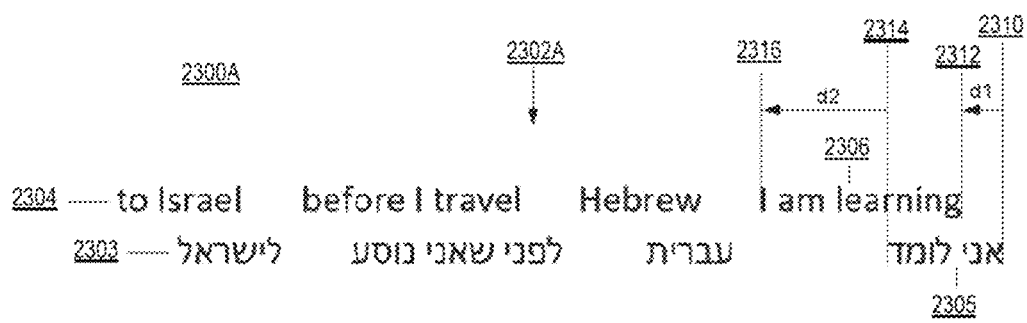
Figure 23B:

FIGS. 23a-23b show a series of exemplary display schemes/formats 2300A-2300B of a primary text string 2303 and a secondary text string 2304 where secondary text segments are offset from their corresponding primary text segments, according to an embodiment. Such offset therefore is indicative of a visual demarcation that enables a pair of substrings to be visually demarcated from each other through different and respective correspondence areas.

FIG. 23a shows a comparative-text display format (CTDF) 2300A that can employ a related text layout 2302A. The text layout 2302A for the CTDF 2300A can include arranging the primary and secondary text segments such that 1) secondary text segments 2306 are one of above and below their corresponding primary text segments 2305 and 2) secondary text segments 2306 are offset relative to their corresponding primary text segment 2305 such that rightmost point 2310 of each secondary text segment is to the left of the rightmost point 2310 of each corresponding primary text segment by at least distance d1 and the leftmost point 2316 of each secondary text segment is to the left of the leftmost point 2314 of each corresponding primary text segments by at least distance d2, where d1 and d2 may be any distance greater than zero. Alternatively, d1 may be any distance greater than zero, and d2 may be a width of at least a syllable of the secondary text segment 2306.

This CTDF 2300A can be used where the primary text has a right-to-left directionality like with Hebrew. In contrast to the prior art, if one attempted to study the Hebrew of FIG. 23a by reading from right to left, he or she would encounter a Hebrew text segment 2305 before the English text segment 2306. Such text arrangements introduce texts one at a time, and in an order that allows a student to read a foreign text segment before deciding whether or not to reference the corresponding native language text segment for a better understanding.

FIG. 23b shows a comparative-text display format (CTDF) 2300B that can employ a related text layout 2302B. The text layout 2302B for the CTDF 2300B can include arranging the primary and secondary text segments such that 1) secondary text segments 2306 are one of above and below their corresponding primary text segments 2305 and 2) secondary text segments 2306 are offset relative to their corresponding primary text segment 2305 such that rightmost point 2312 of each secondary text segment is to the right of the rightmost point 2310 of each corresponding primary text segment by at least distance d1 and the leftmost point 2316 of each secondary text segment is to the right of the leftmost point 2314 of each corresponding primary text segments by at least distance d2, where d1 and d2 are greater than zero. Alternatively, d1 may be greater than zero and d2 may be a width of at least a syllable of the secondary text segment 2306.

This CTDF 2300B can be used where the primary text has a left-to-right directionality like with English. The benefits of CTDF 2300B are similar to those of CTDF 2300A. It should be appreciated that the primary text segments in the primary text string 2303 may be further distinguished from the secondary text segments in the secondary text string 2304 by modifying the text strings. For example, by creating a size discrepancy between the primary and secondary text strings (e.g., the text of primary text string 2303 is larger than the text of secondary text string 2304 in FIG. 23c), by modifying the fonts of the primary and/or secondary text strings (e.g., the text of the primary text string 2303 is bolded in FIG. 23c and the text of the secondary text string 2304 is italicized in FIG. 23d), by modifying the color and/or pattern of the primary and/or secondary text strings (e.g., the color of the text of the secondary text string 2304 is grey in FIG. 23e), or by increasing the spacing in between the primary and secondary text strings (e.g., the secondary text string 2304 is further away from the primary text string 2303 in FIG. 23f than it is in FIG. 23e).

It should be appreciated that skewing (e.g., italicizing) the secondary text string in the reading direction of the primary text string indicates the reading direction of the primary text string. For example, an English primary text skewed to the left is placed above a Hebrew secondary text, which is read right to left. The skew of the English provides a subtle visual cue that complements the reading flow of the Hebrew. This alignment not only visually connects the two text strings but also subtly emphasizes the Hebrew text as the primary focus.

This design offers several advantages:

Enhanced Visual Harmony: The leaning English text creates a visual alignment with the Hebrew text, making the overall design more cohesive and harmonious. This connection between the two languages is particularly effective in bilingual designs where both languages are present but one is prioritized.

Reader Guidance: For readers who are accustomed to left-to-right languages, the leaning English text serves as a directional guide, gently encouraging them to follow the right-to-left reading direction of the Hebrew text. This is especially useful in contexts where readers might be unfamiliar with Hebrew or in mixed-language environments.

Emphasis on Primary Language: By leaning the English text, a type of deemphasis, the design subtly downplays its prominence, allowing the Hebrew text to stand out as the primary element. This helps ensure that the reader's attention is directed towards the Hebrew text, reinforcing its importance.

Figure 23G:
Figure 23H:

FIGS. 23g-23h show a series of display schemes/formats 2300G-2300H of a primary text string 2303 and a secondary text string 2304 where secondary text segments are offset from each other and their corresponding primary text segments, according to an embodiment.

FIG. 23g shows a comparative-text display format (CTDF) 2300G that can employ a related text layout 2302G. The text layout 2302G for the CTDF 2300G can include arranging the primary and secondary text segments such that 1) secondary text segments 2306 are one of above and below each other and their corresponding primary text segments 2305, 2) secondary text segments 2306 that are immediately adjacent to their primary text segments 2305 (e.g., no other secondary text segments in between the secondary text segment and the primary text segment) are offset relative to their corresponding primary text segment 2305 such that rightmost point 2312 of each secondary text segment is to the left of the rightmost point 2310 of each corresponding primary text segment by at least distance d1, the leftmost point 2316 of each secondary text segment is to the left of the leftmost point 2314 of each corresponding primary text segments by at least distance d2, where d1 and d2 may be any distance greater than zero, and 3) secondary text segments 2307 that are immediately adjacent to other secondary text segments 2307 (e.g., not adjacent to a primary text segment 2305) are offset relative to the other secondary text segments 2306 such that the leftmost point 2318 of each secondary text segment 2307 is to the left of the leftmost point 2314 of each other secondary text segment 2306 by at least distance d3. Alternatively, d1 may be any distance greater than zero, and d2 may be a width of at least a syllable of the secondary text segment 2306. Alternatively, d3 may be a width of at least a syllable of the secondary text segment 2307. Alternatively, the direction of the offsets must match the directionality of the associated text strings as will be later discussed.

This CTDF 2300G can be used where the width of the secondary text string 2304 far exceeds the width of the primary text string 2303, requiring several secondary text segments 2306 2307 to be presented for each primary text segment 2305. In contrast to the prior art, if one attempted to study the Hebrew of FIG. 23a by reading from right to left, he or she would encounter a Hebrew text segment 2305 before the English text segment 2306. Such text arrangements introduce texts one at a time, and in an order that allows a student to read a foreign text segment before deciding whether or not to reference the corresponding native language text segment for a better understanding.

FIG. 23h shows a comparative-text display format (CTDF) 2300H that can employ a related text layout 2302H. The text layout 2302H for the CTDF 2300H is similar to the text layout 2302G for the CTDF 2300G but further includes shading or shadows 430 to further distinguish a primary text segment 2305 from secondary text segments 2306 2307.

Figure 24A:
Figure 24C:

FIGS. 24a-24c show a series of display schemes/formats 2400A-2400C of a primary text string 2403 and a secondary text string 2404 where primary text segments and secondary text segments are presented side-by-side parallel to one another, using an offset progression between adjacent lines, according to an embodiment.

FIG. 24a shows a comparative-text display format (CTDF) 2400A that can employ a related text layout 2402A. The text layout 2402A for the CTDF 2400A can include arranging the primary and secondary text segments such that 1) the primary text segments are arranged in a column and the secondary text segments are placed one of right and left of their corresponding primary text segments and 2) each text segment is offset from its immediately previous text segment by a distance d1, where d1 may be greater than zero. Alternatively, d1 may be a width of at least a syllable of a text segment. Offsetting the respective front ends of each text segment may cause the primary text string 2403 and the secondary text string 2404 to be front-aligned such as in FIG. 24a. Alternatively, offsetting the respective back ends of the primary text segments and the respective front ends of the secondary text segments may cause the primary text string 2403 and the secondary text string 2404 to be internally aligned such as in FIG. 24b.

The CTDF 2400A and the CTDF 2400B can be used where the primary and secondary texts have a left-to-right directionality like with English and Spanish. Such text arrangements introduce text segments one at a time in a manner that reduces visual and mental fatigue.

FIG. 24c shows a comparative-text display format (CTDF) 2400C that can employ a related text layout 2402C. The text layout 2402B for the CTDF 2400B is similar to the text layout 2402A for the CTDF 2400A, but further requires the direction of any offset to match the directionality of the associated text string. Here, Hebrew has a right-to-left directionality so the Hebrew text segments are offset to the left of immediately previous Hebrew text segments while English has a left-to-right directionality to the English text segments are offset to the right of immediately previous English text segments.

This CTDF 2400C can be used for primary and secondary texts of any directionality. The benefits of CTDF 2400C are similar to those of CTDF 2400A and CTDF 2400B, but further include an indication of the directionality of a text string based on the offset direction from one text segment to the next.

FIGS. 25a-25d show a series of display schemes/formats 2500A-2500D of a primary text string 2503 and a secondary text string 2504 where primary text segments and secondary text segments are presented side-by-side parallel to one another, using an offset progression between adjacent lines, further aligned using a parallelogram format, according to an embodiment.

Figure 25A:
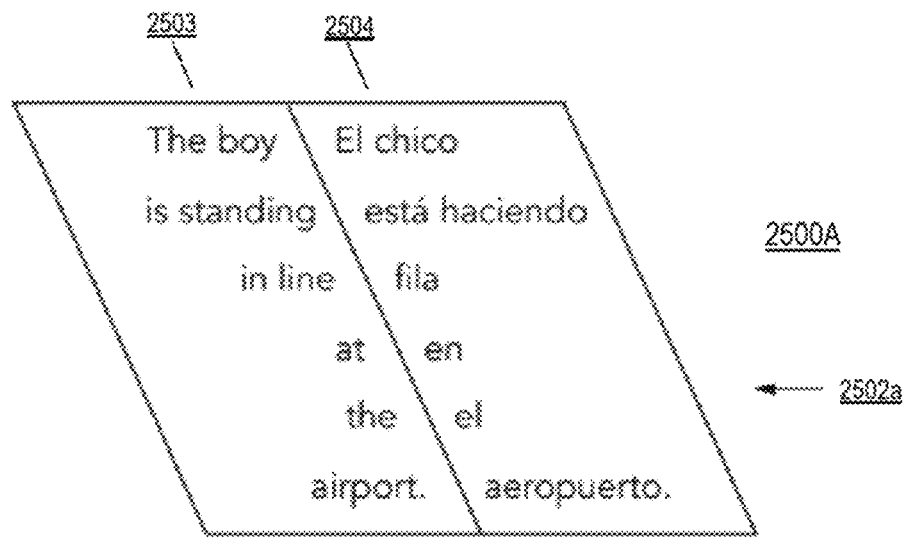

FIG. 25a shows a comparative-text display format (CTDF) 2500A that can employ a related text layout 2502A. The text layout 2502a, like the text layout 2502b, for the CTDF 2500A can include arranging the primary and secondary text segments such that 1) their respective offsets are internally aligned and 2) a bisected parallelogram further distinguishes the primary text string 2503 and the secondary text string 2504. Although the primary text segments 2503 and the secondary text segments 2506 are shown to be internally aligned, they can instead be, for example, front-end or back-end aligned and still employ the bisected parallelogram of this embodiment.

Figure 25B:
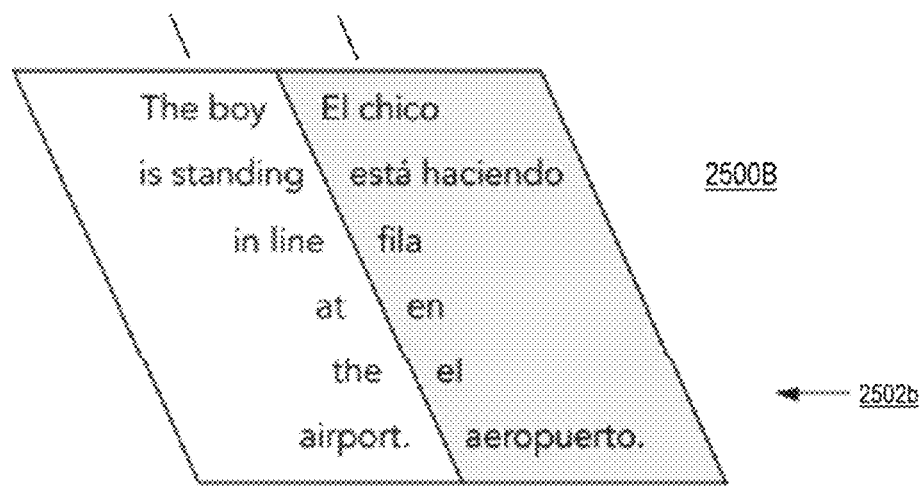

FIG. 25b shows a comparative-text display format (CTDF) 2500B that can employ a related text layout 2502b. The text layout 2502b, like the text layout 2502a, for the CTDF 2500B can include arranging the primary and secondary text segments such that 1) their respective offsets are internally aligned and 2) a bisected parallelogram, the right-hand portion of which is shaded, further distinguishes the primary text string 2505 and the secondary text string 2506. It is to be understood that the shading may instead be employed relative to the left side of the bisected parallelogram and be within the scope of the present system. Although the primary text segments 2505 and the secondary text segments 2506 are shown to be internally aligned, they can be, for example, front-end or back-end aligned and still otherwise employ the shading and bisected parallelogram aspects of this embodiment.

Figure 25C:
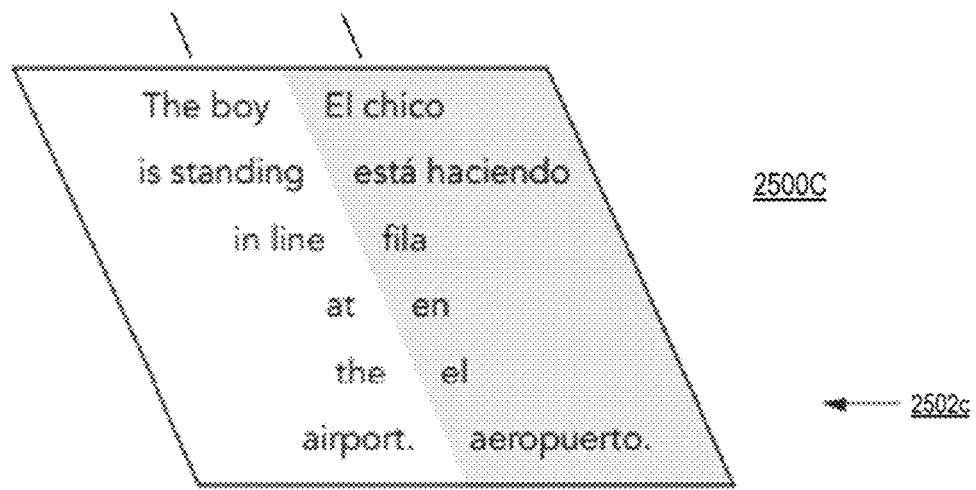

FIG. 25c shows a comparative-text display format (CTDF) 2500C that can employ a related text layout 2502c. The text layout 2502c, like the text layout 2502b, for the CTDF 2500C can include arranging the primary and secondary text segments such that 1) their respective offsets are internally aligned and 2) an outer parallelogram (e.g., no bisection), the right-hand portion of which is shaded (e.g., encompassing the secondary text string 2508), further distinguishes the primary text string 2507 and the secondary text string 2508. It is to be understood that the shading may instead be employed relative to the left side (e.g., encompassing the primary text string 2507) and be within the scope of the present system. Although the primary text segments 2507 and the secondary text segments 2508 are shown to be internally aligned, they can be, for example, front-end or back-end aligned and still otherwise employ the shading and outer parallelogram aspects of this embodiment.

Figure 25D:
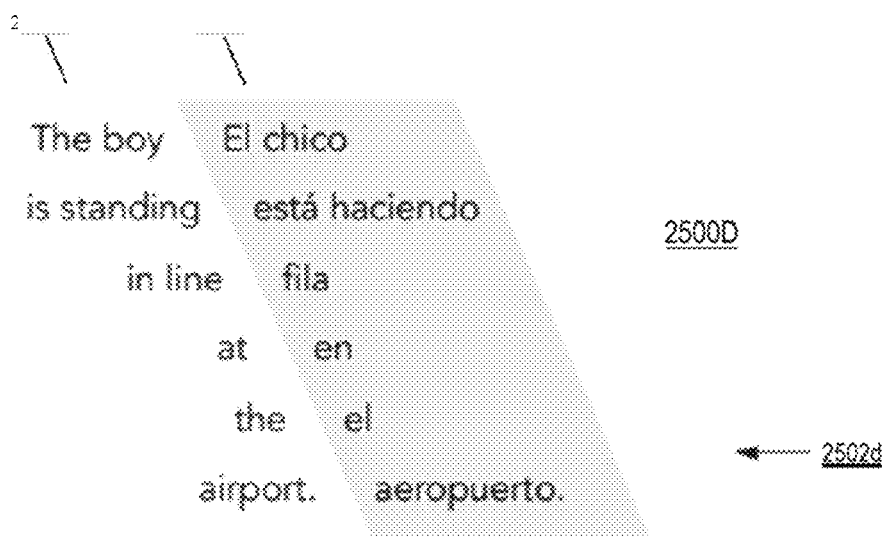

FIG. 25d shows a comparative-text display format (CTDF) 2500D that can employ a related text layout 2502d. The text layout 2502d, like the text layout 2502b, for the CTDF 2500D can include arranging the primary and secondary text segments such that 1) their respective offsets are internally aligned and 2) parallelogram-shaped shading may instead be employed relative to the left side (e.g., encompassing the primary text string 2509), further distinguishing the primary text string 2509 and the secondary text string 2510. It is to be understood that the parallelogram-shaped shading may instead be employed relative to the right side (e.g., encompassing the secondary text string 2510) and be within the scope of the present system. Although the primary text segments 2509 and the secondary text segments 25104 are shown to be internally aligned, they can be, for example, front-end or back-end aligned and still otherwise employ the parallelogram-shaped shading of this embodiment.

FIGS. 26a-26d show a series of display schemes/formats 2600A-2600D of a primary text string 2603 and a secondary text string 2604 where primary text segments and secondary text segments are presented side by side parallel to one another, using an offset progression between vertically adjacent lines of text, where those groups of text are further aligned as using a parallelogram format, with additional lines or shading relative to FIGS. 25a-25d, according to an embodiment.

Figure 26A:
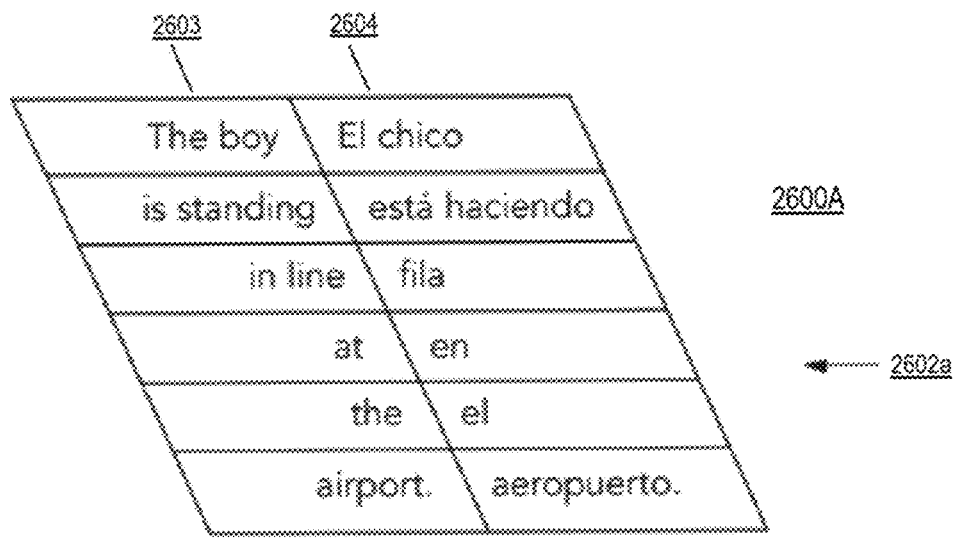

FIG. 26a shows a comparative-text display format (CTDF) 2600A that can employ a related text layout 2602A. The text layout 2602A for the CTDF 122A can include arranging the primary and secondary text segments such that 1) their respective offsets are internally aligned and 2) a bisected parallelogram (i.e., dividing between text on the same horizontal line), along with line-by-line boxing, further distinguishes the primary text string 2603 and the secondary text string 2605 by delineating text segments. Although the primary text segments 2605 and the secondary text segments 2606 are shown to be internally aligned, they can be, for example, front-end or back-end aligned and still otherwise employ the bisected parallelogram and boxing of this embodiment.

Figure 26B:
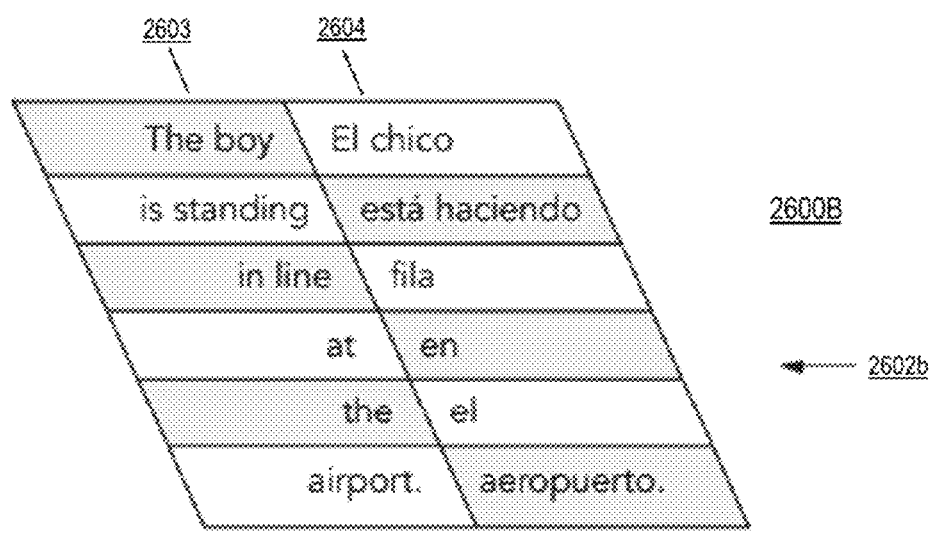

FIG. 26b shows a comparative-text display format (CTDF) 700B that can employ a related text layout 2602B. The text layout 2602B for the CTDF 122B can include arranging the primary and secondary text segments such that 1) their respective offsets are internally aligned and 2) a bisected parallelogram (i.e., dividing between text on the same horizontal line), along with line-by-line boxing and alternating shading (e.g., shading switching between sides of the bisector proceeding between vertically adjacent text segments), further distinguishing the primary text string 703 and the secondary text string 2604 by delineating text segments (e.g., creating a "ladder effect"). Although the primary text segments 2603 and the secondary text segments 706 are shown to be internally aligned, they can be, for example, front-end or back-end aligned and still otherwise employ the bisected parallelogram, boxing, and alternating shading of this embodiment.

Figure 26C:
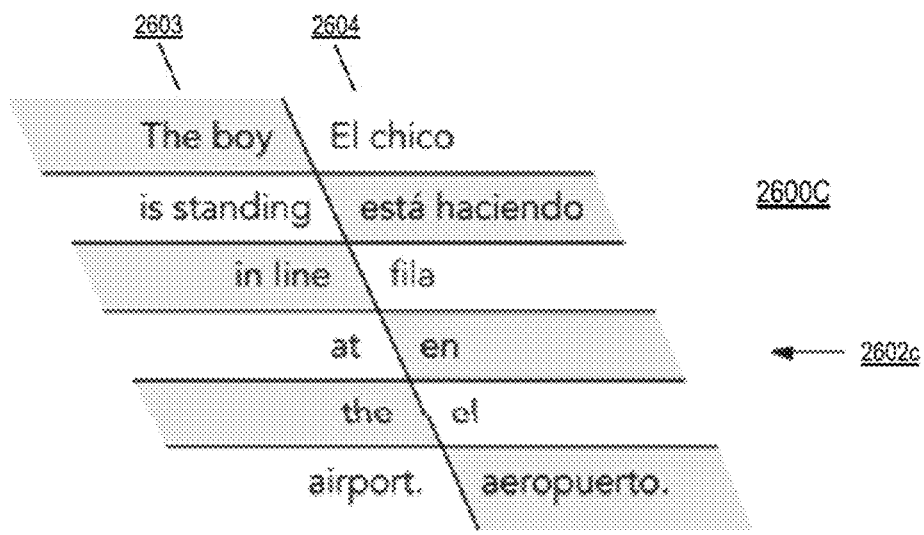

FIG. 26c shows a comparative-text display format (CTDF) 2600C that can employ a related text layout 702C. The text layout 2602C for the CTDF 122C can include arranging the primary and secondary text segments such that 1) their respective offsets are internally aligned and 2) a bisecting line (i.e., dividing between text on the same horizontal line), along with horizontal lining and alternating shading, further distinguishes the primary text string 2603 and the secondary text string 2604 by delineating text segments (e.g., creating a "ladder effect"). Although the primary text segments 2603 and the secondary text segments 706 are shown to be internally aligned, they can be, for example, front-end or back-end aligned and still otherwise employ the bisecting line, horizontal lining, and alternating shading of this embodiment.

Figure 26D:
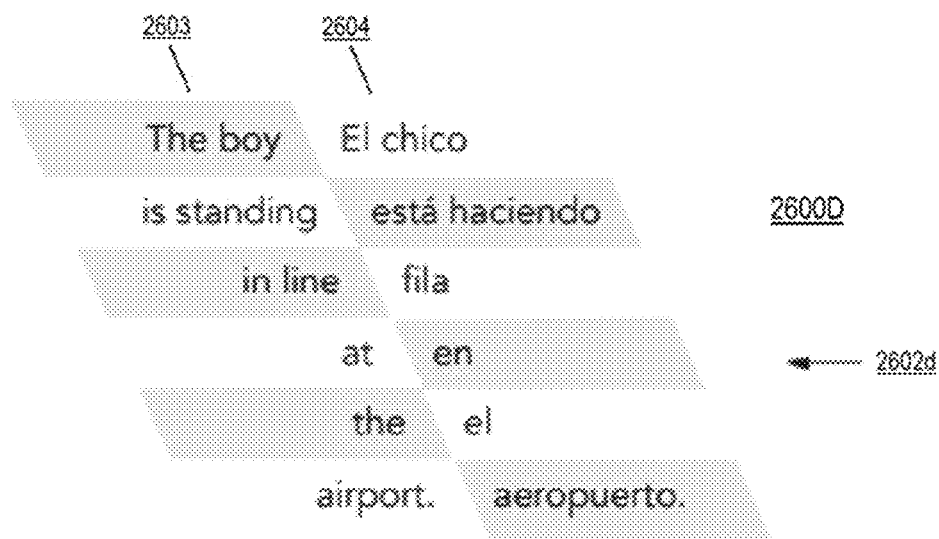
Figure 28E:
Figure 28F:
Figure 29A:
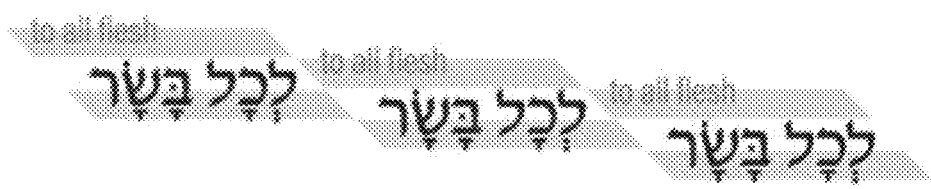
Figure 29B:
Figure 29C:

FIG. 26d shows a comparative-text display format (CTDF) 2600D that can employ a related text layout 2602D. The text layout 2602D for the CTDF 2600D can include arranging the primary and secondary text segments such that 1) their respective offsets are internally aligned and 2) alternating shading further distinguishes the primary text string 2603 and the secondary text string 2604 by delineating text segments (e.g., creating a "ladder effect"). Although the primary text segments 2603 and the secondary text segments 2604 are shown to be internally aligned, they can be, for example, front-end or back-end aligned and still otherwise employ the alternating shading of this embodiment. It is to be understood that shading is not limited to an alternating progression, but, for example, can be used in a full-line alternating pattern (e.g., full-line shaded, next line of horizontal text not shaded), if desired.

FIGS. 27a-27c show a series of display schemes/formats 2700A-2700C of a primary text string 2703 and a secondary text string 2704 where primary text segments and secondary text segments are arranged in an alternating vertical progression, where at least one of the primary or secondary texts 144, 146 incorporates an offset vertical progression.

FIG. 27a shows a comparative-text display format (CTDF) 2700A that can employ a related text layout 802A. The text layout 2702A for the CTDF 2700A can include arranging the primary text segments 2705 and the secondary text segments 2706 in an alternating vertical progression pattern, where the primary text string 2703 (e.g., in this case, the English text) incorporates an offset vertical progression relative to the back (or right) edge of each of its primary text segments 2705, and the secondary text string 2704 (e.g., in this case, the Hebrew text) is vertically aligned relative to the back or right end of each of its secondary text segments 2706. In the embodiment shown, the primary text segments 2705 are moved or offset by one space for each succeeding line of English text, but it is to be understood that another offset may be chosen.

FIG. 27b shows a comparative-text display format (CTDF) 2700B that can employ a related text layout 2702B. The text layout 2702B for the CTDF 2700B is similar to the text layout 2702A for the CTDF 2700A but further includes a placement of secondary text segments 2706 further inset from their corresponding primary text segments 2705, further distinguishing the primary and secondary text strings.

FIG. 27*c* shows a comparative-text display format (CTDF) 2700C that can employ a related text layout 2702C. The text layout 2702C for the CTDF 2700C can include arranging the primary text segments 2705 and the secondary text segments 2706 in an alternating vertical progression pattern, where both the primary text string 2703 (e.g., in this case, the English text) and the secondary text string 2704 (e.g., in this case, the Hebrew text) incorporates an offset vertical progression relative to the back (or right) edge of each of its text segments. In the embodiment shown, the text segments are moved or offset by one space for each succeeding line of text, progressing in a downward fashion. In the illustrated text layout 2702C, the offset is shown to be one space or letter, but it is to be understood that another offset may be chosen. The right/backside alignment lines are provided in FIGS. 27*a*-27*c* to help accentuate the use of text alignment in those embodiments. Those alignment lines are shown respectively in FIGS. 27*a*-27*c* may or may not be included as part of the printed/displayed text layouts 2702A-2702C.

FIGS. 28*a*-28*f* show various CTDFs of a Hebrew text string comprised of Hebrew text segments and a corresponding English text string comprised of English text segments.

Line 1 of FIG. 28*b* shows a CTDF with an uneven spacing between adjacent Hebrew substrings and an uneven spacing between adjacent English substrings, harming the flow of the text from one substring pair to the next. In contrast, line 3 of FIG. 28*b* shows a CTDF with an improved spacing between adjacent Hebrew substrings and an improved spacing between adjacent English substrings, improving the flow of the text from one substring pair to the next.

In an embodiment, the calculation module 318 generates an improved spacing schematic for the primary substrings and/or the secondary substrings. The placement module 320 then places the primary substrings and/or the secondary substrings according to an improved spacing schematic.

In an embodiment, the calculation module 318 generates the improved spacing schematic by 1) determining the total spacing between the primary substrings and/or the secondary substrings, 2) determining the total number of spaces in between the primary substrings and/or the secondary substrings, and 3) calculating the average spacing in between the primary substrings and/or the secondary substrings, and 4) generating an improved spacing schematic where the primary substrings and/or the secondary substrings are spaced apart by the average spacing. Alternatively, the calculation module generates the improved spacing schematic using any formula or method that improves the flow of the text from one substring pair to the next when the primary substrings and/or the secondary substrings are placed according to the improved spacing schematic.

FIGS. 29*a*-29*f* show various CTDFs of a Hebrew text string comprised of Hebrew text segments and a corresponding English text string comprised of English text segments.

Figure 30A:
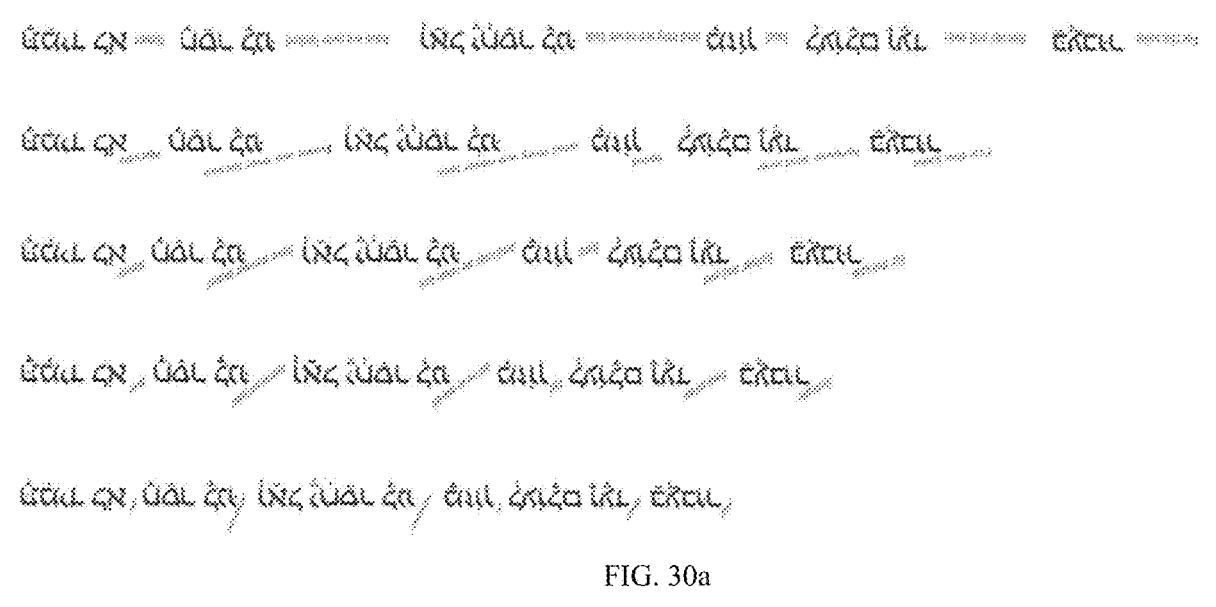

FIG. 30*a* shows a gradual deemphasis of secondary text segments in each consecutive iteration, starting from the bottom and moving upwards.

Figure 30B:
Figure 32A:
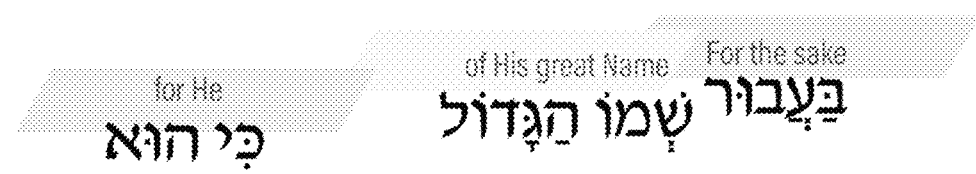
Figure 32B:
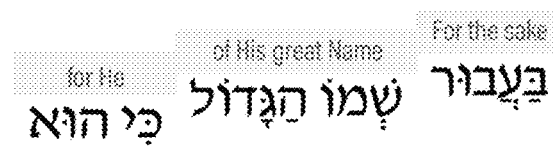
Figure 32C:
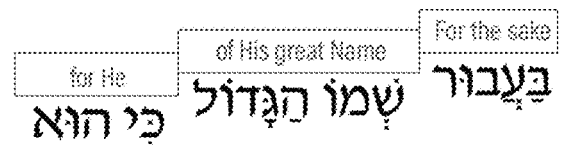
Figure 32D:
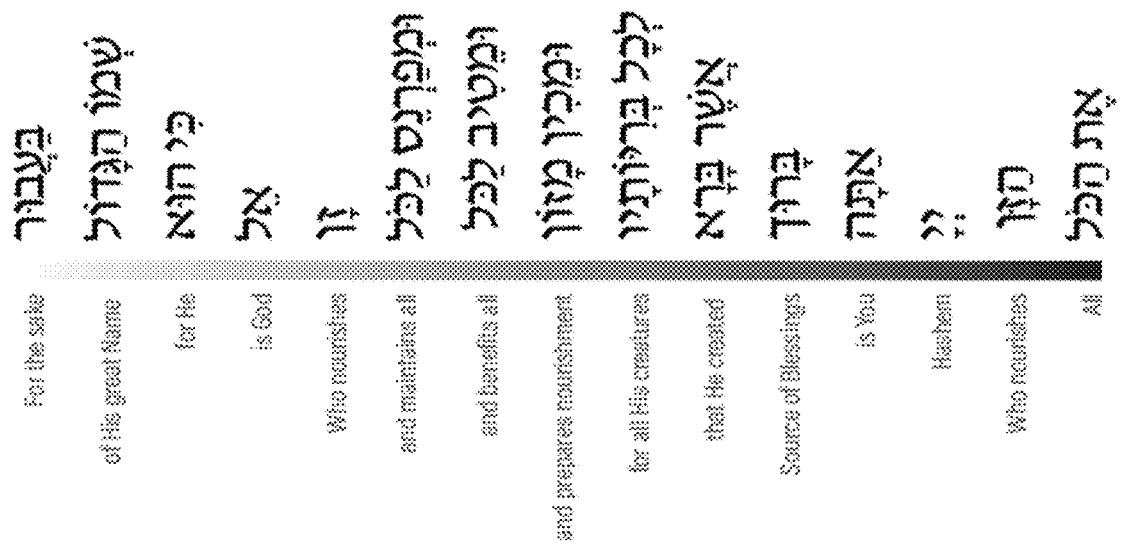
Figure 32E:
Figure 32F:
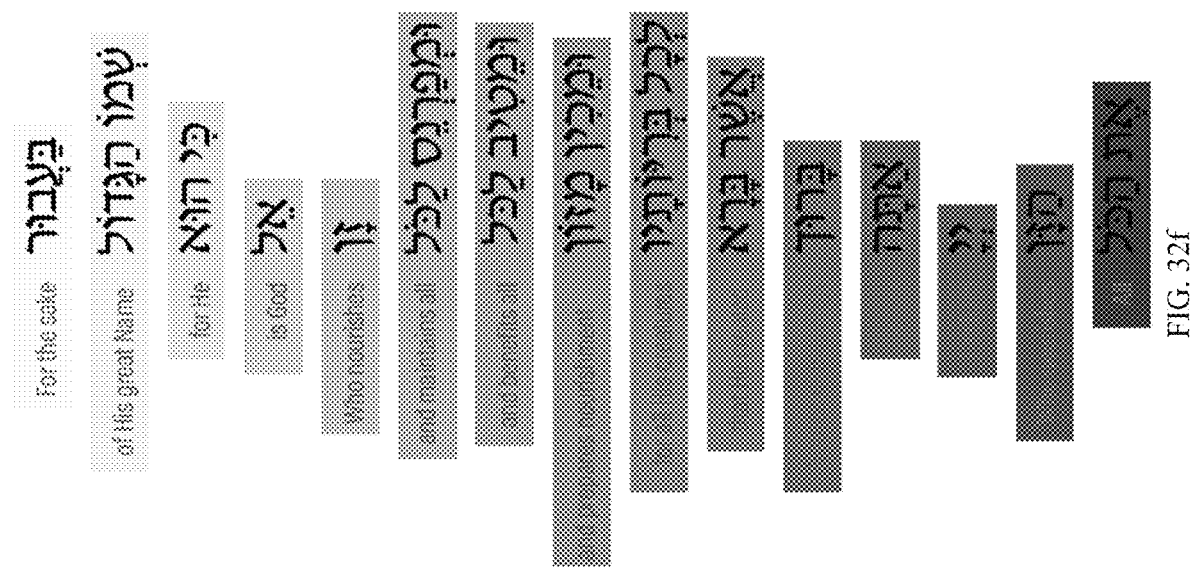
Figure 32G:
Figure 32H:
Figure 32I:
Figure 32J:
Figure 32K:
Figure 321:
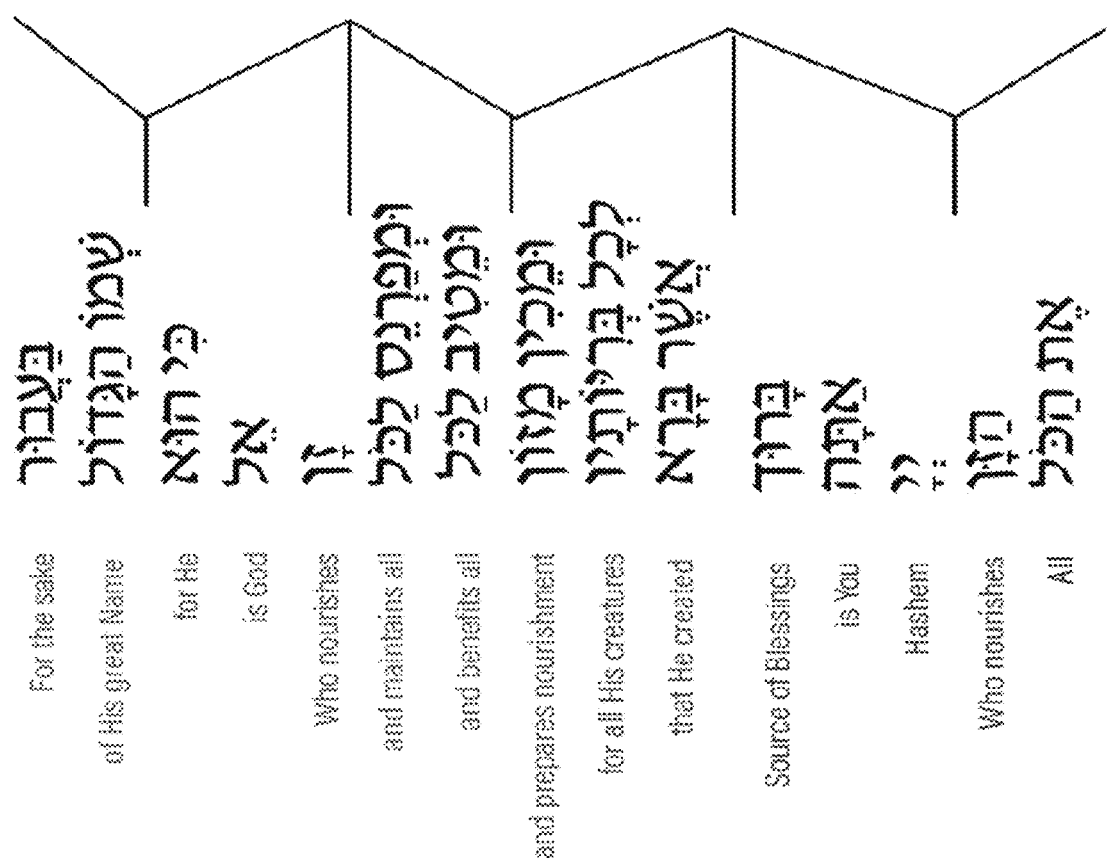
Figure 32M:
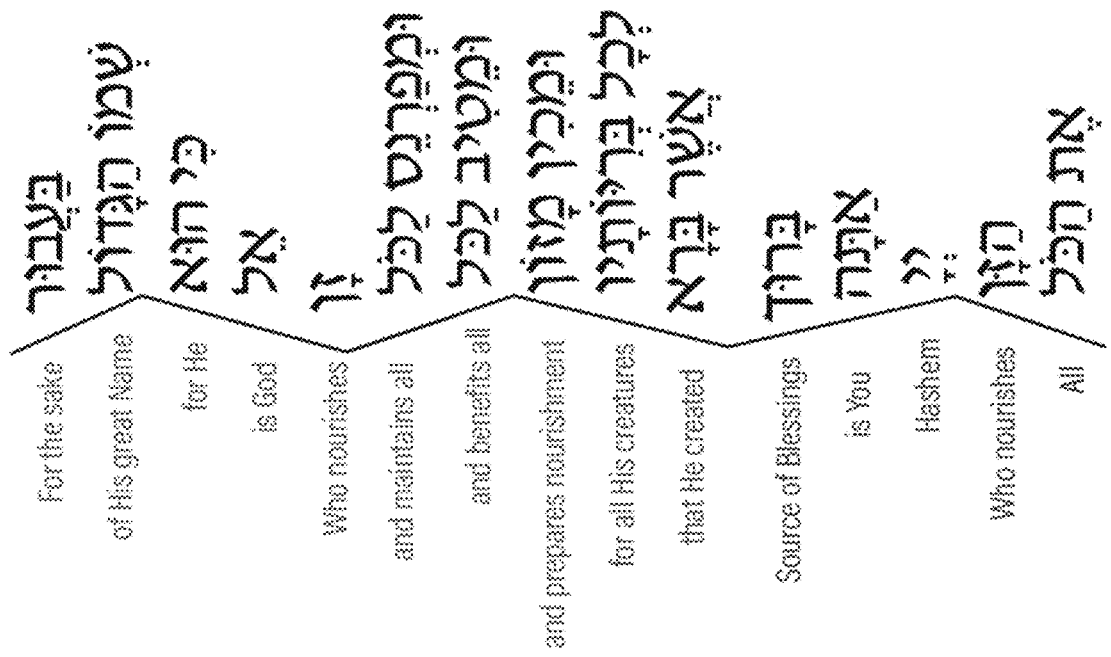
Figure 32N:
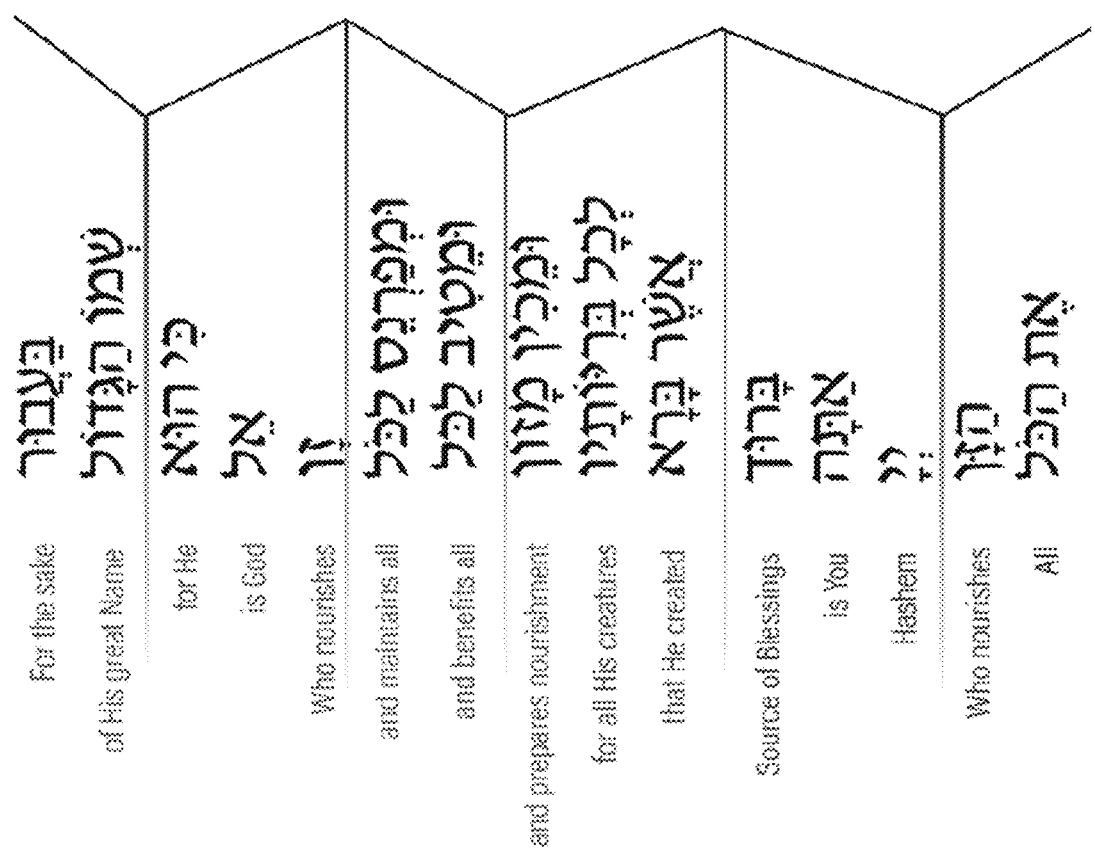
Figure 33E:
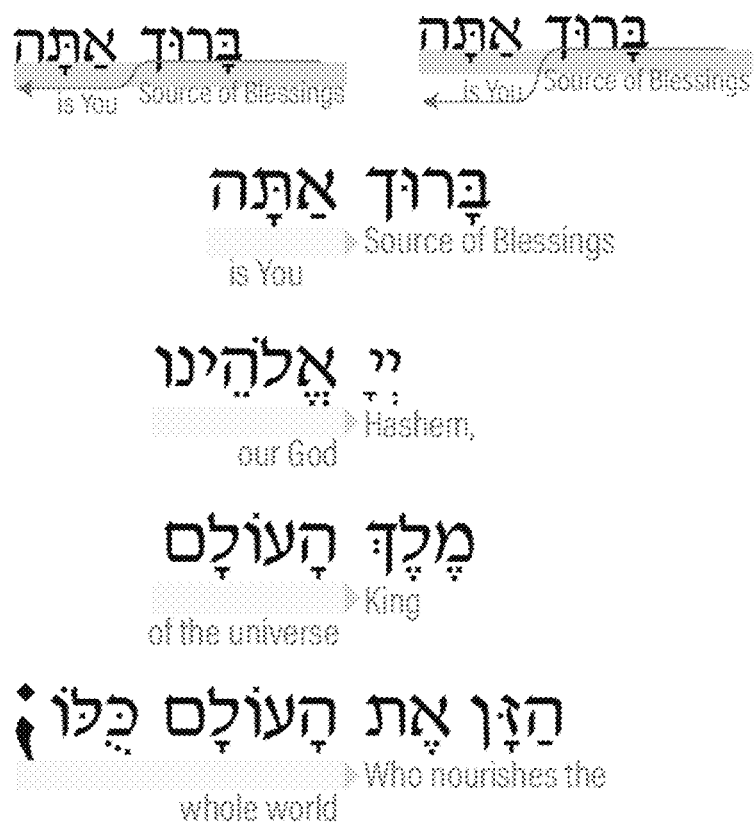
Figure 34A:
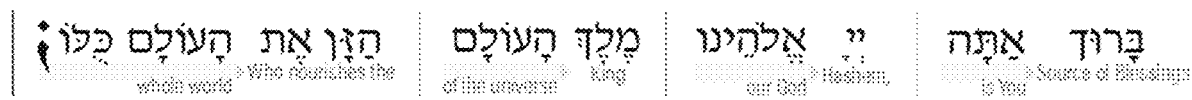
Figure 34B:
Figure 35A:
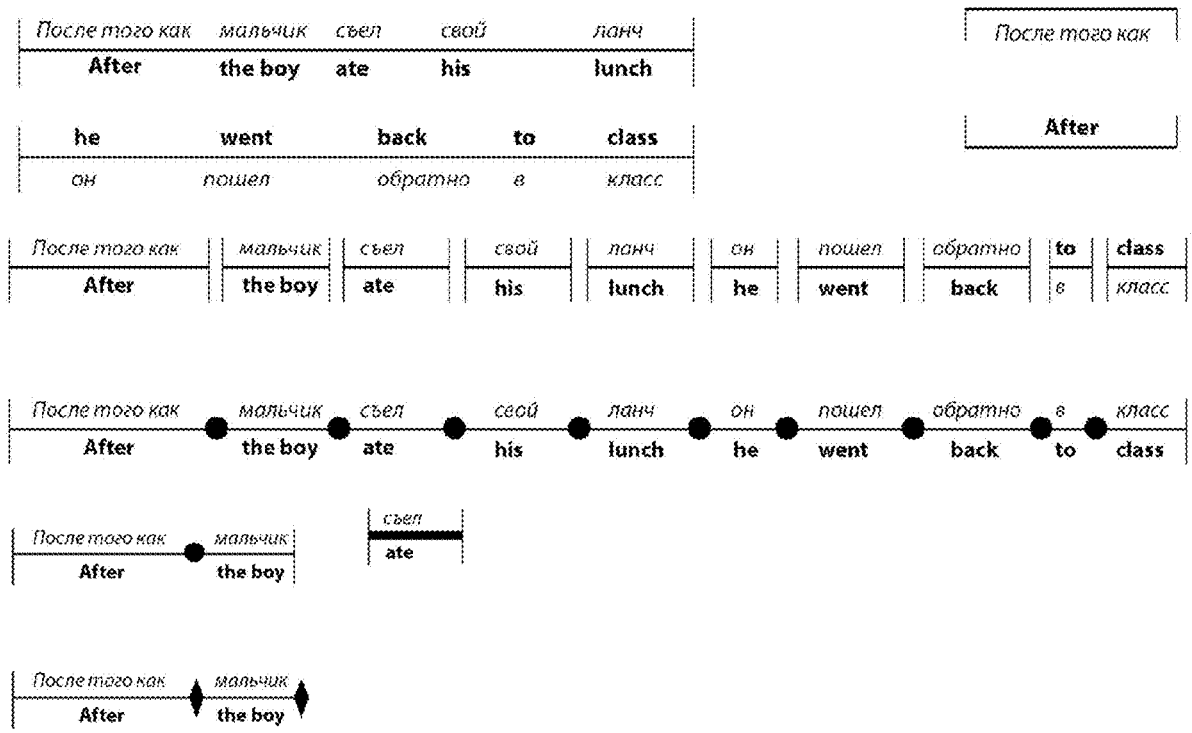
Figure 35B:
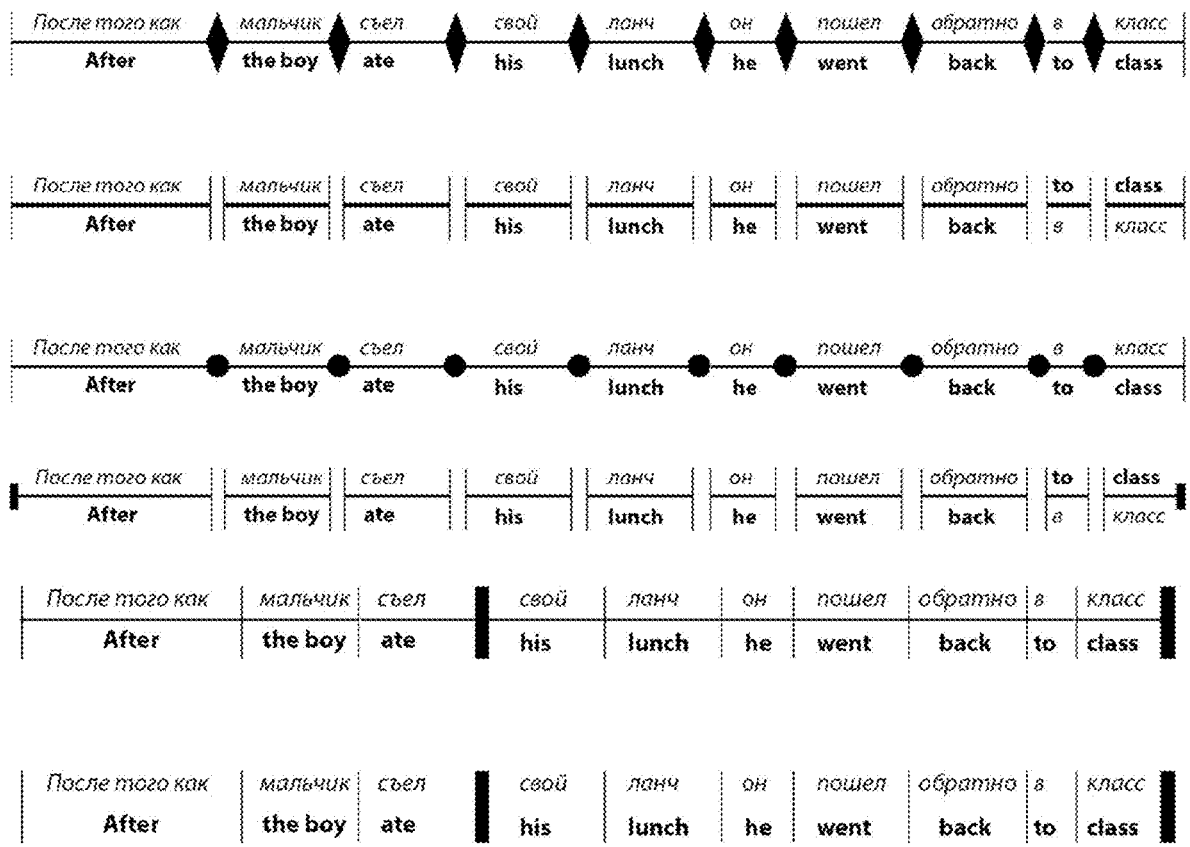
Figure 36C:
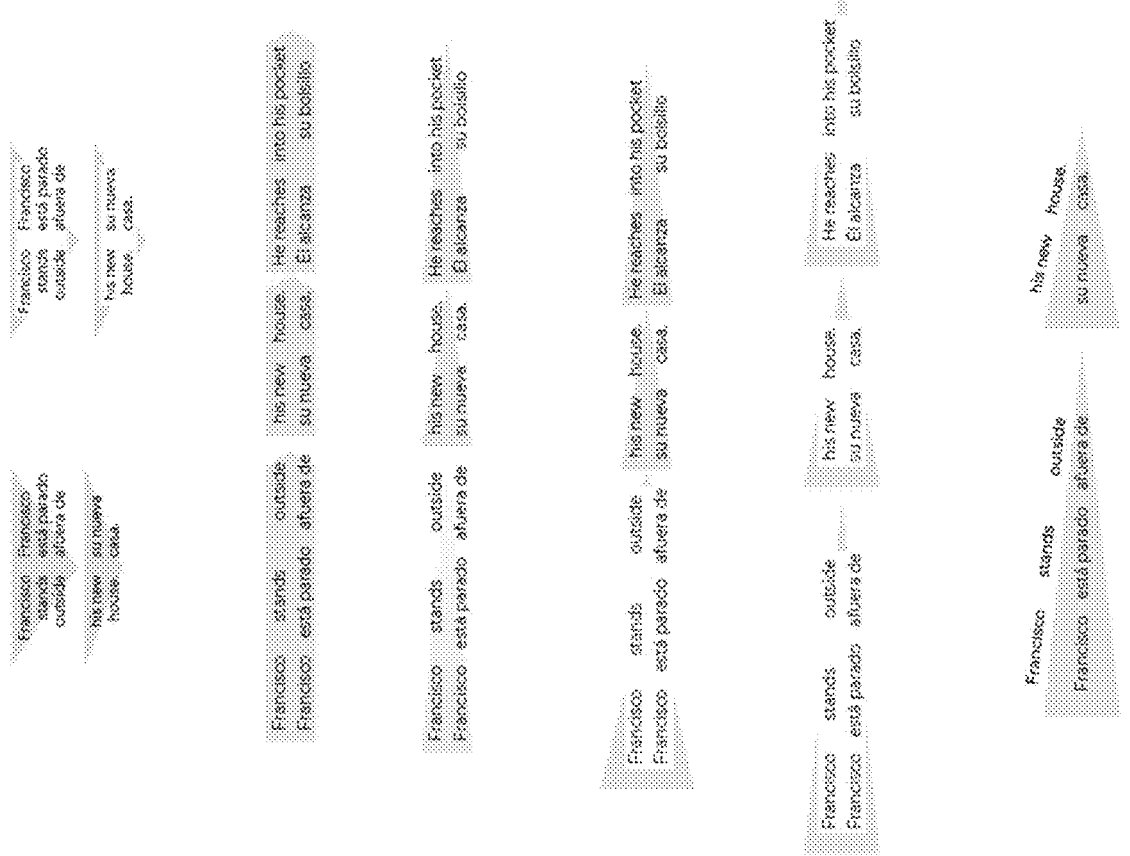
Figure 36D:
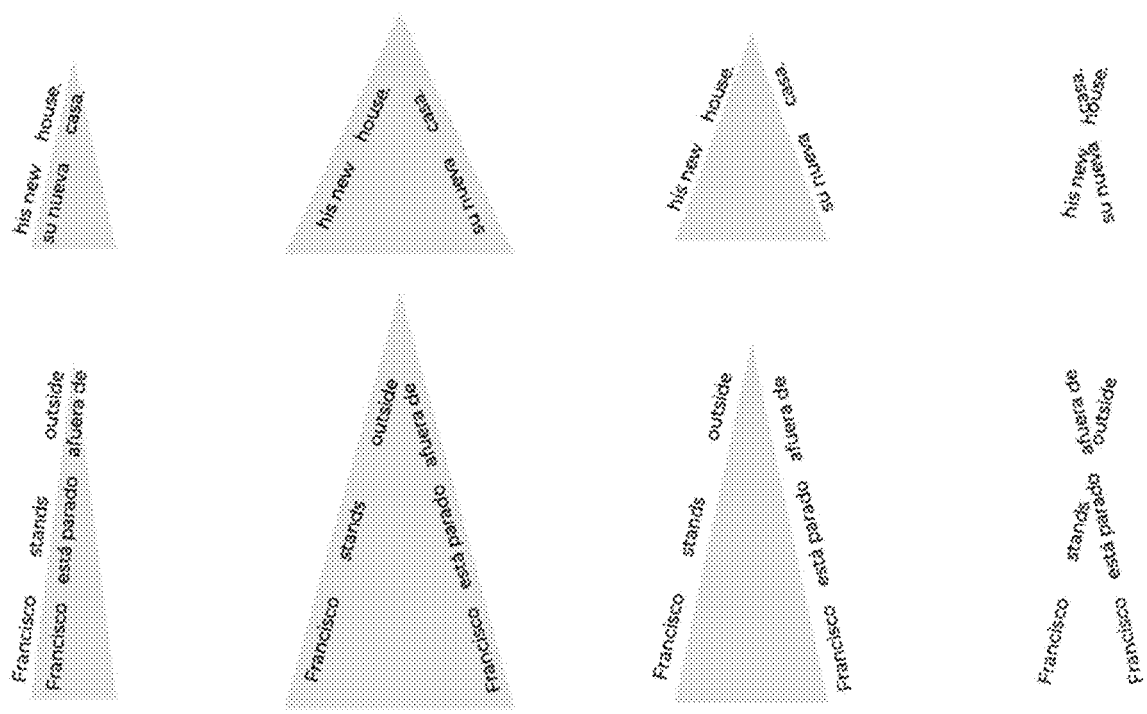
Figure 36E:

FIG. 30*b* shows a CTDF of a Hebrew text string comprised of Hebrew text segments and a corresponding English text string comprised of English text segments.

FIG. 30*c* shows a gradual deemphasis of secondary text segments for each pairing of corresponding primary and secondary text segments, starting from the right and moving left.

FIGS. 31*a*-31*b* show various CTDFs of a Hebrew text string comprised of Hebrew text segments and a corresponding English text string comprised of English text segments.

FIGS. 32-40 show further exemplary representations indicating how visual demarcations can be configured between and/or with respect to the pair of substrings in an exemplary and non-limiting aspect of the present invention.

Example 1 in FIG. 37*a* shows a display of primary substrings, secondary substrings and shaped markers. The left edge of the c-th shaped marker must be flush or to the left of the further left of the leftmost point of the first substring and the leftmost point of the second substring in the c-th substring pair and the right edge of the c-th shaped marker must be flush or to the right of the further right of the rightmost point of the first substring and the rightmost point of the second substring in the c-th substring pair. Alternatively, he left edge of the c-th shaped marker must be to the left of the further left of the leftmost point of the first substring and the leftmost point the second substring in the c-th substring pair and the right edge of the c-th shaped marker must be to the right of the further right of the rightmost point of the first substring and the rightmost point of second substring in the c-th substring pair.

Example 2 in FIG. 37*a* shows a display of primary substrings, secondary substrings and shaped markers. The left edge of the c-th shaped marker must be flush or to the left of the further right of the leftmost point of the first substring and the leftmost point of the second substring in the c-th substring pair and the right edge of the c-th shaped marker must be flush or to the right of the further left of the rightmost point of the first substring and the rightmost point of the second substring in the c-th substring pair. Alternatively, the left edge of the c-th shaped marker must be to the left of the further right of the leftmost point of the first substring and the leftmost point of the second substring in the c-th substring pair and the right edge of the c-th shaped marker must be to the right of the further left of the rightmost point of the first substring and the rightmost point of the second substring in the c-th substring pair. Alternatively, the left edge of the c-th shaped marker must be between the leftmost point of the first substring and the leftmost point of the second substring in the c-th substring pair and the right edge of the c-th shaped marker must be between the rightmost point of the first substring and the rightmost point of the second substring in the c-th substring pair.

Figure 37B:
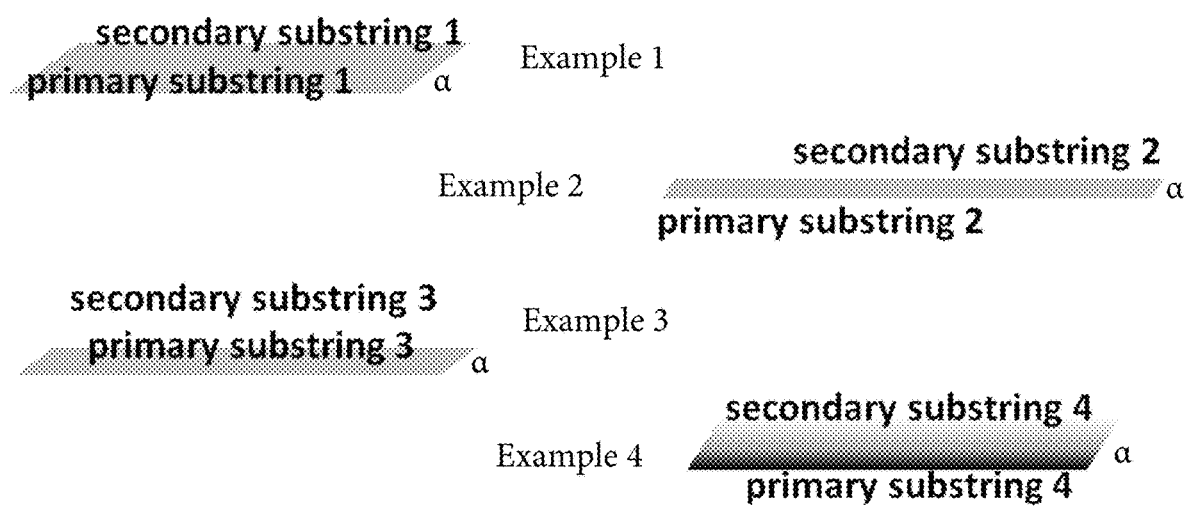

Examples 1-4 of FIG. 37*b* show a substring pair and a corresponding shaped marker. Left and right edges of the shaped marker are skewed such that the angle $\alpha$ between the left and/or right edges and the horizon is in between 5-85 degrees, preferably 45 degrees (such as in examples 1 and 3). Alternatively, angle $\alpha$ can be 15 degrees, 30 degrees, 60 degrees (such as in examples 2 and 4), 75 degrees, less than 15 degrees, less than 30 degrees, less than 45 degrees, less than 60 degrees, less than 75 degrees, greater than 15, greater than 30, greater than 45 degrees, greater than 60 degrees, greater than 75 degrees, etc. Yet alternatively, angle $\alpha$ can be chosen based on the position of the shaped marker and the positions of the substrings within the substring pair such that the substring pair is separated into two visual layers, making one of the substrings appear on a different visual plane from the other. This effect is achieved through several visual elements. First, the geometric shape acts as a divider (such as in example 2), and if it has distinct thickness or shading, it can create the illusion that one text string is either closer to the viewer or further away, depending on how the shape interacts with the text. For example, placing a parallelogram in between the substrings or below the lower substring will cause the lower substring to appear on a visual plane that is closer to the reader. Shading and lighting play a crucial role as well; a gradient (such as in example 4), shadow, or highlight on the shape can enhance the 3D effect by making the substring above the shaped float, while the other substring appears on a recessed visual plane.

Furthermore, the effect of occlusion, where part of the shape overlaps with one of the text strings, can intensify the 3D appearance by creating a sense of depth. The text that is partially obscured by the shape will appear to be behind it, while the fully visible text seems to be in front. The orientation and position of the shape also contribute to the effect; for example, a slightly tilted or angled shape can give the impression that one text string is on a plane angled relative to the other, further enhancing the depth illusion. Additionally, using contrasting colors between the geometric shape and the text strings reinforces the separation of planes, with a darker shape making the upper text string appear closer and a lighter shape causing the lower text to recede. In summary, the 3D effect is created by manipulating these visual elements—layering, shading, occlusion, and color—to make the viewer perceive one text string as being on a different visual plane from the other, with the geometric shape acting as the key element that separates these planes and enhances the depth perception.

The 3D effect of having one language appear as if it is sitting on a platform, using the parallelogram design, offers several unique benefits that can significantly enhance the reading experience in an interlinear translation. The use of light grey bars provides a clear visual separation between the two languages, reducing visual clutter and making it easier for readers to distinguish between the texts. The visual hierarchy created by the 3D effect makes the primary language more prominent, helping readers quickly identify and focus on the primary language text before looking at the translation. This guiding effect naturally leads the reader's eye to start with the primary text, improving the flow and reducing the cognitive load required to switch between languages.

The 3D appearance and distinct visual layer for the primary language also create a clear separation between the two texts, preventing them from blending together and making it easier to read and understand each language independently. By effectively separating the texts, the design reduces visual clutter, which is particularly beneficial for complex texts that require careful reading. This structured reading path aids in better comprehension and retention of the material, as the 3D effect encourages a logical flow from the primary text to the translation. The different visual dimensions serve as a cognitive cue, helping readers mentally distinguish between the original text and its translation, which can be especially useful in educational contexts.

The 3D effect also offers aesthetic and psychological benefits. It adds a modern and aesthetically pleasing element to the text layout, making the reading experience more enjoyable and increasing motivation to read and study the material. The perception of depth makes the text layout appear more dynamic and less monotonous, reducing visual fatigue during prolonged reading sessions. Additionally, the 3D platform effect aids in intuitive navigation between the primary text and the translation, making it easier to find corresponding sections in both languages. This is particularly useful in educational texts, where learners can prioritize the primary language while still having clear access to the translation when needed, enhancing the learning process.

FIG. 37c shows substring pairs on a webpage, in accordance with one embodiment of the present invention.

Example 1 shows the English secondary substring "patent" horizontally offset to the right of the Russian primary substring "патент". To make the primary substring and/or secondary substring more prominent, the primary substring and/or secondary substring, or a portion thereof, can be emphasized. Example 2 shows the display of example 1 where the English secondary substring is emphasized using bolding. Example 3 shows the display of example 1 where the English secondary substring is emphasized by capitalizing the characters of "patent". In some embodiments, emphasized substrings are scaled down, in the horizontal and/or vertical directions, such that the airspace of the emphasized substring is equal to or smaller than the airspace of the original substring. For example, example 4 shows the display of example 3 where "PATENT" has been narrowed such that "PATENT" fits into the airspace of the "patent" from example 1. When a substring is emphasized via bolding, the emphasized substring can be scaled down by reducing the spacing in between its characters such that the airspace of the bolded substring is equal to or smaller than the airspace of the original substring. This additional scaling step advantageously preserves the layout of text on the electronic display while improving the readability of the primary and/or secondary text string across various types of electronic displays, from smartwatches to smartphones to large monitors.

Figure 37D:
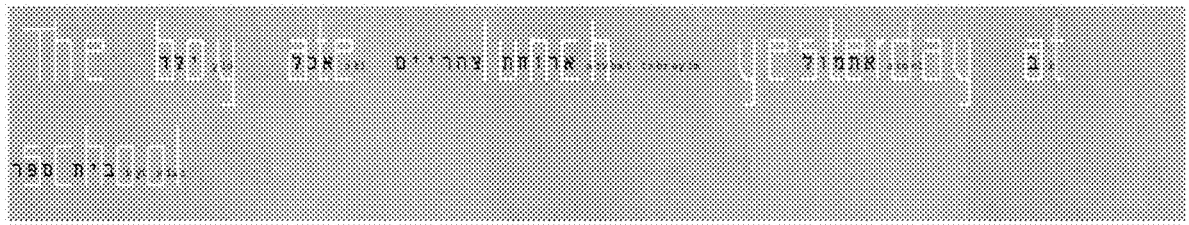
Figure 37G:
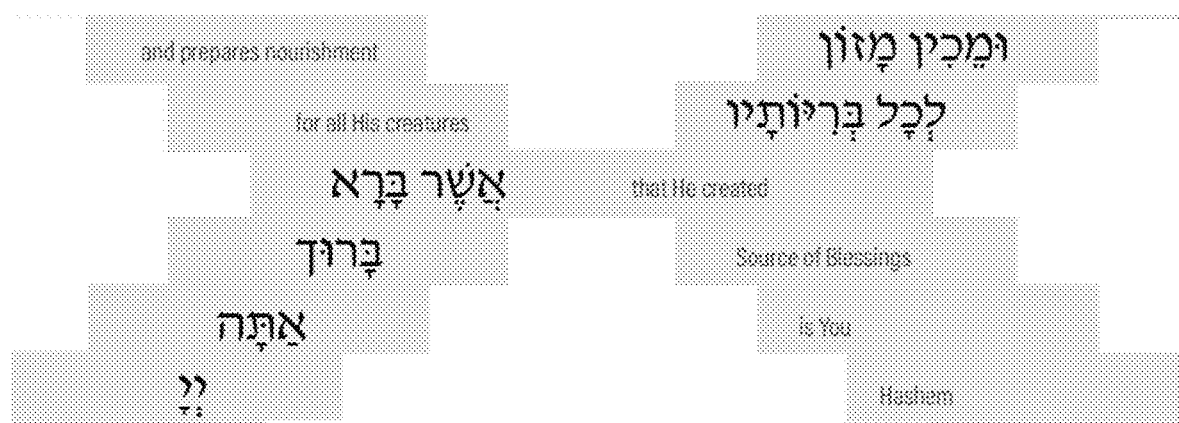
Figure 37H:
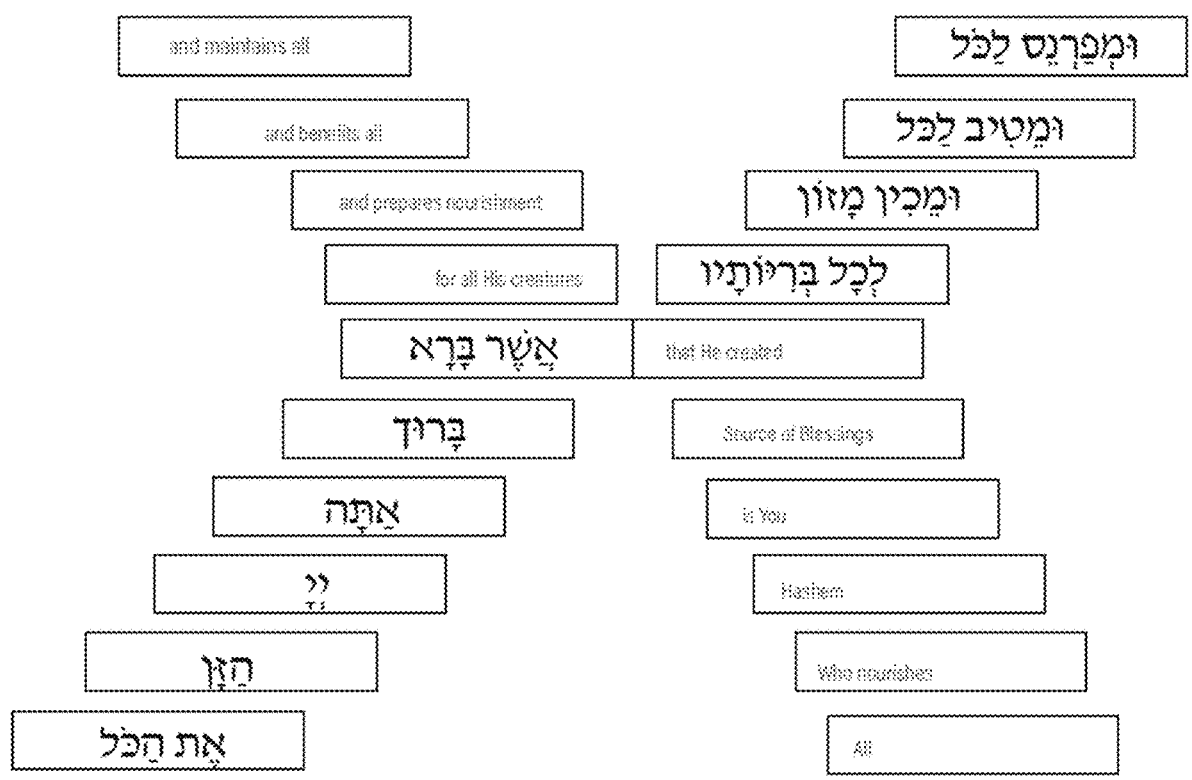
Figure 37I:
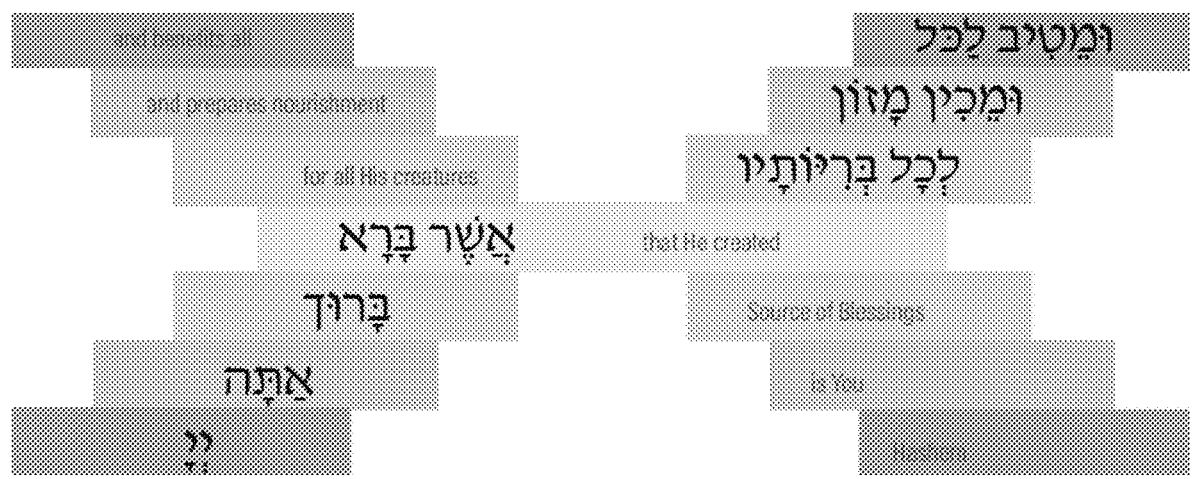
Figure 37J:
Figure 37K:
Figure 38:
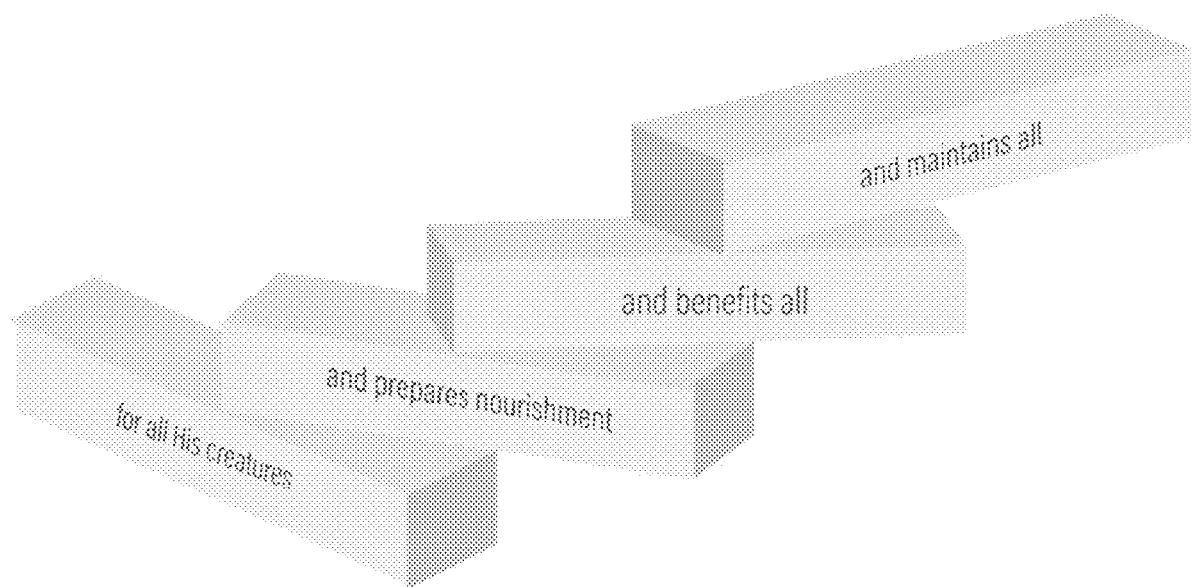

FIG. 37d shows a Hebrew first text, an English second text, and a Hebrew transliteration third text Displaying a first text in a darker color such as black, a second text in a lighter color such as white, and the background in a neutral color such as grey offers several advantages. In an embodiment, this color scheme can be applied to two text strings arranged into a series of substring pairs having a horizontal offset between their corresponding substrings. Alternatively, this color scheme can be applied to two text strings having characters of the first text string embedded within characters of the second text string. Yet alternatively, this color scheme can be applied to any arrangement of two text strings.

First, having a grey background creates a strong contrast, making both texts highly readable. The grey background serves as a neutral tone that doesn't compete with the texts, allowing both the dark and light texts to stand out clearly. This contrast is particularly beneficial in distinguishing the two texts from each other and from the background.

In a preferred embodiment where the second text is placed above and offset to the right of the first text, the arrangement naturally draws the eye from the first text to the second, creating a visual hierarchy. The darker first text grabs initial attention due to its weight and contrast, while the lighter second text, being offset and in a different position, provides a secondary point of focus. This hierarchy helps guide the reader through the information in a structured manner.

When the characters of the first text are embedded into the characters of the second text, the color scheme creates a layered, dimensional effect. The dark first text appears to be carved into or underlying the white second text, which can give the appearance of depth. This visual depth can make the text more engaging and can help to emphasize the embedded content as something that is integral to or foundational within the second text.

The distinct color difference between the first and second texts ensures that they do not blend into each other, maintaining clarity in communication. This is particularly useful in designs where two different types of information or languages need to be displayed together but kept visually distinct.

Figure 39C:
Figure 39D:
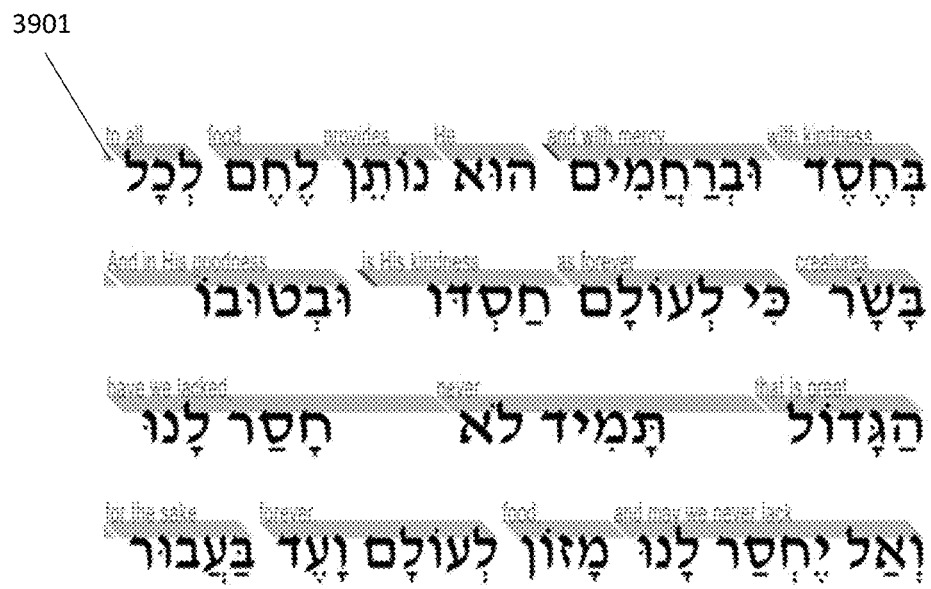
Figure 40:
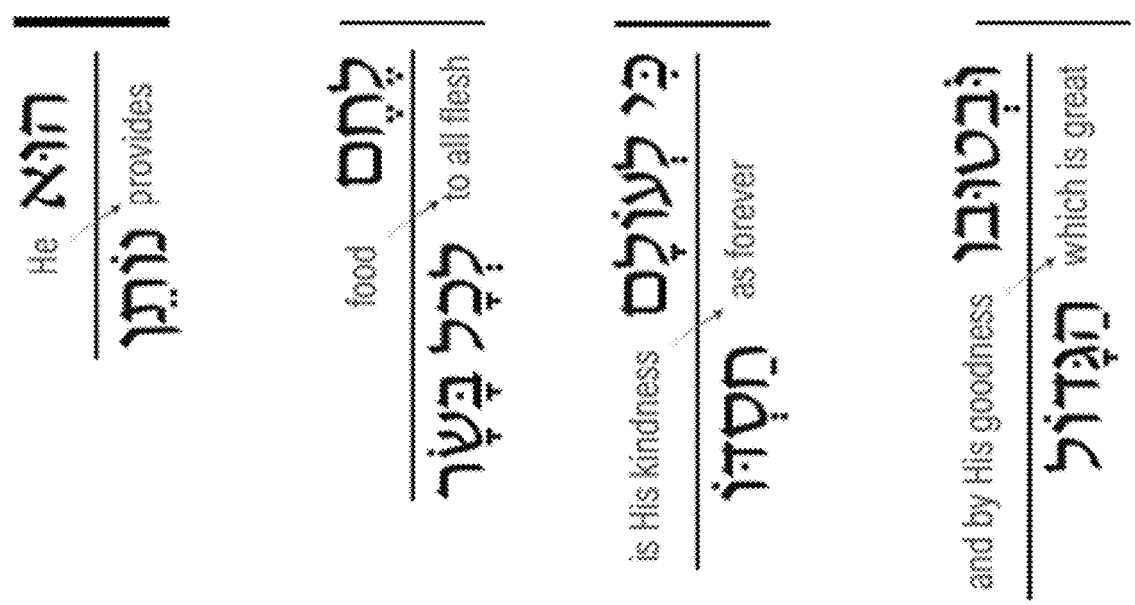
Figure 47A:
Figure 47B:
Figure 48A:
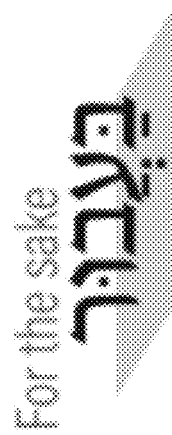
Figure 48B:
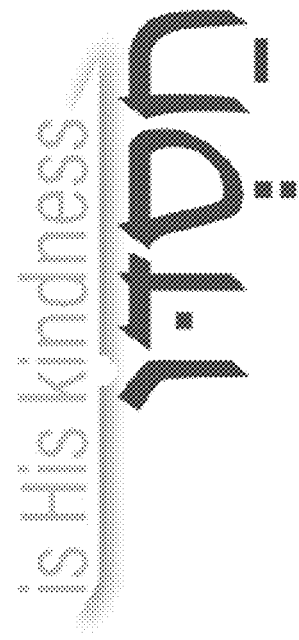
Figure 48C:
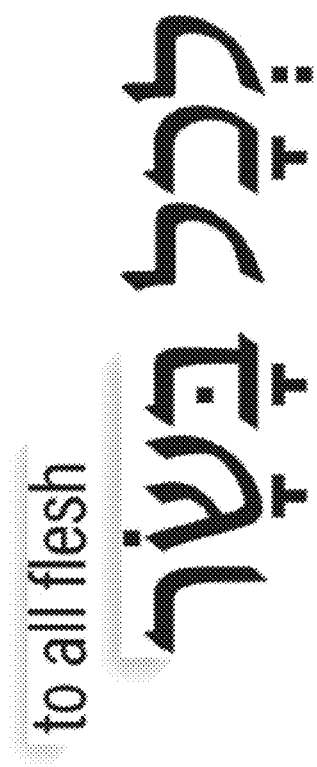

FIG. 39d shows the display with a shaded line below the text to indicate the clustering of the words and phrases. The figure shows a triangle 3901 at the end of the line, with a short space between, like a unit space, indicating that the with a short space between, like a unit space. This may show that one still needs to move to the next line to understand the rest of the phrase.

FIG. 41 shows a display scheme having the primary substrings displayed across two vertically adjacent lines. The corresponding secondary substrings are positioned externally relative to their corresponding primary substrings. First visual demarcations (e.g., the light grey ovals) surround or interact with the primary substrings, indicating that the primary substrings belong to a single primary string. Second visual demarcations (e.g., the grey rectangles) surround or interact with substring pairs, indicating a correspondence between the secondary substrings and their corresponding primary substrings. The grey rectangles could be determined by identifying the location of the right most pixel location and the leftmost pixel location of the substring pair, and the topmost and bottommost pixels, and adding a margin value to each. The rectangle size is then determined to be this size. This display scheme is advantageous for comparative text displays having a small width (e.g., such as smartphone displays). The primary and secondary text strings can be displayed in two parts where the first and second visual demarcations indicate the required associations and correspondences.

FIG. 42 shows yet another exemplary representation of visual demarcation, wherein the demarcation allows both languages to be read in their correct direction, even though opposite.

Hebrew is read right to left and English is read here left to right (assisted by the arrow).

FIG. 43 shows another exemplary representation of visual demarcations wherein the representation forms non-disturbed sentences in vertical format.

FIG. 44 shows another exemplary representation of visual demarcation wherein in each translated short phrase (separated by vertical lines), the English is written normally from left to right and the Hebrew is written normally (right to left). This is why only the first word in each language overlaps as the true translation and the second word of both are left empty, since they go in opposite directions.

FIGS. 45-48 show further visual demarcations between and/or with respect to the substring pairs in an exemplary and non-limiting aspect of the present invention.

Figure 49A:
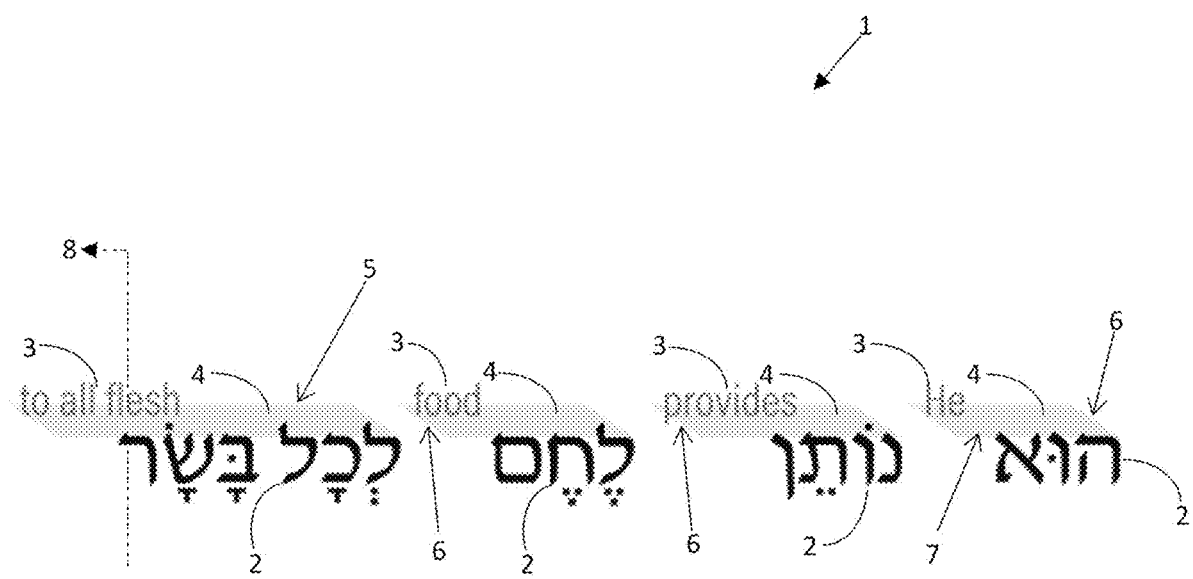

FIG. 49a is a display scheme 1 for a primary text 2 and secondary text 3, according to an embodiment. Diagonal edges 6 and 7 of shaded oblique-parallelogram 4, act as perspective lines that when viewed together with secondary text 3, cause oblique-parallelogram 4 to appear as a shelf in space supporting secondary text 3. The apparent shelf creates a mental demarcation between primary text 2 and secondary text 3 thereby removing visual congestion found in typical linear translations. Secondary text 3 is implemented in a color lighter than the font color of primary text 2 to further reduce reading interference enabling the reader to view the translation text 2 only if he desires. The color and shading of the secondary text 3 and parallelogram 4 are user-configurable.

Edge 7 of parallelogram 4 is in abutment with the primary text 2, in a certain embodiment. The abutment advantageously reduces visual clutter by abutting parallelogram 4 with the glyphs of primary text 2.

As shown, secondary text 3 is horizontally offset in the reading direction of primary text 2. The offset advantageously helps delay the reading of secondary text 3 until the reading of primary text 2 is complete. The reading delay helps minimize mental overload also common in traditional linear translations whose text alignment urges reading of both a foreign text and its translation simultaneously. In a certain embodiment, the extent of secondary text offset is at least one as at least one syllable. The offset is measured from the end of the primary text relative to the reading direction. In a certain embodiment, the extent of horizontal offset is a configurable parameter set by a user. When the display scheme is deployed for languages in which both languages are read in the same direction, from left to right for example, the offset is implemented on the right edge of primary text 2.

Figure 49B:

FIG. 49b is a display scheme employing a series of staggered, composite oblique-parallelograms 14. Each composite oblique-parallelograms 14 includes a shaded front-parallelogram 11 and a shaded back-parallelogram 12 separated by an intermediary, unshaded parallelogram 13. As shown, primary text 2 is disposed within shaded front-parallelogram 11, and secondary text 3 is disposed in shaded back-parallelogram 12. As noted above, the diagonal edges cause a 3D impression to emerge in which each of the texts appears to sitting on separate shelves in space.

Composite oblique-parallelograms 14 are progressively offset such that a first shaded back-parallelogram 12 is alignment with intermediary, unshaded parallelogram 13 of an adjacent composite oblique-parallelograms 14. The progressive parallelogram offset creates the impression that the series is either fading into the depth of the page or coming out of the page.

Figure 49C:
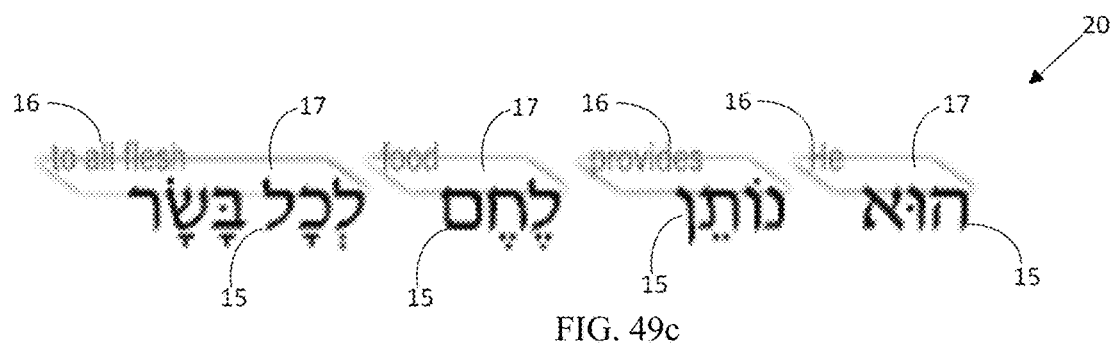
Figure 49D:
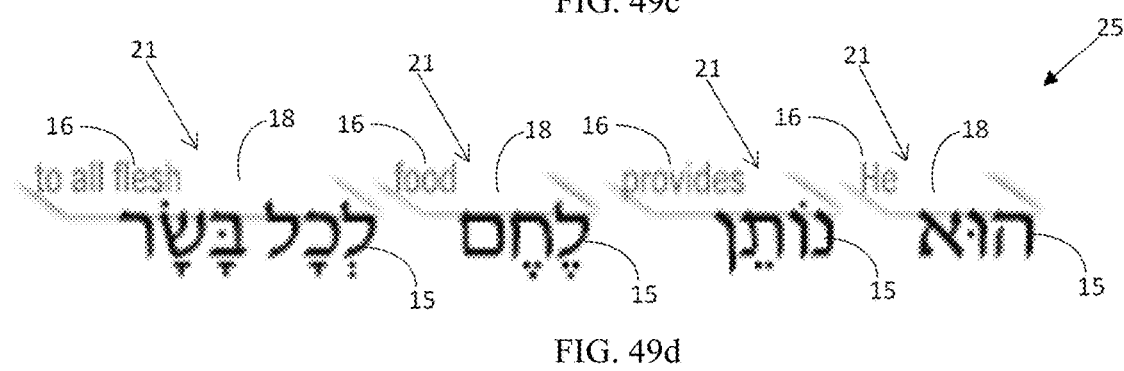
Figure 49E:
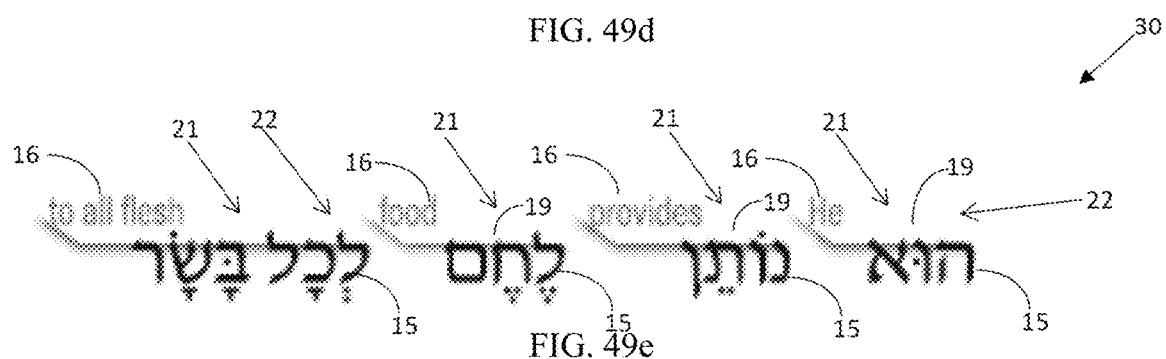

FIGS. 49c-49e are display schemes analogous to that of FIG. 49a except that the oblique-parallelogram is formed from two or more shadow-outlined edges whereas the body of the oblique-parallelogram is white, according to an embodiment. As shown, oblique-parallelogram 17 of FIG. 49c is formed from four shadow-outlined edges. Oblique-parallelogram 18 of FIG. 49d is formed from three shadow-outlined edges where edge 21 is unshaded. Oblique-parallelogram 19 of FIG. 49e is formed from two shadow-outlined edges where edges 21 and 22 are both unshaded. As shown, even two shaded edges are sufficient to create the perspective effect.

FIG. 49c is a display scheme of primary and secondary texts demarcated by an oblique-parallelogram formed by a three-edge shadow-outline, according to an embodiment.

FIG. 49e is a display scheme of primary and secondary texts demarcated by an oblique-parallelogram formed by a two-edge shadow-outline, according to an embodiment.

FIG. 50 shows a display scheme having alternating placement of notes, perhaps user-inputted notes, text, metadata, images, or other data, from selected text to selected text, where the placement is one of above and below the selected texts, further distinguishing sets of notes from each other without interrupting the sentence flow of the text. In some embodiments, the notes alternate with the first note below the selected text and the second note above the selected text. In other embodiments, the order is reversed, or other patterns could be used, perhaps two or three notes above followed by two or three notes below. In some embodiments, the notes could be parallel to the selected text. In other embodiments, the notes could be perpendicular to the selected text, or any angle between perpendicular and parallel.

FIG. 50 shows a display scheme having secondary substrings of "Joshua Alexander Green," "Orange Grove School," and "on Bradley Street," alternating above and below their corresponding primary substrings of "The boy went to the," "new school near the," and "bus station." Corresponding words within a substring pair are displayed as having similar attributes. For example, "Orange Grove School" and "new school" are both a lighter shade, indicating a correspondence. In some embodiments, a subset of the primary substring is emphasized. The emphasis could be with highlighting, or bolding, or changing any other attribute of the primary substring text. The emphasis could indicate the text that corresponds to the note or it could indicate that the text does not correspond to the note. While some embodiments utilize text for the notes, other embodiments may use icons or images. These icons or images could be non-textual or could include images of text. For instance, in a program to teach a child to read, the notes may be images of the text in the primary substring. "The boy sees the cat" may have an image of a boy above the primary substring, an image of an eye looking below the primary text, and a cat image above the primary text. In other embodiments, the notes could include suggestions to improve the grammar or the composition of the phrase. In other embodiments, the notes could include a translation or transliteration of the phrase.

In some embodiments, the placement of the notes above or below is determined by the location of the word related to the note in the primary substring. For instance, if the note relates to the first word, then the note is placed above, notes related to the second word go below, notes related to the third word are displayed above, etc. This determination based on the location could be sentence, phrase, or clause-based rather than word-based. For instance, notes related to the first phrase are displayed above the primary substring, the notes related to the second phrase go below, etc. Any pattern could be used for alternating. In some embodiments, one note is above and the second is below. In another embodiment, two or three could be on top followed by two or three below. In still another embodiment, notes for nouns could be above and for verbs, below. In another embodiment, the system could analyze the content type of each substring (e.g., noun, verb, technical term) and applies different horizontal offsets or styling rules based on the category of content to enhance readability and comprehension In some embodiments, the entire note is displayed above the primary substring. In other embodiments, only the first several words are displayed above the primary substring, and the rest of the note is seen based on a mouse click, a mouse over event, or a similar selection technique. More of the partial text of the note can be displayed above or below the line because the alternating text allows for more space for the primary substring.

In some embodiments, a ranking or scoring technique is used to determine whether the notes are displayed above or below the primary substring. The scoring could calculate the location of the last note and the space used for that note, to determine where there is more space for the current note. For example, if we are beginning a new paragraph then there can be at least two advantages in having the first of the alternating notes start above: there is less of a chance that the last sentence in the last paragraph is as pertinent to this sentence than the one after it or there may be an empty space above the first sentence of new paragraph. If the last sentence of the last paragraph doesn't fill the whole line, that can be another factor in scoring: such as making sure that the alternating is timed to use the empty space or actually move the partial text of that last line in order make room for a certain note.

In some embodiments, the system provides an adaptive layout where the arrangement of primary and secondary substrings automatically adjusts based on display dimensions, screen orientation, or font size, ensuring readability across devices of varying sizes (e.g., mobile, tablet, desktop). In some embodiments, a user interface is included that allows end-users to manually adjust the spacing, offset, or style of the substring pairs according to personal preference or specific needs. In some embodiments, the secondary substrings include multimedia annotations such as audio, video clips, or interactive elements linked to the corresponding primary substrings, enhancing contextual understanding. These adjustments and settings could be saved for future sessions on this computers or on other devices. In some embodiments, there is a multi-lingual mode where multiple secondary strings in different languages are displayed concurrently, enabling comparison of translations or transliterations within a single visual interface. In some embodiments, the user may switch between multiple languages or multiple translations. In some embodiments, there is a real-time mode that uses speech recognition to transcribe spoken text into the primary string while suggesting secondary strings such as translations, explanations, or references, displayed in real time. In some embodiments, the placement and display properties of the secondary substrings are guided by user preferences or pre-defined templates that specify the arrangement pattern (e.g. customizing the embedding patterns of characters, such as choosing between vertical, horizontal, or circular embedding to suit different types of content or personal preferences), font style, or color scheme for different types of secondary substrings (e.g., translations, notes, explanations). In some embodiments, the secondary substrings are presented as overlays that expand or collapse upon user interaction, offering a cleaner interface while still providing contextual information as needed. In some embodiments, there is a collaborative mode where multiple users can simultaneously add, edit, or highlight secondary substrings, with real-time synchronization across different devices. In some embodiments, the system employs an artificial intelligence driven context analysis to auto-generate suggestions for secondary substrings, such as related notes, relevant images, or glossaries based on the primary text content. In some embodiments, the display of substring pairs adapts automatically based on the orientation of the device (landscape or portrait), optimizing the layout for readability without user intervention. In some embodiments, the display dynamically adjusts the color and contrast between the first and second substring pairs based on ambient lighting conditions or user-specific settings to enhance readability under varying viewing conditions. These adjustments could be based on light or sound sensors.

Figure 51:
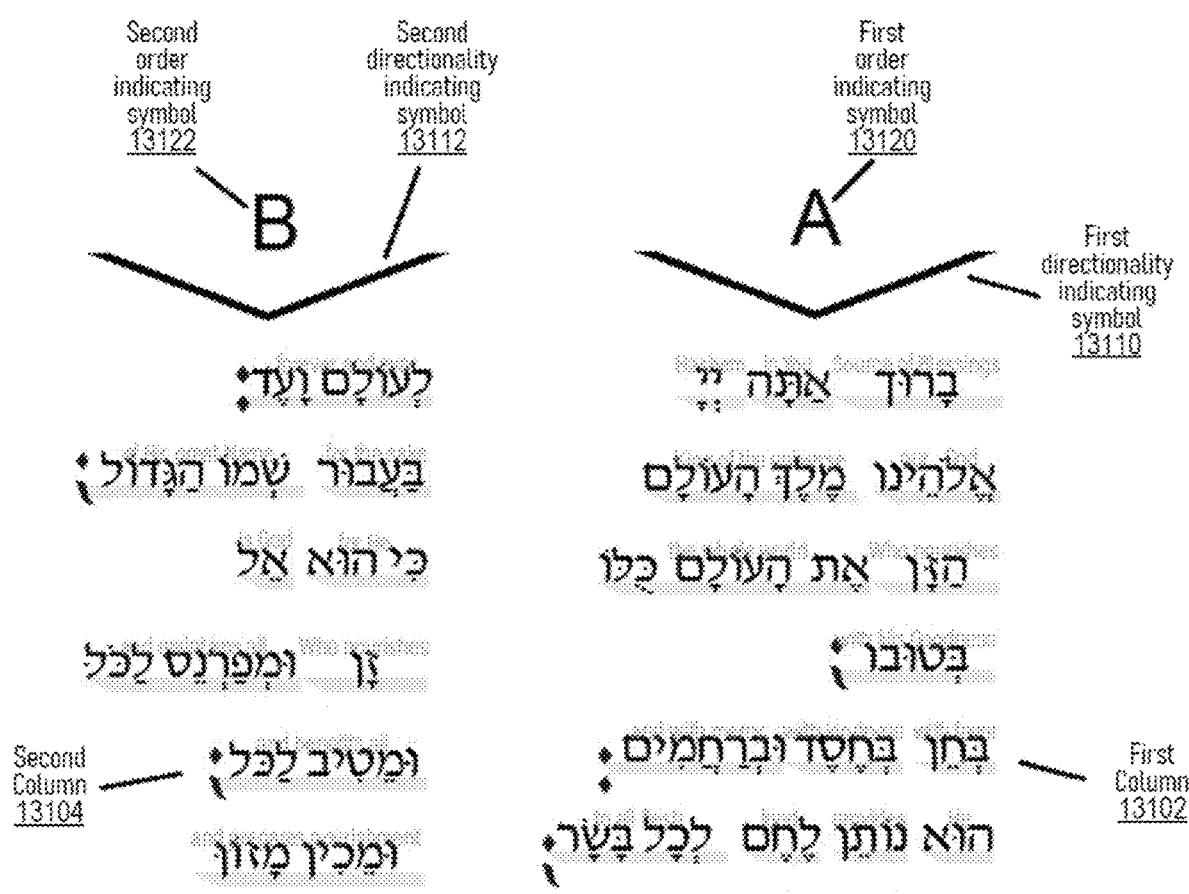

Reference is now made to FIG. 51 in which two columns of vertically adjacent substring pairs are displayed in accordance with a preferred embodiment of the present invention. Shown is a first column 13102 of vertically adjacent substring pairs placed to the right of a second column 13104 of vertically adjacent substring pairs. There is a first directionality indicating symbol 13110, the first arrow, above the first column 13102, and a second directionality indicating symbol 13112, the second arrow, above the second column 13102. There is a first order indicating symbol 13120, the letter "A," above the first directionality indicating symbol 13110, and a second order indicating symbol 13122, the letter "B," above the second directionality indicating symbol 13112.

In an alternative display of that depicted in FIG. 51, the directionality indicating symbols may be any shape that indicates to the reader which direction a column of substring pairs should be read in. Each directionality-indicating symbol should preferably be placed near the starting point of its corresponding column of text.

In an alternative display of that depicted in FIG. 51, the order indicating symbols may be any set of symbols that progress in a logical order. For example, the number "1" may be used for the first column of text to be read and the number "2" may be used for the second column of text to be read. Each directionality-indicating symbol should preferably be placed near a directionality-indicating symbol and/or near the starting point of its corresponding column of text.

In an alternative display of that depicted in FIG. 51, the use of directionality indicating symbols and order indicating symbols is applied to rows of horizontally adjacent substring pairs.

Figure 52:
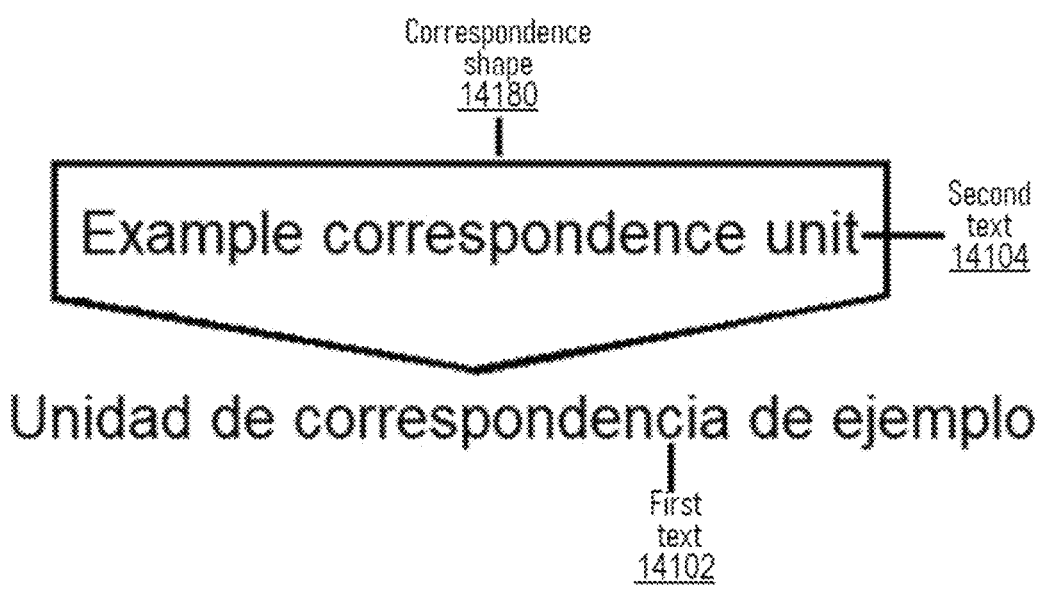

Reference is now made to FIG. 52 in which a first text and a second text are displayed in accordance with another preferred embodiment of the present invention. Shown is a second text 14104, the English native language chunk "Example correspondence unit" inside of a correspondence shape 14180, the shield, which is placed above a first text 14102, the Spanish foreign chunk "Unidad de correspondencia de ejemplo."

In an alternative embodiment of that depicted in FIG. 52, the correspondence shape may be positioned in between a first text and a second text, where the first text is not inside of the correspondence shape.

Figure 53:

Reference is now made to FIG. 53 in which a column of vertically adjacent correspondence units 14350 is displayed in accordance with another preferred embodiment of the present invention. Each substring pair is comprised of an English native language substring and a Hebrew foreign substring. There are dual purpose order and direction indicating symbols 14360, the arrows, placed around the column. There may also be separation bars 14370 placed in between vertically adjacent correspondence units.

In an alternative embodiment of the arrangement depicted in FIG. 53, the order indicating symbols may be half arrows and any other order indicating shapes.

Figure 54A:
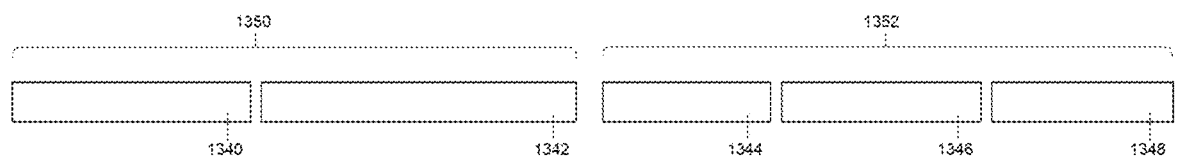

FIG. 54a shows two sets of demarcations in which the first set of demarcations 1350 is comprised of the related first 1340 and second 1342 demarcations while the second set of demarcations 1352 is comprised of the related third 1344, fourth 1346, and fifth 1348 demarcations. Related demarcations are discrete such that, when placed proximate to a text string, a reader can differentiate one demarcation from adjacent demarcations of the same set. Here, the demarcations are hollow enclosing structures.

Figure 54B:
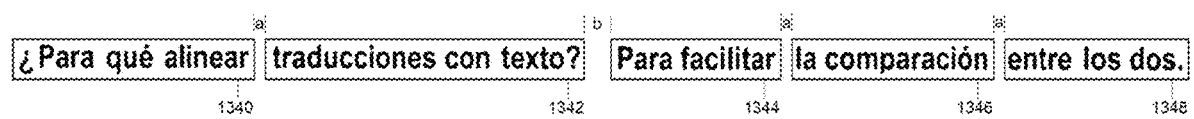

FIG. 54b shows a demarcated Spanish text string, according to an embodiment. The demarcations, due to their discrete nature, define substructures of the text string. Here, the substructures are phrases of "¿Para qué alinear" "traducciones con texto?" "Para facilitar" "la comparación" and "entre los dos." Related demarcations are spaced equidistant from each other by a first distance 'a' and unrelated demarcations (e.g., adjacent demarcations from different sets) are spaced equidistant from each other by a second distance 'b', where the first distance is not equal to the second distance. The demarcations, due to differences in spacing between adjacent related demarcations and adjacent unrelated demarcations, define substructures of the text string. For example, here, there is a consistent spacing of distance 'a' in between adjacent related demarcations and a larger consistent spacing of distance 'b' in between adjacent unrelated demarcations. The spacing of distance 'b' clearly defines the sentences (a type of text string superstructure) of "¿Para qué alinear" "traducciones con texto?" and "Para facilitar" "la comparación" and "entre los dos."

FIG. 54d shows a Spanish text string (top) and a demarcated Spanish text string (bottom). The Spanish text string has been demarcated according to the demarcation spacing of FIG. 54c but without any changes to the position of the words in the Spanish text string.

Thus, a preferred method of using sets of demarcations to define substructures and superstructures of a text string requires each demarcation to 1) be discrete, 2) have a first consistent spacing in between related demarcations, and 3) have a second consistent spacing in between unrelated demarcations.

Figure 55:
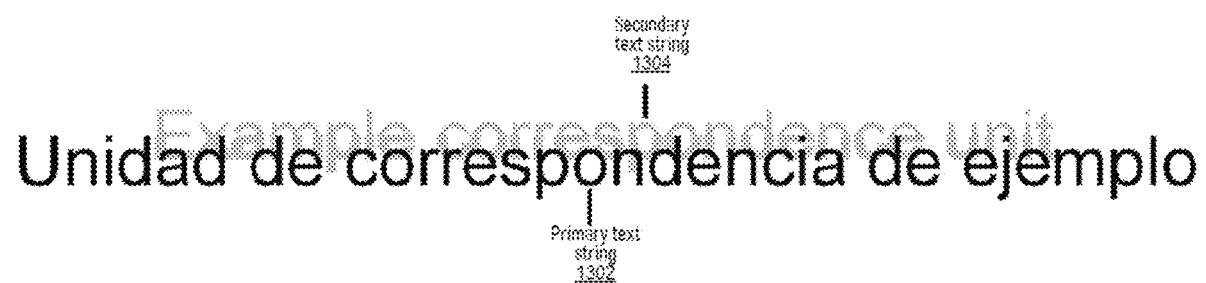

FIG. 55 shows a primary text string 1302 and a corresponding secondary text string 1304. The bottom portion of the secondary text string 1304 is thicker than the top portion of the secondary text string 1304. The increasing thickness in the direction of the primary text string 1302 indicates a correspondence between the primary text string 1302 and the secondary text string 1304.

For embodiments having two or more text strings or two or more substrings, alternating text attributes such as alternating colors, fonts, sizes, or styles may be used for every other text string or substring, serving to further distinguish adjacent text strings or substrings.

For embodiments where a text string interferes with another text string, one or more demarcations can be placed such that the demarcations cover up the interference, either partially or entirely, reducing the interference. The one or more demarcations may be sized to cover only the interference. When placed over the interference, the demarcations may cause the interference to appear deemphasized.

In some embodiments, the primary text string and/or the secondary text string may be italicized, or otherwise manipulated, in such a way that indicates the reading directionality of the text string.

In some embodiments, the output device 306 is an augmented or virtual reality screen with a microphone and camera as input devices 304. Words seen from an input device 304, perhaps a camera, could be converted to text through digital character recognition module 314, and may be displayed on the screen. This may be useful for the visually impaired, where the camera can read the words better than the user's eyes. In some embodiments, the text could be translated to a different language in a translation module 317, and the two languages could be displayed on the augmented or virtual reality screen using any of the techniques described herein, perhaps overlaying the real-world or virtual-world images.

In other embodiments, the words heard by the microphone may be converted into text and displayed, perhaps along with a translation of the words, overlaying the real-world video images. In one example, three people may be talking, with a woman speaking at the specific time of this display. The woman speaks, and her words, along with the translation in a different language, may be placed in the word balloon with the indication that she said these words. The words and the translation could be any of the display techniques and formats described above. In one embodiment, an eye tracking device, a type of input device 304, is used to identify a person who is talking in a room. The eye-tracking information is then used to focus the microphone (perhaps using a directional microphone that is controlled robotically by the computing device 300) on the specific person who is talking, and the spoken words from that person are filtered out of the noise. These spoken words are then processed by ta voice-to-text module to generate computer-readable text. This computer-readable text is then sent to the parsing module 316 and the translation module 317, as described above. After the text is processed by the calculation module 318, the placement module 320, and the operations module 322, the translation and the text are sent to the renderer 324 to format for interlinear display on the augmented or virtual reality display. In some embodiments, the text and the translation are jointly displayed on the augmented reality display in a transparent or translucent word balloon that indicates who said the words. The indication of the speaker with the word balloon is helpful if there is a delay between the speaking and the display of the interlinear translation on the screen. In other embodiments, the words and the translation are displayed in a separate window on one side or another of the augmented reality display. In another embodiment, the words and the translation are displayed at the top or the bottom of the augmented reality display.

As the words are spoken, the translation may be done in real-time (or close to real-time), allowing the user to hear and see the foreign language conversation as well as to see the translation (silently) in the augmented reality screen.

In another embodiment, a virtual reality screen is used in place of the augmented reality display. The virtual reality screen could be used to teach a foreign language, with an avatar conducting an audio conversation while the written words and the translation are displayed interlinearly in a word balloon using one or more of the formats described above. This allows the user to hear the foreign language word, see the foreign language word, and see the avatar act out the word, providing three methods of learning the foreign language at the same time. In some embodiments, gesture-based interactions for manipulating the layout of the characters. For example, users could use pinch gestures to change the spacing or swipe gestures to adjust the embedding depth of characters. In other embodiments, users could use voice commands to adjust the placement, style, or visibility of the first or second sets of characters, enhancing accessibility for users with mobility or vision impairments. The system could use of machine learning algorithms to predict optimal x,y coordinates for character placement based on historical user interaction data, potentially improving the automatic placement of characters for individual users over time.

For more information on virtual or augmented reality embodiments, see U.S. patent application Ser. No. 18/732,461, filed on Jun. 3, 2024, by inventor David Fesbinder, said patent application incorporated herein by reference in its entirety.

Most speed reading applications use Rapid Serial Visual Presentation (RSVP) and focus on flashing words quickly without providing explicit visual cues about the word's position within the sentence or within a paragraph. As of now, none of the widely-known RSVP-based apps, such as Spritz, Spreeder, Reedy, or others, include a feature that indicates the position of the current word within the sentence or the paragraph. There is a need to provide the reader with information regarding the location of the word in a paragraph or sentence, and the techniques described herein may be used to solve this problem.

Using framing symbols to indicate the start and end of a sentence in a speed-reading format could help guide the reader's eyes and improve their focus. The choice of symbols is important because they need to be easily recognizable, unobtrusive, and ideally should not distract from the reading process. Here are some suggestions and considerations for choosing these symbols:

Simple geometric shapes such as • (bullet point), ◉ (bullseye), ○ (circle), ▸ (triangle), ▪ (square) may be used. Simple geometric shapes are universally recognizable and can be easily distinguished from text. These shapes are also neutral and do not carry specific linguistic meanings, reducing the risk of distraction. A bullet point (•) could be used at the beginning of a sentence to indicate the start, and an open circle (○) at the end to signal completion. This creates a clean, unobtrusive way to frame the sentence.

Alternately, Arrow Symbols such as ➤ (right arrow), ← (left arrow), ↩ (curved arrow) could be used. Arrows naturally guide the reader's direction, indicating the start and end of a sentence. They can subtly push the reader's focus from left to right (or vice versa). A right-facing arrow (➤) could mark the start of a sentence, encouraging the reader to follow the direction of the text, while a left-facing arrow (←) could mark the end, subtly guiding the reader's return to the beginning of the next line. The arrows may be minimalist or more ornate, depending on the desired aesthetic. A simple horizontal line (-) at the top and bottom of the sentence could serve as a visual guide, subtly boxing in the sentence without adding clutter.

Using framing symbols instead of words can effectively guide the reader's eyes and enhance the speed-reading experience. The key is to select symbols that are simple, recognizable, and unobtrusive, so they guide the reader without detracting from the main content. Simple geometric shapes, arrows, brackets, or decorative lines achieve this purpose.

Addressing the challenge of helping readers track their progress within a sentence in speed-reading tools is crucial for improving user experience and comprehension. A "thermometer" or a "cone" could serve as useful visual cues. A Progress Bar (Thermometer) could be used. A horizontal or vertical progress bar that fills up as the sentence progresses. The progress bar provides a clear and intuitive visual representation of how far the reader has come in the sentence and how much is left. This can help the reader maintain a sense of place within the text. A simple line beneath or beside the flashing word that gradually fills with color as the sentence progresses. It could start empty and fill up to 100% by the time the last word of the sentence is displayed. The progress bar can reset with each new sentence, providing a continuous sense of progression.

Alternately, an Expanding Cone could be used. A cone shape that grows wider as the sentence progresses, visually representing the unfolding of information. The expanding cone symbolizes the flow and expansion of information, giving readers a sense of how much more content is coming and where they are in the sentence. The cone could start as a small point (representing the beginning of the sentence) and gradually widen as each word is displayed, with the widest point at the end of the sentence. This can be placed beneath the flashing text, growing horizontally with the progression of the sentence. The width of the cone at any given moment would visually indicate the relative position within the sentence.

In another embodiment, a Segmented Progress Indicator could be used. A segmented bar or series of dots representing each word or phrase in the sentence. This offers a granular view of progress, with each segment or dot lighting up as the corresponding word or phrase is displayed. This helps the reader understand both their position and the length of the sentence. Each segment or dot corresponds to a word or phrase in the sentence. As the sentence progresses, the corresponding segment lights up or changes color. This can be aligned horizontally below the flashing text or vertically to the side. The color change could be subtle, such as fading from grey to a more prominent color, to avoid distracting from the text itself.

Another embodiment incorporates a Circular Progress Indicator (Radial Thermometer). A circle or arc that gradually fills as the sentence progresses, similar to a clock face. This gives a continuous sense of progress while also maintaining a central focus on the text itself. It's visually compact and could be easily integrated into the speed-reading interface. The circle starts as an empty outline and gradually fills in a clockwise direction as the sentence is read. This could be placed around the flashing word, creating a "halo" effect, or as a separate element nearby. A complete circle would signify the end of the sentence, giving a clear visual cue that the sentence is complete.

In some embodiments, an indicator is displayed to show the reader how many seconds are left to complete the reading of the passage. In other embodiments, the indicator shows how many words are left to read in the passage. Any of the techniques described herein may be used to as the indicator to show progress.

A Scrolling Text with Background Highlight could be used. As each word flashes, a background highlight scrolls from left to right, indicating progress through the sentence. This visually ties the reader's position to the entire length of the sentence, providing a clear sense of beginning, middle, and end. The background highlight could be a subtle color that moves across the screen behind the flashing word, corresponding to the word's position in the sentence. This highlight could start on the left and move right as the sentence progresses, creating a visual map of the reader's progress.

Alternatively, Gradually Revealing Text could be used. The sentence could be gradually revealed or unblurred from start to finish, while the keyword remains highlighted. This maintains the fast-paced reading style while giving readers a peripheral sense of how much of the sentence has been revealed, helping them stay oriented. The sentence starts blurred or obscured, with the current word in focus. As each new word is shown, the previously blurred portion of the sentence becomes clear. This provides a sense of progress and completion as more of the sentence is gradually revealed.

Each of these methods could help mitigate the disorientation that sometimes accompanies speed-reading applications. The key is to offer a visual cue that doesn't distract from the reading process but rather complements it. A progress bar (thermometer) or a segmented progress indicator might be the most straightforward and intuitive solutions, offering clear visual feedback on the reader's position within the sentence. For a more dynamic and engaging approach, an expanding cone or circular progress indicator could add a visually interesting element to the reading experience. Ultimately, testing different designs with users would be essential to determine which method best supports their comprehension and comfort while using the speed-reading tool.

To show the reader their position in a sentence with minimal distraction, an Underline Progression could be used. A thin, subtle underline that grows beneath the text as the sentence progresses. As each word flashes by, a faint line slowly extends underneath the word. The line is barely noticeable, ensuring it doesn't compete with the text itself. The line can start as a short underline beneath the first word and gradually extend across the width of the sentence until it reaches the end. Use a soft, neutral color (like light gray) that doesn't distract but still indicates progression.

Alternately, an Opacity Change may be used. The background of the reading area subtly shifts in opacity as the sentence progresses. The area behind the text (not the text itself) could start at a lower opacity and gradually increase as the reader moves through the sentence. This change would be slow and subtle, ensuring that the focus remains on the words while the background shift provides a subconscious cue of progress.

In another embodiment, a Fading Tail could be used. A soft "trail" or fading effect that follows the text as it moves through the sentence. A very light gradient or fading trail could follow the word that's currently being displayed. As each word flashes, the previous word leaves behind a fading, barely visible tail, indicating the path through the sentence. This trail should be subtle enough not to draw attention away from the main text but sufficient to give a sense of flow and progression.

In still another embodiment, a Color Gradient Progress Bar could be used. A barely noticeable color gradient that runs along the bottom or top of the reading area. A thin, horizontal bar below or above the text area slowly changes color or intensifies in hue as the sentence progresses. The gradient should be so subtle that it only registers peripherally, avoiding any direct competition with the text for the reader's attention.

In another embodiment, a Peripheral Progress Indicator is used. A small, unobtrusive icon or dot in the corner of the screen that fills up or changes slightly as the sentence progresses. A small, dim icon in the corner of the reading area (away from the text) that gradually fills or lights up as the sentence progresses. Because it's placed in the periphery, the reader can track progress if they choose to glance at it, but it doesn't draw focus away from the text itself.

A Word-by-Word Subtle Highlight technique could also be used. A barely visible highlight that moves across the sentence, word by word, without overwhelming the main word being read. As the reader progresses, each word is momentarily highlighted with a very faint color before fading back to normal, while the currently flashing word remains prominently visible. This approach provides a sense of flow without pulling attention away from the primary reading task.

Or a Text Size Modulation technique could be used. A very slight increase in text size for each new word, creating a sense of movement through the sentence. As each word is displayed, it could appear very slightly larger than the previous word, then shrink back to normal size. This gives a subtle visual cue that the reader is progressing without distracting from the text. The size difference should be minimal—just enough to be noticeable subconsciously.

The underline progression and opacity change methods provide effective progress feedback. Both methods offer subtle cues that don't interfere with the reading experience and can be designed to blend seamlessly with the text. The key to any of these approaches is to maintain subtlety, ensuring that the visual cues enhance the reader's experience without drawing focus away from the content itself.

Methods in this document are illustrated as blocks in a logical flow graph, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described method blocks can be combined in any order to implement the illustrated method or alternate methods. Additionally, individual blocks may be deleted from the methods without departing from the spirit and scope of the subject matter described herein.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions (or a computer-implemented method) may also be loaded onto a computer, other programmable data processing apparatus, or other devices to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

We claim:

1. A computer-implemented method for displaying a primary text string and a secondary text string, the computer-implemented method comprising:
   receiving the primary text string comprising a plurality of primary substrings;
   receiving the secondary text string comprising a plurality of secondary substrings, wherein each of the secondary substrings corresponds to one of the primary substrings; and
   displaying, on an electronic display, the primary substrings and the secondary substrings arranged into substring pairs, wherein each of the substring pairs comprises one of the secondary substrings placed next to its corresponding primary substring;
   wherein a placement of the secondary substrings alternates above the primary substrings for a first secondary substring and below the primary substrings for a second secondary substring.

2. The computer-implemented method of claim 1, wherein:
   at least one of the primary substrings and the secondary substrings are extracted from the primary text string and the secondary text string via parsing operations of a native language processing engine, wherein:
   the native language processing engine provides the at least one of the primary substrings and the secondary substrings as an output from at least one automated parser.

3. The computer-implemented method of claim 1, wherein:
   the secondary text string is a transliteration of the primary text string.

4. The computer-implemented method of claim 1 wherein:
   the secondary text string is a translation of the primary text string.

5. The computer-implemented method of claim 1 wherein:
   a majority of the secondary substrings consist of user-input notes related to the corresponding primary substrings.

6. The computer-implemented method of claim 5 wherein a portion of one of the primary substrings is emphasized, wherein the emphasized portion is related to the corresponding secondary substring.

7. The computer-implemented method of claim 5 wherein a portion of one of the primary substrings is bolded, wherein the bolded portion is related to the corresponding secondary substring.

8. The computer-implemented method of claim 1, further comprising:
   horizontally offsetting each of the secondary substrings such that the secondary substrings are displayed horizontally offset from their corresponding primary substrings.

9. The computer-implemented method of claim 1, further comprising:
   decreasing a font size of each of the secondary substrings such that the secondary substrings are displayed in a smaller font than their corresponding primary substrings.

10. The computer-implemented method of claim 1, further comprising:
    shading the secondary substrings such that a portion of the secondary substrings is displayed in a lighter shade than their corresponding primary substrings.

11. The computer-implemented method of claim 1 wherein:
    the alternating placement of the secondary substrings includes placing two of the secondary substrings above their corresponding primary substrings followed by placing an other two of the secondary substrings below the corresponding primary substrings.

12. The computer-implemented method of claim 1 wherein:
    the secondary substrings are parallel to their corresponding primary substrings.

13. The computer-implemented method of claim 1 wherein:
    the secondary substrings are adjacent to their corresponding primary substrings.

14. The computer-implemented method of claim 1, wherein:
    the alternating secondary substrings are in different languages displayed concurrently.

15. The computer-implemented method of claim 1, wherein:
    the primary text string is received when speech recognition is used to transcribe spoken text into the primary text string; and
    the alternating secondary substrings suggest an alternative translation.

16. A system to display a primary text string and a secondary text string, the system comprising:
    memory storing executable instructions; and
    a processing device executing the executable instructions, wherein the executable instructions, when executed by the processing device, configure the system to:
    receive the primary text string comprising a plurality of primary substrings;
    receive the secondary text string comprising a plurality of secondary substrings, wherein each of the secondary substrings corresponds to one of the primary substrings; and
    display, on an electronic display, the primary substrings and the secondary substrings arranged into substring pairs, wherein each of the substring pairs comprises one of the secondary substrings placed next to its corresponding primary substring;

wherein a placement of the secondary substrings alternates above the primary substrings for a first secondary substring and below the primary substrings for a second secondary substring.

17. The system of claim 16, wherein:

at least one of the primary substrings and the secondary substrings are extracted from the primary text string and the secondary text string via parsing operations of a native language processing engine, wherein:

the native language processing engine provides the at least one of the primary substrings and the secondary substrings as an output from at least one automated parser.

18. The system of claim 16, wherein:

the secondary text string is a transliteration of the primary text string.

19. The system of claim 16, wherein:

the secondary text string is a translation of the primary text string.

20. The system of claim 16, wherein:

a majority of secondary substring consists of user-input notes related to the corresponding primary substring.

21. The system of claim 20, wherein a portion of one of the primary substrings is emphasized, wherein the emphasized portion is not related to the corresponding secondary substring.

22. The system of claim 16 wherein a portion of one of the primary substrings is bolded, wherein the bolded portion is related to the corresponding secondary substring.

23. The system of claim 16, wherein executing the executable instructions further causes the system to:

offset each of the secondary substrings such that the secondary substrings are displayed offset from their corresponding primary substrings.

24. The system of claim 16, wherein executing the executable instructions further causes the system to:

decrease a font size of each of the secondary substrings such that the secondary substrings are displayed in a smaller font than their corresponding primary substrings.

25. The system of claim 16, wherein executing the executable instructions further causes the system to:

shade the secondary substrings such that a portion of the secondary substrings is displayed in a lighter shade than their corresponding primary substrings.

26. The system of claim 16 wherein:

the alternating placement of the secondary substrings includes placing two of the secondary substrings above their corresponding primary substrings followed by placing an other two of the secondary substrings below the corresponding primary substrings.

27. The system of claim 16 wherein:

the secondary substrings are parallel to their corresponding primary substrings.

28. The system of claim 16 wherein:

the secondary substrings are adjacent to their corresponding primary substring.

29. A computer-implemented method for displaying a primary text string and a secondary string of one or more images, the computer-implemented method comprising:

receiving the primary text string comprising a plurality of primary substrings;

receiving a plurality of images, each of the images corresponding to one of the primary substrings, wherein at least one of the images contains non-textual content; and displaying, on an electronic display, the primary substrings and the plurality of images arranged into substring pairs, wherein each of the substring pairs comprises one of the plurality of images placed next to its corresponding primary substring;

wherein a placement of the plurality of images alternates above the primary substrings for a first secondary substring and below the primary substrings for a second secondary substring.

* * * * *